US011880682B2

(12) United States Patent
Meyer et al.

(10) Patent No.: US 11,880,682 B2
(45) Date of Patent: Jan. 23, 2024

(54) SYSTOLIC ARRAY WITH EFFICIENT INPUT REDUCTION AND EXTENDED ARRAY PERFORMANCE

(71) Applicant: Amazon Technologies, Inc., Seattle, WA (US)

(72) Inventors: Paul Gilbert Meyer, Rollingwood, TX (US); Thomas A Volpe, Austin, TX (US); Ron Diamant, Santa Clara, CA (US); Joshua Wayne Bowman, Austin, TX (US); Nishith Desai, Austin, TX (US); Thomas Elmer, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/363,894

(22) Filed: Jun. 30, 2021

(65) Prior Publication Data

US 2023/0004384 A1  Jan. 5, 2023

(51) Int. Cl.
*G06F 9/30* (2018.01)
*G06F 15/80* (2006.01)

(52) U.S. Cl.
CPC ........ *G06F 9/3001* (2013.01); *G06F 15/8046* (2013.01)

(58) Field of Classification Search
None
See application file for complete search history.

(56) References Cited

U.S. PATENT DOCUMENTS 4,937,774 A   6/1990   Malinowski
5,138,695 A   8/1992   Means et al.
(Continued)

FOREIGN PATENT DOCUMENTS

EP    3396524 A1    10/2018
WO   94/10638 A1    5/1994
(Continued)

OTHER PUBLICATIONS

Kung, H.T., et al., Packing Sparse Convolutional Neural Networks for Efficient Systolic Array Implementations: Column Combining Under Joint Optimization, 2019, ACM, pp. 821-834. (Year: 2019).*

(Continued)

*Primary Examiner* — Eric Coleman
(74) *Attorney, Agent, or Firm* — Knobbe, Martens, Olson & Bear LLP

(57) ABSTRACT

Systems and methods are provided to perform multiply-accumulate operations of reduced precision numbers in a systolic array. Each row of the systolic array can receive reduced inputs from a respective reducer. The reduced input can include a reduced input data element and/or a reduced weight. The systolic array may lack support for inputs with a first bit-length and the reducers may reduce the bit-length of a given input from the first bit-length to a second shorter bit-length and provide the reduced input to the array. In order to reduce the bit-length, the reducer may reduce the number of trailing bits of the input. Further, the systolic array can receive a reduced and rounded input. The systolic array can propagate the reduced input through the processing elements in the systolic array. Each processing element may include a multiplier and/or an adder to perform arithmetical operations based on the reduced input.

21 Claims, 21 Drawing Sheets

(56) References Cited

U.S. PATENT DOCUMENTS

| | | |
|---|---|---|
| 5,151,953 A | 9/1992 | Landeta |
| 5,168,499 A | 12/1992 | Peterson et al. |
| 5,659,781 A | 8/1997 | Larson |
| 5,692,147 A | 11/1997 | Larsen et al. |
| 5,764,556 A | 6/1998 | Stiles |
| 6,205,462 B1 | 3/2001 | Wyland et al. |
| 6,463,453 B1 | 10/2002 | Dang |
| 6,480,872 B1 | 11/2002 | Choquette |
| 6,801,924 B1 | 10/2004 | Green et al. |
| 7,724,261 B2 * | 5/2010 | Thekkath ............ G06F 9/30014 345/623 |
| 7,814,137 B1 | 10/2010 | Mauer |
| 8,184,696 B1 | 5/2012 | Chirila-Rus et al. |
| 8,610,729 B2 * | 12/2013 | Airey ..................... G06T 19/00 345/589 |
| 8,924,455 B1 | 12/2014 | Barman et al. |
| 9,552,189 B1 | 1/2017 | Langhammer et al. |
| 10,790,830 B1 | 9/2020 | Pugh et al. |
| 10,817,260 B1 | 10/2020 | Huang et al. |
| 10,872,295 B1 * | 12/2020 | Liu ........................... G06N 3/08 |
| 10,879,904 B1 | 12/2020 | Gunter et al. |
| 10,915,297 B1 | 2/2021 | Halutz et al. |
| 11,113,233 B1 | 9/2021 | Volpe |
| 11,232,062 B1 | 1/2022 | Volpe et al. |
| 11,308,026 B1 | 4/2022 | Volpe et al. |
| 11,308,027 B1 | 4/2022 | Volpe et al. |
| 11,422,773 B1 | 8/2022 | Volpe et al. |
| 11,467,806 B2 | 10/2022 | Elmer |
| 2003/0081489 A1 | 5/2003 | Scheuerlein et al. |
| 2004/0139274 A1 | 7/2004 | Hui |
| 2006/0149803 A1 | 7/2006 | Siu et al. |
| 2007/0028076 A1 | 2/2007 | Wezelenburg |
| 2007/0185953 A1 | 8/2007 | Prokopenko et al. |
| 2009/0248769 A1 | 10/2009 | Chua |
| 2011/0025900 A1 | 2/2011 | Kondo |
| 2011/0058569 A1 | 3/2011 | Harrand |
| 2011/0225116 A1 | 9/2011 | Gupta et al. |
| 2016/0342890 A1 | 11/2016 | Young |
| 2016/0342892 A1 | 11/2016 | Ross |
| 2016/0358069 A1 | 12/2016 | Brothers et al. |
| 2017/0010863 A1 | 1/2017 | Nystad |
| 2017/0097824 A1 | 4/2017 | Elmer et al. |
| 2017/0103311 A1 | 4/2017 | Henry et al. |
| 2017/0115958 A1 | 4/2017 | Langhammer |
| 2017/0235515 A1 | 8/2017 | Lea et al. |
| 2018/0036165 A1 | 2/2018 | Fallon |
| 2018/0052660 A1 | 2/2018 | Lutz |
| 2018/0164866 A1 | 6/2018 | Turakhia et al. |
| 2018/0218518 A1 | 8/2018 | Yan et al. |
| 2018/0225116 A1 | 8/2018 | Henry et al. |
| 2018/0314671 A1 | 11/2018 | Zhang et al. |
| 2018/0315398 A1 | 11/2018 | Kaul et al. |
| 2018/0336163 A1 | 11/2018 | Phelps et al. |
| 2018/0336164 A1 | 11/2018 | Phelps et al. |
| 2018/0336165 A1 | 11/2018 | Phelps et al. |
| 2019/0026077 A1 | 1/2019 | Manzo |
| 2019/0041961 A1 | 2/2019 | Desai et al. |
| 2019/0079801 A1 | 3/2019 | Lyuh et al. |
| 2019/0138882 A1 * | 5/2019 | Choi ..................... G06N 3/0481 |
| 2019/0236049 A1 | 8/2019 | Vantrease et al. |
| 2019/0294413 A1 | 9/2019 | Vantrease et al. |
| 2019/0311243 A1 | 10/2019 | Whatmough et al. |
| 2019/0377549 A1 | 12/2019 | Alben et al. |
| 2019/0385050 A1 * | 12/2019 | Wang ...................... G06N 3/04 |
| 2020/0026497 A1 | 1/2020 | Park et al. |
| 2020/0117988 A1 | 4/2020 | Arthur et al. |
| 2020/0150958 A1 | 5/2020 | Ahmed |
| 2020/0159809 A1 | 5/2020 | Catthoor et al. |
| 2020/0192701 A1 | 6/2020 | Horowitz et al. |
| 2020/0201576 A1 | 6/2020 | Yudanov et al. |
| 2020/0226473 A1 | 7/2020 | Sharma et al. |
| 2020/0285605 A1 | 9/2020 | Nam |
| 2020/0302298 A1 * | 9/2020 | Van Baalen ............ G06N 3/08 |
| 2020/0349106 A1 | 11/2020 | Ovsiannikov |
| 2021/0019591 A1 | 1/2021 | Venkatesh et al. |
| 2021/0042087 A1 | 2/2021 | Pugh et al. |
| 2021/0064985 A1 * | 3/2021 | Sun ......................... G06N 3/063 |
| 2021/0072955 A1 | 3/2021 | Mellempudi et al. |
| 2021/0089316 A1 | 3/2021 | Rash et al. |
| 2021/0091794 A1 | 3/2021 | Snelgrove et al. |
| 2021/0103429 A1 | 4/2021 | Nair et al. |
| 2021/0157548 A1 | 5/2021 | Elmer |
| 2021/0157549 A1 | 5/2021 | Elmer et al. |
| 2022/0350567 A1 | 11/2022 | Pan et al. |
| 2022/0350775 A1 | 11/2022 | Volpe |
| 2023/0010054 A1 | 1/2023 | Elmer |

FOREIGN PATENT DOCUMENTS

| | | |
|---|---|---|
| WO | 2021/108644 A1 | 6/2021 |
| WO | 2021/108660 A1 | 6/2021 |
| WO | 2023/278475 A1 | 1/2023 |

OTHER PUBLICATIONS

Arnould, E., et al., A Systolic Array Computer., 1985, IEEE., pp. 232-235. (Year: 1985).

Bao, Wenji, et al., A Reconfigurable Macro-Pipelined Systolic Accelerator Architecture, 2011, IEEE., 6 pages. (Year: 2011).

Dick, Chris, Computing the Discrete Fourier Transform on FPGA Based Systolic Arrays, 1996, ACM, 7 pages. (Year: 1996).

Garland et al. "Low Complexity Multiple-Accumulate Units for Convolutional Neural Networks with Weight Sharing," ACM, 24 pages (2018).

Hu, Hen Yu., et al. Systolic Arrays, 2019, Spring inti. Publishing, pp. 939-977. (Year: 2019).

International Search Report and Written Opinion received for PCT Patent Application No. PCT/US2020/062337, dated Mar. 4, 2021, 8 pages.

International Search Report and Written Opinion received for PCT Patent Application No. PCT/US2020/062356, dated Mar. 4, 2021, 8 pages.

Kung "Why Systolic Architectures," IEEE pp. 37-48 (1982).

Kung et al. "Design Algoithms for VLSI Systems," Dept. of Computer Science, Carnegie Mellon Univ, Pittsburgh (Jan. 1979).

Kung et al. "Packing Sparse Convolutional Neural Networks for Efficient Systolic Array Implementations: Column Combining under Joint Optimization," ACM. pp. 821-834 (2019).

Kung et al. "Systolic Arrays for VLSI," Dept. of Computer Science, Carnegie Mellon, Pittsburgh (Apr. 1978).

Liu, B. et al., An Energy-Efficient Systolic Pipelin Architecture for Binary Conbolutional Neural Network, 2019, IEEE, 4 pages. (Year: 2019).

U.S. Appl. No. 16/915,937, Multiple Busses Within a Systolic Array Processing Element, filed Jun. 29, 2020.

Wah, B, W. et al., Systolic Programming for Dynamic Programming Problems , 1999, Circuits Systems Signal Processing vol. 7, No. 2, pp. 119-149. (Year: 1999).

International Search Report and Written Opinion in PCT Application No. PCT/US2022/035353, dated Oct. 14, 2022, 26 pages.

Pedram , A. et al. A High performance, Low Power Linear Algebra Core, 2011, IEEE, pp. 35-42 (Year: 2011).

Yang, Z. et al., "Systolic Array Based Accelerator and Algorithm Mapping for Deep Learning Algorithms", Network and Parallel Computing, 2018, pp. 153-158.

Grout, "Chapter 5—Introduction to Digital Logic Design," Digital Systems Design with FPGAS and CPLDS, Ed. Burlington: Newnes, 2008, p. 217-331.

Tannenbaum, Structured Computer Organization, 2nd Edition, 1984, Prentice-Hall, Inc., p. 1-5.

Henry, "Leveraging the bfloat16 Artificial Intelligence Datatype for Higher-Precision Computations," 2019 IEEE 26th Symposium on Computer Arithmetic, 2019, p. 69-76.

* cited by examiner

SYSTOLIC ARRAY WITH EFFICIENT INPUT REDUCTION AND EXTENDED ARRAY PERFORMANCE

BACKGROUND

Artificial neural networks are computing systems with an architecture based on biological neural networks. A neural network may be implemented by circuitries and data paths, such as a systolic array. Systolic arrays can accelerate the performance of the training and inference phases of artificial neural networks. During the training phase, input data can be provided to train a model. During the inference phase, new inputs can be processed according to the model to obtain a predicted result. User applications often use the model in the inference phase, so the inference phase can often have time sensitivities, and latency during the inference phase can negatively impact the user experience.

As more applications use artificial neural networks, the applications also use a wide range of numbers that may include numbers with increased bit-lengths (e.g., 32-bit floating-point numbers) that may require greater computational power or modifications to the neural networks. While computational support for numbers with the increased bit-lengths can provide increased accuracy for mathematical operations, providing support for the increased bit-lengths of these numbers can increase the complexity, size and cost of the processing elements in the systolic array. These increases can also affect the system processing speed and the system power consumption. Power consumption and the size of the systolic array can become highly important when a systolic array is required to support a wide range of numbers.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1A:
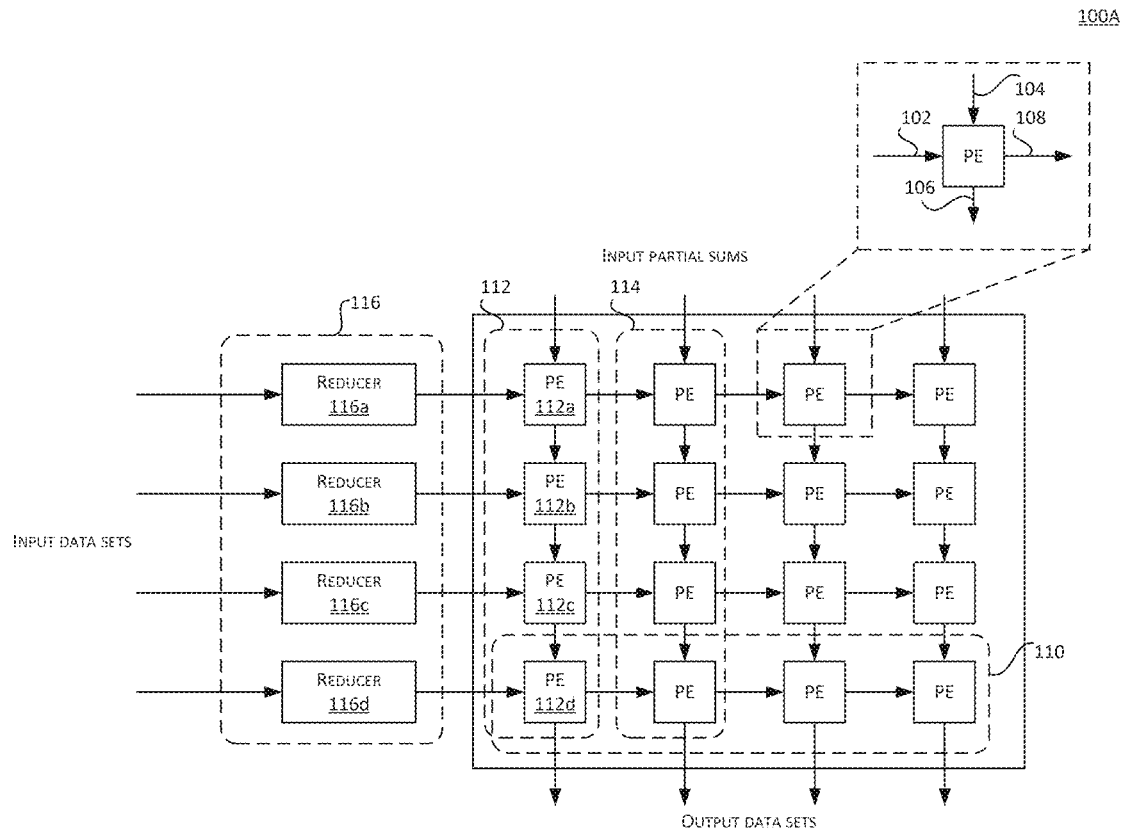
FIG. 1A illustrates an example 4×4 systolic array and an example column of reducers.

Generally described, the present disclosure relates to a systolic array that supports converting inputs of a higher bit-length than elements of the array natively support into one or more reduced inputs. Further, the input can be converted into a reduced input for single-pass reduced precision computations on inputs of a higher bit-length than elements of the array natively support. For example, the elements of the array may natively support single-pass computations on inputs of a particular bit-length of the systolic array and the systolic array may receive input from a reducer that reduces a bit-length of the input to match the bit-length natively supported by the elements during single-pass computations. The input may also be converted into multiple reduced inputs for multiple-pass full precision computations on inputs of a higher-bit length than elements of the array natively support. As described herein, the use of such a reducer to provide the reduced input to the systolic array can enable inputs to be given to a systolic array in an arbitrary bit-length, and the inputs may be programmatically adjusted to a particular bit-length (e.g., a highest bit-length supported during single-pass computations) such that a user need not be aware of the particular bit-length of the inputs to the processing elements of the systolic array. While a traditional systolic array may support different bit-lengths, the native support of single-pass computations for a higher bit-length can increase the size and power consumption of a systolic array. Further, this may affect processing of shorter bit-lengths. Therefore, traditional systolic arrays must balance the ability to do single pass computations for longer bit-lengths and the efficiency in processing shorter bit-lengths. This may result in systolic arrays that do not support longer bit-lengths due to a loss in efficiency in processing the shorter bit-lengths. Disclosed herein is a systolic array to support arbitrarily long bit-lengths at a reduced precision with a minimal loss in efficiency in comparison to processing the shorter bit-lengths. The systolic array may support inputs of arbitrary bit-lengths through a reducer that can drop excess bits from the significand of the input with an arbitrary bit-length and round the remaining bits. The dropping of the excess bits can enable the reducer to reduce the bit-length of the input to the maximum bit-length supported for single-pass computations by the systolic array, at the cost of reduced precision from the arbitrary bit-length. Further, the use of such a reducer can enable the systolic array that receives inputs of arbitrary bit-lengths to provide the same performance as achieved by a systolic array that receives inputs of fixed bit-lengths. Allowing a user to provide inputs with arbitrary (or non-fixed) bit-lengths may allow for lower-cost or lower-power elements to be used in a systolic array receiving inputs with a greater bit-length, while maintaining the overall performance of the systolic array due to the reduction in the bit-length of the input by the reducer. Further, by reducing the bit-length of the input (e.g., a 32-bit floating-point number), the reducer can provide a reduced precision version (e.g., a 22-bit floating-point reduced precision number) of the input. Therefore, the reducer can generate a reduced input from an input by reducing the bit-length of the input.

The reducer can generate multiple reduced inputs from the input. The systolic array may utilize the multiple reduced inputs in a multiple-pass multiply-accumulate operation in order to retain the accuracy of the input. For example, each combination of reduced inputs (e.g., where the reducer generates two reduced inputs for the input data element and the weight, input data element 1 and weight 1, input data element 2 and weight 1, input data element 1 and weight 2, and input data element 2 and weight 2) may be passed through the multiple-pass multiply-accumulate operation. By generating multiple reducing inputs with reduced bit-lengths from the input, the reducer can reduce the bit-length of the input to the maximum bit-length supported for single-pass computations by the systolic array, at the cost of reduced performance from the arbitrary bit-length. Further, the use of such a reducer can enable the systolic array that receives multiple reduced inputs (with the bit-length reduced from an original bit-length) to provide the same frequency, power advantage, and/or size advantage as achieved by a systolic array that receives inputs of fixed (e.g., standard) bit-lengths at a cost of lower performance as compared to a systolic array that operates on inputs of the original bit-length. Allowing a user to provide inputs with arbitrary bit-lengths may allow for lower-cost or lower-power elements (e.g., power elements that are configured to operate on standard bit-lengths) to be used in a systolic array receiving inputs with an arbitrary bit-length, while offering an increased precision as compared to systolic arrays receiving inputs with standard bit-lengths.

As described herein, a systolic array includes an array of processing elements (PEs), often arranged into two dimensions (e.g., columns and rows). The PEs of the array can be interconnected to enable data to pass through the PEs, which may conduct one or more mathematical operations on the data. For example, each PE may conduct a "multiply accumulate" operation, whereby inputs are fed horizontally into PEs of each row of the array, with each PE multiplying its respective input by a stored weight value and passing the product result to a PE in a subsequent row.

One illustrative use of a systolic array is in conducting an inference phase of a machine learning application. Machine learning generally requires at least two phases: a "learning phase," where a model is trained against training data, and an "inference phase," in which the trained model is applied to production data to predict a result. Inference phase applications are often latency sensitive, in that they operate in production environments. Moreover, inference phase applications—and particularly neural network applications—often require dense algebraic calculations, such as matrix multiplications. Systolic arrays may be used to accelerate inference-phase workloads in machine learning applications.

As noted above, the PEs of a systolic array may be divided into rows and columns. Each PE in the input layer may receive an element of an input data set, and scale the element with a weight (e.g., a filter) to indicate the element's degree of influence on the output. Each PE in the intermediate layers may receive at least one of the element and the weight (or filter) from another PE in the systolic array. Each PE in the intermediate layers may combine the elements received from a corresponding PE of the systolic array to compute a set of intermediate outputs. For example, each PE in the intermediate layers may compute a sum of element-weight products, and then produce the sum for application of an activation function to the sum (e.g., by a system separate from the PEs of the systolic array).

Generally, an input data set (e.g., an input feature map) may be fed, one input data element at a time, into its respective row of the systolic array, and passed from one PE to another PE in a given row starting, for example, from a leftmost PE. Each row receives a specific input data element and weight which are fed into a first PE, in a row, and subsequently passed to an adjacent PE located to the right of the first PE in the same row. Further, an input partial sum may be fed, one input partial sum at a time, into its respective column of the systolic array, and passed from one PE to another PE in a given column starting from a topmost PE. Generally, an input partial sum may be fed from a first PE, in one column, to an adjacent PE located directly beneath the first PE in the same column. Further, each column corresponds to a specific input partial sum which is passed through each PE of a given column. This can be done to allow each PE of a given column to perform a mathematical operation on the input partial sum to produce an output partial sum. As the input data element passes through a PE, the input data element can be multiplied with the weight value, and accumulated with the input partial sum. The first PE, in one column, is provided an input partial sum and generates an output partial sum based on the mathematical operations performed by that PE. The output partial sum is then provided to an adjacent PE in the same column as an input partial sum. The adjacent PE may then perform further mathematical operations before generating an output partial sum and passing the output partial sum to a further adjacent PE. In some embodiments, input data may be fed into a systolic array in a cascading fashion, with a PE in a first column and row (a position that may be designated as [0, 0], indicating row and column 0) receiving an input data element and an input partial sum in a first clock cycle. Thereafter, data can generally flow to subsequent rows and columns at a given rate (e.g., advancing one PE per cycle). For example, the output partial sum of the PE at [0, 0] can be fed to the PE at [1, 0], along with an input data element for row 1, such that the PE at [1, 0] performs a mathematical operations on that input data element and partial sum during a second clock cycle. Similarly, the input data element of PE [0, 0] can be passed to a PE of a subsequent column (e.g., at position [0, 1]), which can also be fed an input partial sum, such that the PE at [0, 1] conducts a mathematical operation on that input partial sum and input data element during the second clock cycle. Assuming a convention in which rows advance downward and columns advance to the right, data therefore can generally flow down and to the right during operation of the array. To assist in these calculations, PEs within the array may be provided with weights prior to the first clock cycle, or may receive weights in the first clock cycle or during calculations.

As machine learning applications and neural network applications proliferate, the demand for increased processing capabilities (e.g., the capability to handle larger numbers and/or more precise numbers) while achieving higher precision and maintaining performance has also increased. For example, the demand to support numbers with increased precision (e.g., the decimal places for a number and/or the significand for a number) has increased. Providing support for numbers with greater bit-lengths (e.g., 32-bit floating-point numbers) results in significant increases in integrated circuit die cost, power consumption, and circuit complexity in comparison to supporting only numbers with fixed (e.g., particular) bit-lengths (e.g., 16-bit floating-point numbers) as the traditional PE may not be capable of receiving numbers with bit-lengths exceeding a particular length. In a systolic array of hundreds or thousands of PEs, the added support for numbers with greater bit-lengths can cause an exponential increase in the integrated circuit die cost, power consumption, and circuit complexity. In some configurations, a PE supports performing mathematical operations on numbers with increased bit-lengths (e.g., 32-bits) with specialized circuitry configured for the larger bit-lengths. For example, a 32-bit floating-point systolic array may be specialized to perform mathematical operations on 32-bit floating-point (FP32) numbers. Such modifications may be particularly undesirable, may offer reduced performance, and may be costly and/or time consuming to implement. In other configurations, a PE does not support mathematical operations on numbers with bit-lengths exceeding a given size. For example, a 16-bit floating-point systolic array may not be capable of performing mathematical operations on numbers other than 16-bit floating-point (FP16) numbers. Such a lack of capabilities may be particularly undesirable and may offer reduced precision and/or reduced processing capabilities.

The present disclosure provides a systolic array with significant advantages over prior implementations. The present disclosure enables a systolic array to support arbitrary bit-lengths and maintain performance for shorter bit-lengths relative to an array that natively supports single-pass computations on longer-bit lengths, without significantly increasing power consumption of the array. Moreover, the present disclosure can enable the use of numbers with arbitrary bit-lengths (e.g., 32-bit floating-point numbers) as input to the systolic array (e.g., as input to a reducer of the array). Further, the reducer of the systolic array can programmatically adjust the inputs to a particular bit-length (e.g., a highest bit-length supported during single-pass computations) such that a user need not be aware of the particular bit-length of the inputs that the processing elements of the systolic array receive. These advantages are provided by the embodiments discussed herein, and specifically by creation of a systolic array utilizing one or more reducers that reduce one or more inputs to be provided to the systolic array. Further, the one or more reducers can generate multiple reduced inputs for a particular input in order to retain the accuracy of the original input.

The systolic array may support particular bit-lengths or data types. For example, the systolic array may support standard bit-lengths and/or data types (e.g., FP16 numbers). A consumer or user may be notified that the systolic array supports the particular bit-lengths or data types. Further, the reducer may receive inputs with arbitrary bit-lengths that do not correspond to the supported bit-lengths and/or data types (e.g., FP32 numbers). The reducer may convert the input with a non-supported bit-length into a reduced format (e.g., a reduced bit-length) and provide the input with the reduced format (e.g., 22-bit floating-point numbers) to the systolic array. The reduced format may be a non-standard format, a non-standard bit-length, and/or a non-standard data type. The consumer may not be notified that the systolic array supports inputs with the reduced format. Further, the input with the reduced format may have a higher accuracy or precision than inputs with the standard bit-lengths and/or data types and a higher performance than inputs with the arbitrary bit-lengths and/or data types as the arbitrary bit-lengths and/or data types may require specialized software and/or hardware to use these numbers. Further, the internal structure of the systolic array may be a superset of the components of each supported data type. For example, the internal structure of the systolic array may support a standard significand bit-length from A to B and a standard exponent bit-length from X to Y. Therefore, the maximum internally supported bit-length of the array may be 1+B+Y, where B and Y may be any number. Further, 1+B+Y may not correspond to a standard format (e.g., 1+B+Y may correspond to a 22-bit format) but the reducer may be able to downsize to this format for input to the array. Therefore, while a set of data types and/or bit-lengths may be exposed to the customer as supported by the systolic array, the reduced format (e.g., an intermediate bit-length between the arbitrary bit-lengths and the standard bit-lengths) may not be exposed to the customer and may correspond to a maximum format (e.g., bit-length) supported by the systolic array. This can enable an increased accuracy relative to inputs with standard bit-lengths and an increased performance relative to inputs with arbitrary bit-lengths.

As disclosed herein, each reducer (e.g., bit reducer, zeroer, etc.) assigned to a particular row of the systolic array may reduce one or more inputs (e.g., change one or more bits to zero) provided to the reducer and output one or more reduced inputs based at least in part on the one or more inputs. The provided inputs to the reducer may be numbers represented by a significand and an exponent. For example, the provided inputs may be in floating-point format. The one or more reduced inputs may be represented in a modified format with a reduced significand and an expanded exponent. The reduced input may have a sign bit, exponent bits, and significand bits. The most significant bit of the significand bits may be implied or hidden. Each reducer may include one or more of the following: a rounder, an exponent expander, a trailing bit reducer, and a multiplexer. The reducer can adjust the inputs provided to the reducer by maintaining the exponent of the original input and reducing the significand of the original input. The reducer may utilize the rounder to round the reduced input generated by the reducer based on the unreduced number. In some embodiments, the input may be pre-rounded to a given precision (e.g., the number of bits supported for single-pass computations) and the reducer can drop the resulting, trailing zeros to generate the reduced input. The rounder may use various rounding techniques to round the input (e.g., any standard rounding technique). Further, the reducer may utilize the exponent expander to expand a quantity of bits of an exponent portion of the number and the trailing bit reducer to reduce the quantity of bits of a significand portion of the number. Each reducer may contain any combination of these components. Each reducer may utilize the components contained in the reducer to produce a reduced input and provide the reduced input to the systolic array or the processing elements of the systolic array. By producing the reduced input, the reducer is enabled to reduce or adjust arbitrary bit-lengths (e.g., arbitrarily long bit-lengths) to bit-lengths supported during single-pass computations by the processing elements of the array, with a loss of precision from the original input of the arbitrary bit-length.

The reducer, by dropping bits and providing a single-pass computation through the systolic array, may lead to reduced precision (e.g., corresponding to the data of the dropped bits). For example, the final output may be a reduced output equal to the reduced weight times the reduced input data element. This precision may be recaptured by implementing additional passes through the array. For example, the reducer may convert a weight into a high reduced weight and a low reduced weight and an input data element into a high reduced input data element and a low reduced input data element. Further, the final output may include greater precision and may equal the low reduced weight multiplied by the low reduced input data element plus the low reduced weight multiplied by the high reduced input data element plus the high reduced weight multiplied by the low reduced input data element plus the high reduced weight multiplied by the high reduced input data element. While the multiple-pass computations may require a reduction in speed (e.g., based on the multiple passes through the array for a single total output), the multiple-pass computations may offer significant increases in precision over the single-pass computation for reduced precision. Therefore, the systolic array may be able support higher bit-lengths with hardware that natively supports a maximum bit-length that is lower than the higher bit-lengths by receiving inputs from reducers. Each reducer assigned to a particular row of the systolic array can receive a particular input data element and/or weight and generate multiple reduced inputs from the received input for multiple passes through (e.g., in) the systolic array for the original input. For example, the reducer can receive an input data element and generate multiple reduced input data elements based on the input data element in order to retain more precision of the original input data element as compared to reducing the input to a standard bit-length. The multiple reduced inputs may sum to generate the input. It will be understood that each input may be converted into any number of reduced inputs. The reducer may generate the reduced inputs as a first reduced input (e.g., a high reduced input) and a second reduced input (e.g., a low reduced input). The first reduced input may be based on the higher magnitude significand bits of the input and the second reduced input may be based on the lower magnitude significand bits. For example, the first reduced input may be based on the leftmost bits of the significand (e.g., the bits with the highest magnitude) and the second reduced input may be based on the rightmost bits of the significand (e.g., the bits with the lowest magnitude). Further, the significand of the input may be divided between the first reduced input and the second reduced input. For example, for a 23-bit significand, the first reduced input may be based on the first 11-bits of the significand as read from left to right (e.g., bits 22 to 12) and the second reduced input may be based on the next 12-bits of the significand as read from left to right (e.g., bits 11 to 0).

The reducer may generate the first reduced input by zeroing a number of low bits of the original input. Further, the reducer may generate the second reduced input by zeroing a number of high bits of the original input. In some embodiments, the reducer may determine that the input is a normal (e.g., not a denormal or subnormal) number by removing an implicit leading bit and renormalizing the reduced significand (e.g., the significand after zeroing the number of leading bits). The reducer may renormalize the input by shifting the significand a number of bits based on a number of leading zeroes. For example, a leading one of the reduced significand may be shifted into the implied bit position. The reducer may further adjust the exponent based on the number of bits shifted by the reducer. As adjusting the exponent may cause the exponent to be outside of the range of the current exponent, the reducer may expand the exponent (e.g., from 8-bits to 9-bits) such that the adjusted exponent can be represented in the expanded exponent. For example, the range of an 8-bit exponent may enable an exponent value between −126 and +127 and by expanding the exponent to a 9-bit exponent the reducer may enable an exponent value between −254 to +255. As renormalizing a 32-bit input may require an exponent as low as −149 (−126−23) to allow shifting across the full 23 bits of significand (e.g., where the exponent is "00000000" and the significand is "00000000000000000000001"), the reducer may therefore expand the 8-bit exponent of the input to generate the second reduced input. The reducer may expand the exponent of the first reduced input and the second reduced input. In some embodiments, the reducer may only expand the exponent of the second reduced input.

Each of the first reduced input and the second reduced input may be represented with a reduced (e.g., compressed) format (e.g., a 21-bit length). One or more reducers may produce reduced inputs for the input data element and the weight. The one or more reducers may further provide each combination of the reduced inputs to the systolic array for the multiply-accumulate operations. The systolic array may implement multiple-pass multiply-accumulate operations for the combinations of the reduced inputs to generate a total output. For example, the multiply-accumulate operations may be performed on a first reduced weight and a first reduced input data element, a first reduced weight and a second reduced input data element, a second reduced weight and a first reduced input element, and a second reduced weight and a second reduced input data element. For example, the final output may be equal to the first reduced weight multiplied by the first reduced input data element plus the first reduced weight multiplied by the second reduced input data element plus the second reduced weight multiplied by the first reduced input data element plus the second reduced weight multiplied by the first reduced input data element. An adder can sum the output of each multiply-accumulate operation (e.g., each partial multiply-accumulate operation) to generate the total output. By generating the multiple reduced inputs (e.g., inputs with reduced bit-lengths) from an input (e.g., an input with an arbitrary bit-length), the systolic array may be able to perform multiply-accumulate operations on the input (multiple reduced input versions of the input) without being required to support the arbitrary bit-length of the input. The systolic array may have certain frequency constraints, size constraints, etc. in order to maintain performance goals. In light of these constraints, traditional systolic arrays may be unable to support arbitrary bit-lengths. By generating multiple reduced inputs for a particular input, the systolic array may satisfy these constraints while generating outputs based on inputs with arbitrary bit-lengths. It will be understood that any number of reduced inputs may be generated from an original input. For example, a 64-bit floating-point number may be converted into 5 21-bit reduced floating-point numbers. Each of the reduced inputs may correspond to a portion of a significand portion of the original input. For example, a first reduced input may correspond to a first portion of the significand portion of the original input, a second reduced input may correspond to a second portion of the significand portion, a third reduced input may correspond to a third portion of the significand portion, etc. The particular portion of the significand portion of the original input for a particular reduced input may be identified by zeroing other portions of the significand portion.

In some embodiments, the reducer may contain or receive a signal from a multiplexer that selects among two or more inputs based on a control signal, such as an opcode or a data type indicator. For example, the multiplexer may identify a particular input for reduction (e.g., a weight or an input data element).

In some embodiments, a systolic array can have separate reducers that receive one of either the input data element or the weight and provide the corresponding reduced version of that input to the systolic array. Each processing element in the initial column of processing elements of the systolic array may receive multiple reduced inputs from one or more reducers. For example, a first processing element of the initial column may receive a reduced input data element from a first reducer and a reduced weight from a second reducer and a second processing element of the initial column may receive a reduced input data element from a third reducer and a reduced weight from a fourth reducer.

Each reducer may reduce the bit-length of numbers of 16-bits, 32-bits, or any number of bits. For example, a reducer may reduce the bit-length of a 32-bit floating-point number to a 22-bit floating-point number. In one embodiment, the 32-bit floating-point number has a 1-bit sign, an 8-bit exponent, and a 23-bit significand. From such a 32-bit floating-point number, the reducer may generate a reduced 20-bit floating-point number with a 1-bit sign, an 8-bit exponent, and an 11-bit significand. In some embodiments, the reducer may increase the bit-length of the exponent of the input in order to adjust the format of the reduced input to a format supported by the processing element. For example, the reducer can increase the exponent from 8 bits to 10 bits. In some embodiments, in order to reduce the bit-length of a particular number, the reducer can reduce a quantity of trailing bits of the significand of the number (e.g., the reducer can zero the low bits of the significand of the number). For example, the number may be a binary string "10101010101111111111111" and the reducer may zero the twelve trailing bits of the number to generate a reduced binary string "10101010101000000000000" and/or "10101010101."

Each reducer may further round the resulting reduced input to the systolic array. The reducer can round the reduced input to a particular precision or number of bits supported by the processing elements of a systolic array. For example, a reducer can round a number to generate a rounded number. By rounding the input to the systolic array, the systolic array can obtain a higher accuracy result for the calculations of the systolic array. In some embodiments, the reducer can round the reduced input. In other embodiments, the reducer can receive a rounded input (e.g., an input rounded by a separate system) and reduce the rounded input. The rounding may include one or more of stochastic rounding, rounding to nearest even, rounding to zero, rounding down, or rounding up. Further, a user, system, etc. may specify the rounding method for rounding the input (e.g., via a selection from a user interface).

The systolic array may have PEs that each include a 22-bit multiplier and a 34-bit adder. The 22-bit multiplier may operate on 22-bit reduced, floating-point numbers reduced by the reducer from 32-bit floating-point numbers to generate a multiplier product with a sign bit, ten exponent bits, and 23 significand bits. The multiplier product may include 24 significand bits where the most significant bit is implied or hidden. The 34-bit adder may operate on 34-bit numbers (e.g., the 34-bit multiplier product). Further, the adder may operate on 35-bit numbers where one bit is implied or hidden. In some embodiments, the systolic array may be include an n-bit multiplier and an m-bit adder wherein n may be any number and the n-bit multiplier and m-bit adder may be operate on x-bit reduced floating-point numbers. The variables n, m, x, and y may be any number where n is greater than x.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1A illustrates an example 4×4 systolic array 100A. The systolic array 100A illustratively includes four columns of PEs and four rows of PEs with four PEs in each row, and four PEs in each column. It will be understood that the systolic array 100A is simplified for the purpose of description, and that a systolic array 100A in accordance with the present disclosure may include any number of PEs in each row and column. Further, the number of PEs in each row may be different than the number of PEs in each column. It will be further understood that such a systolic array 100A may be logically organized in any number of rows and any number of columns. Further, the number of rows may be different than the number of columns. The systolic array 100A may be part of a neural network processor in a computer system. For example, the computer system may provide multi-tenant compute services for data processing applications such as an image recognition service, text-based data processing (e.g., processing of search queries), audio or video data processing, etc.

Each PE may include a respective row input bus 102, a respective column input bus 104, a respective column output bus 106, and a respective row output bus 108. A PE may receive inputs from a left PE of the same row (or from external circuitries) via the row input bus 102. The PE may also receive inputs from a PE of the same column above (or from external circuitries) via the column input bus 104. The PE may perform arithmetic computations based on the inputs, and transmit the result of the arithmetic computations to a PE of the same column below (or to the external circuitries) via the column output bus 106. The PE may also forward the inputs received via the row input bus 102 to a right PE of the same row via the row output bus 108.

The systolic array 100A may perform arithmetic computations, including multiplication and addition operations, for the processing elements of a neural network. For example, each PE may include arithmetic units such as a multiplier and an adder. In some embodiments, the multiplier and the adder may be a fused multiplier adder. In the example of FIG. 1A, each row of the PEs may handle one set of input data, and each column of the PEs may generate one set of output data based on the sets of input data received by each PE in a given column.

A column 112 of the PEs (the leftmost column) may receive four sets of input data, with each set of input data being handled by one row of the PEs. A column 116 of reducers may provide four sets of reduced input data to the column 112 of the PEs, with each set of input data being provided by one reducer which can increase the overall performance of the array as compared to traditional arrays. It will be understood that the column 116 of reducers may provide any number of sets of reduced input to the column 112 of the PEs. For example, the number of reducers and/or the number of sets of reduced input may be based on a quantity of PEs in a given column. In the example of FIG. 1A, the column 112 of the PEs includes four PEs (PE 112a, PE 112b, PE 112c, PE 112d) and the column 116 of reducers include four corresponding reducers (reducer 116a, reducer 116b, reducer 116c, reducer 116d). It will be understood that the column 116 of reducers may include any number of reducers. Each reducer in the column 116 of reducers may provide a set of reduced input data for a particular PE of the column 112 of PEs, wherein each set of reduced input data includes two or more reduced inputs. For example, the reducer 116a may provide a reduced input data element and a reduced weight to the PE 112a. Each reducer in the column 116 of reducers may convert the inputs into reduced inputs. For example, the reducer 116a may convert a 32-bit input data element into a reduced 22-bit input data element.

Each reducer in the column 116 of reducers may further select a reduced input to provide to each PE in the column 112 of the PEs. For example, each reducer in the column 116 of reducers may contain a multiplexer to select a reduced weight or a reduced input data element to provide to the PE. In some embodiments, each reducer 116a-116d may be implemented as multiple reducers (e.g., a first reducer and a second reducer). Further, the first reducer and the second reducer may provide one or more inputs to the column 112 of the PEs. For example, a first reducer of the reducer 116a may provide a reduced input data element to the PE 112a and a second reducer of a reducer 116a may provide a reduced weight to the PE 112a. In some embodiments, a PE may receive a reduced input (e.g., a reduced input data element) and a non-reduced input (e.g., a non-reduced weight) for arithmetic operations.

Each PE in the column 112 may obtain, from the corresponding input data set received via the row input bus 102, the reduced input data element and the reduced weight. Each PE in the column 112 may multiply the reduced input data element with the reduced weight to generate a scaled input. The scaled inputs generated by the PEs within any column (including the column 112) can be accumulated by the adder of each PE. For example, a PE 112a (of the column 112) may generate a first scaled input (from the first input data set), wherein the first scaled input may be based on the outputs of the adder. For example, the adder may generate a first output partial sum and the PE 112a may generate a first scaled input based at least in part on the first output partial sum. The PE 112a may transmit the first scaled input to a PE 112b via the column output bus 106 as a partial sum. The PE 112b may also generate a second scaled input (from the second input data set) and add the second scaled input to the partial sum. The updated partial sum, accumulated with the first scaled input and the second scaled input, is then transmitted to a PE 112c via the column output bus 106. The partial sums are updated and propagated across the column 112, and a PE 112d may generate a sum of the scaled inputs from the four input data sets.

The sum generated by the PE 112d may correspond to an output data set, and may be fed back to the leftmost PEs after going through an activation function. Moreover, each PE in the column 112 can also propagate the input data sets to other PE columns (e.g., a column 114), which can scale the input data sets with a different set of weights from the column 112. Each column of the PEs can perform the arithmetic operations (multiplications and additions) to generate the output data elements for other processing elements in parallel. In the example of FIG. 1A, the systolic array 100A can generate output data elements for four PEs corresponding to the four columns of the systolic array 100A.

The systolic array 100A may perform convolution computations in multiple waves. In one embodiment, a wave represents a stream of input data elements processed while reusing the same weights in the systolic array 100A. For example, the respective weights may have been pre-loaded in each PE in the systolic array 100A, sequentially or in parallel prior to starting a wave computation. The partial sums generated by the PEs may correspond to a single wave. As the PEs of the systolic array 100A perform arithmetic operations for the convolution computations, dynamic power dissipated by all the multipliers in the PEs may be significant. This problem may be further exacerbated for a systolic array comprising a large number of PEs (e.g., several thousands). The arithmetic operations performed by a PE are further explained with reference to FIG. 2A and FIG. 2B.

Figure 1B:
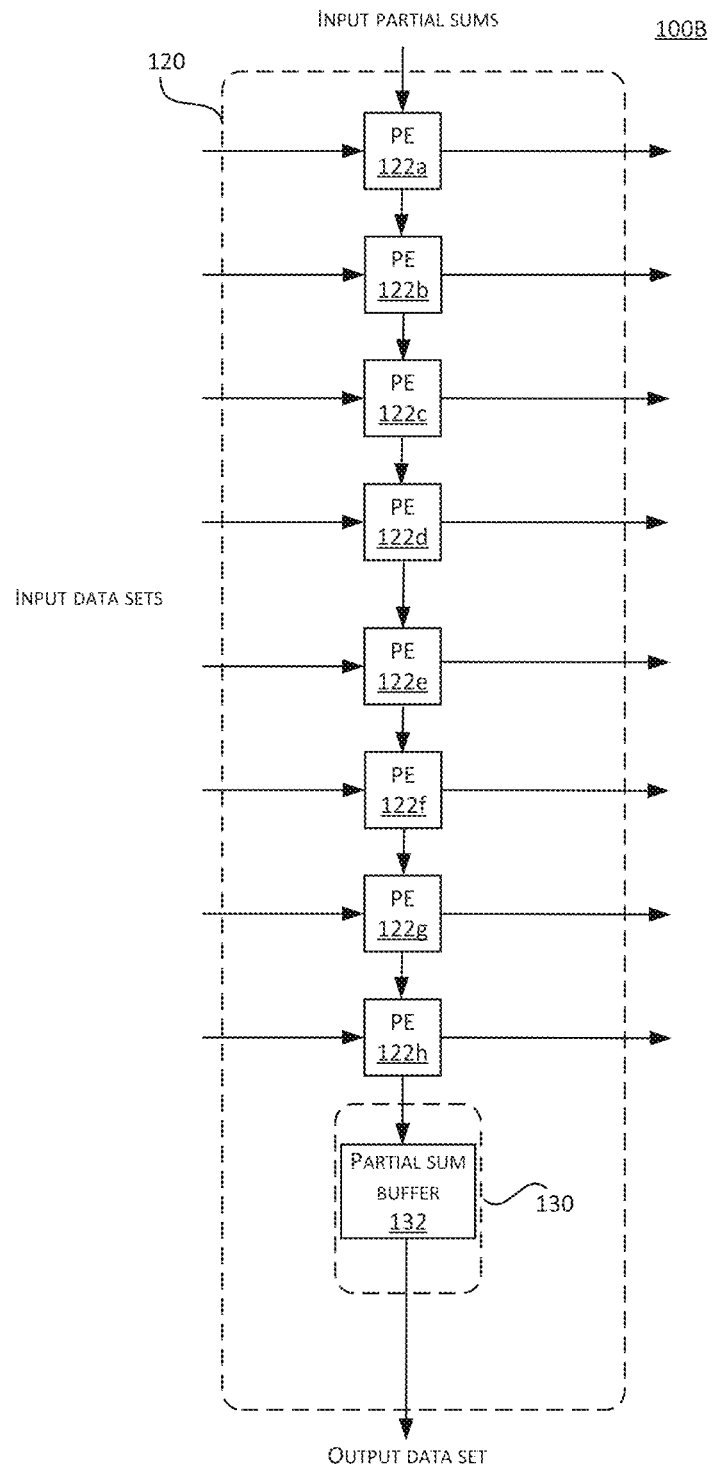
FIG. 1B illustrates an example 1×8 column of a systolic array.

As noted above, an input may be reduced to generate a reduced input that is provided to the systolic array. Further, the input may be reduced into multiple reduced inputs for multiple single reduced precision computations that are combinable into a higher precision computation. The systolic array may include an aggregator in order to combine partial outputs into the higher precision output (e.g., a higher precision output relative to the single-pass computation). FIG. 1B illustrates an example configuration of an eight-PE column 120 within a systolic array 100B. The array 100B may be similar to the array 100A of FIG. 1A, but illustratively includes 8 rows and one column. Specifically, as shown in FIG. 1B, an input may be converted into multiple reduced inputs and each PE may perform a multiply-accumulate operation on each combination of reduced inputs and provide a partial output partial sum to corresponding adjacent PE. By varying the number of reduced inputs, the number of partial output partial sums generated and the number of multiply-accumulate operations may be similarly varied. Thus, each higher bit-length input may be converted into any number of reduced inputs with lower bit-lengths by the reducer for the systolic array in order to satisfy the bit-lengths natively supported by the systolic array.

To facilitate calculation of a total output sum for a column, the column 120 in FIG. 1B includes an aggregator 130. The aggregator 130 may be located within or outside the array 100B. For each pass through the array for a given input (e.g., for each combination of reduced inputs associated with a particular input), the aggregator 130 may store and sum the partial outputs. The aggregator 130 may add the partial sums generated for each combination of reduced inputs. The aggregator 130 may calculate a running sum (e.g., by iteratively adding the partial output sums for a given set of reduced inputs) for output as the total output sum. For example, the aggregator 130 may include a partial sum buffer 132.

In some embodiments, the systolic array may identify a particular order to pass the reduced inputs and the reduced weights through the array. For example, the reduced inputs and the reduced weights may be passed first through the array in order to retain the accuracy of the numbers with a lower magnitude. Therefore, the reduced inputs with lower magnitude may be accumulated first in order to retain accuracy. For example, the product of a low reduced input data element and a low reduced weight may be added to the product of a high reduced input data element and a low reduced weight (or a low reduced input data element and a high reduced weight) to generate a first partial output. Further, the first partial output may be added to the product of a low reduced input data element and a high reduced weight (or a product of the high reduced input data element and a low reduced weight) to generate a second partial output. Further, the second partial output may be added to the other of the product of the low reduced input data element and the high reduced weight or the product of the high reduced input data element and the low reduced weight to generate a third partial output. The third partial output may be added to the product of a high reduced input data element and a high reduced weight to generate a total output. By adding the reduced inputs with the lower magnitude first, the precision of the reduced inputs may be maintained in order to minimize the loss of precision of the low reduced inputs when added to the high reduced inputs.

While an aggregator 130 providing pairwise summation is shown in FIG. 1B, the aggregator 130 may alternatively implement other aggregation techniques. In some implementations, the column 120 of the PEs may not include an aggregator 130 and may provide an output data set consisting of partial sums for each combination of reduced inputs. In one implementation, the column 120 may not include an aggregator 130 and the column 120 may provide multiple partial output data sets. In some embodiments, the multiple output data sets may each correspond to a partial sum generated for each combination of reduced inputs of the column 120. In another implementation, the aggregator 130 may provide more or less output data sets. The aggregator 130 may provide one or more output data sets each corresponding to one or more partial sums. In some instances, output of the aggregator 130 may be configurable according to a desired use of the array, and may therefore accept instructions as to what outputs should be provided. In some instances, the aggregator 130 may provide a combination of the above outputs (e.g., by providing the four partial sums corresponding to each combination of reduced inputs, as well as a final sum for the non-reduced input). In some embodiments, a portion of the aggregation of the partial sums may occur within the systolic array. For example, the systolic array may add (using one or more components) a first partial sum and a second partial sum to generate a third partial sum and may add a fourth partial sum and a fifth partial sum to generate a sixth partial sum. Further, the systolic array may provide the third partial sum and the sixth partial sum for accumulation to the aggregator 130.

Figure 2A:
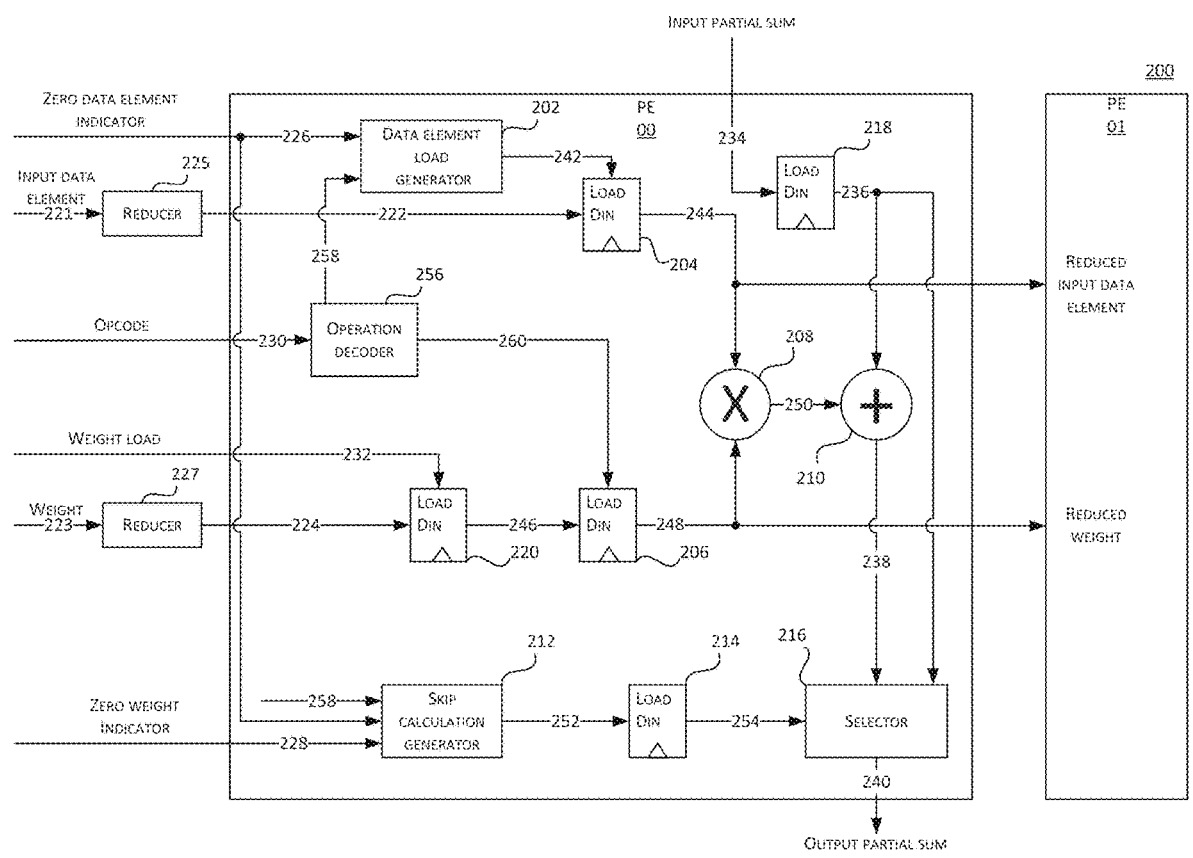
FIG. 2A illustrates a processing element for neural network computations with the inputs entering through separate reducers, according to certain examples of the disclosed technologies.
Figure 4A:
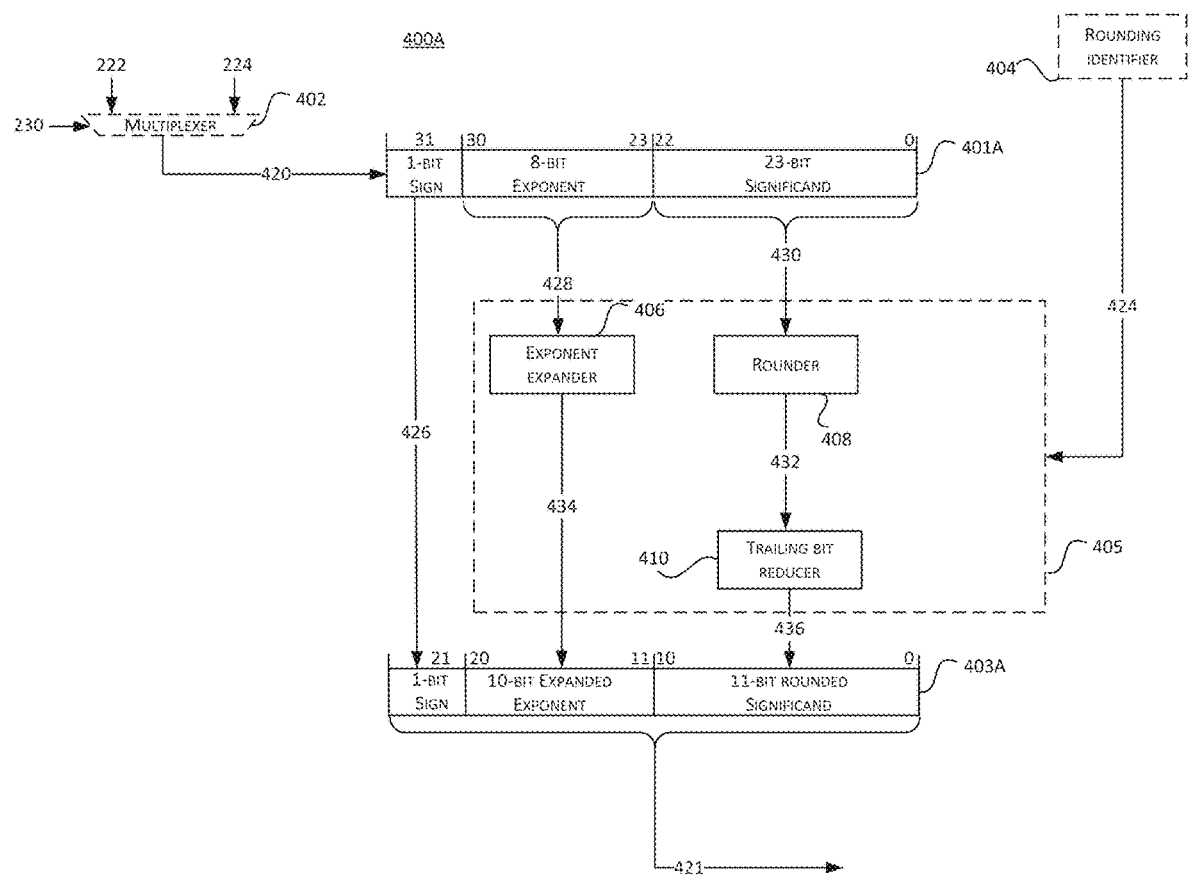
FIG. 4A illustrates a reducer showing the selection of an input to be reduced and rounded, according to some examples of the disclosed technologies.
Figure 4B:
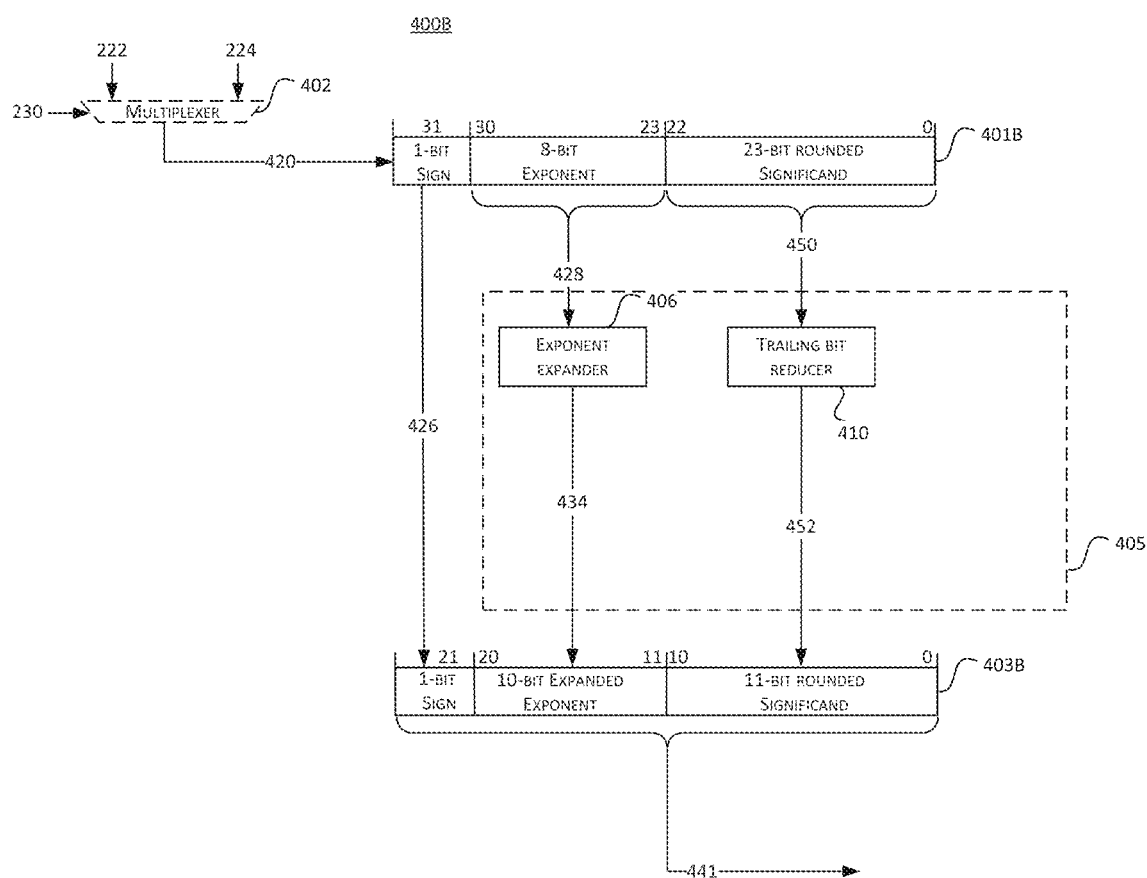
FIG. 4B illustrates a reducer showing the selection of a rounded input to be reduced, according to some examples of the disclosed technologies.

FIG. 2A illustrates a PE 00 in a systolic array for neural network computations, according to certain embodiments of the disclosed technologies. The PE 00 may be part of a systolic array similar to the systolic array 100A in FIG. 1A. FIG. 4A and FIG. 4B show additional details of the reducers 225, 227 of FIG. 2A. Some embodiments may be described with reference to neural networks, however, it will be understood that certain embodiments may be used in other applications, e.g. pattern recognition, image processing, audio processing, video processing, etc., without deviating from the scope of the technologies.

The systolic array 200 includes reducers 225, 227 and a plurality of processing elements including PE 00 and PE 01. The PE 00 may include one or more of a data element load generator 202, an input data element register 204, a weight register 206, a multiplier 208, an adder 210, a skip calculation generator 212, a skip calculation register 214, a selector circuit 216, an input partial sum register 218, a cached weight register 220, and an operation decoder 256. The PE 00 may receive one or more of a reduced input data element 222, a reduced weight 224, a zero data element indicator 226, a zero weight indicator 228, an opcode 230, a weight load 232, and an input partial sum 234 to perform the convolution computations according to some embodiments.

The PE 00 may be connected to a first reducer 225 and a second reducer 227. The first reducer 225 may receive a first input (such as input data element 221), and the second reducer 227 may receive a second input (such as weight 223). The first reducer 225 may convert the first input into a first reduced input, and the second reducer 227 may convert the second input into a second reduced input. The first reducer 225 may provide the PE 00 with the reduced input data element 222 (e.g., a reduced version of the input data element 221). Further, the second reducer 227 may provide the PE 00 with the reduced weight 224 (e.g., a reduced version of the weight 223). In some embodiments, one or more of the first reducer 225 or the second reducer 227 may round the input and/or the reduced input. The rounding may be based on a rounding method identified by the system, a user, etc. (e.g., a user input may specify a particular rounding method). In other embodiments, one or more of the first reducer 225 or the second reducer 227 may reduce a pre-rounded input (e.g., the pre-rounded input may be rounded by a system local to or remote to the systolic array). Further, the first reducer 225 and the second reducer 227 may convert one or more floating-point inputs into a reduced representation. The floating-point inputs may include bit-lengths of 32-bits, 64-bits, or any number of bits.

In some embodiments, one or more of the first reducer 225 or the second reducer 227 may detect when one or both of the input data element 221 and the weight 223 exceed a particular bit-length. For example, the first reducer 225 may determine if the input data element 221 exceeds 22-bits and the second reducer 227 may determine if the weight 223 exceeds 22-bits. Further, a user, the system, etc. may provide the particular bit-length for comparison with the bit-length of the input data element 221 and the weight 223. Upon determining that a particular input (e.g., the input data element 221) exceeds the identified bit-length, one or more of the first reducer 225 or the second reducer 227 can generate a reduced input (e.g., a reduced input data element 222).

In order to reduce the bit-length of the input data element 221 and/or the weight 223, the first reducer 225 and/or the second reducer 227 can reduce the bit-length of a significand portion of the particular length. The first reducer 225 and/or the second reducer 227 can reduce the bit-length of the significand portion to match the maximum bit-length of the significand supported by components of the systolic array (e.g., the multiplier of each processing element). For example, the first reducer 225 and/or the second reducer 227 can reduce the bit-length of a significand portion of the input from 23-bits to 11-bits. In some embodiments, the first reducer 225 and/or the second reducer can expand an exponent portion of the input to a particular format required by the multiplier. For example, the first reducer 225 and/or the second reducer 227 can expand the bit-length of the exponent portion of the input from 8-bits to 10-bits.

In the event that the significand portion of one or both of the input data element 221 and the weight 223 are already reduced, the first reducer 225 and the second reducer 227 can still extend the number of bits used to represent the exponent portion of each. Accordingly, subsequent arithmetic circuits such as the multiplier 208 can perform computations on numbers of a single format (e.g., 22-bit floating-point format).

The PE 00 may receive the reduced input data element 222 via a first input port. The reduced input data element 222 may be an input data set, or any array of input data elements. The PE 00 may receive one reduced input data element at a time, in uniform time periods, from the input dataset. For example, a uniform time period may correspond to a clock cycle. The input data set may be similar to an input feature map comprising input feature map elements. As an example, the input data set may correspond to an input image, an audio clip, a video clip, a text portion, or any other data which may be provided for data processing to identify a certain pattern or an object. In some instances, the input data set may be an intermediate output dataset, which has gone through an activation function, e.g., ReLu or Sigmoid, as discussed with reference to FIG. 1A. Each reduced input data element 222 may a floating-point data type or any suitable data type. Each reduced input data element 222 may include 22-bits, 21-bits, 20-bits, or any suitable number of bits. The reduced input data element 222 may be stored in the input data element register 204 for a period of time.

The PE 00 may receive the reduced weight 224 via a second input port. In some embodiments, the reduced weight 224 may belong to a set of weight values corresponding to a convolution filter. The reduced weight 224 may be pre-loaded in the PE 00 prior to receiving the reduced input data element 222. In some embodiments, the PE 00 may receive one reduced weight value at a time, in uniform time periods, from the set of reduced weight values, to pre-load each PE in a given row with a respective reduced weight value. The PE may pass the reduced weight value to the next PE in the respective row until each PE in the given row has been pre-loaded. Each PE may cache the respective reduced weight value to use for computations with the reduced input data elements. Each reduced weight 224 may be a floating-point data type or any suitable data type. Each reduced weight 224 may include 22-bits, 21-bits, 20-bits, or any suitable number of bits. The reduced weight 224 may be stored in a cached weight register 220 for a period of time.

The PE 00 may receive the input partial sum 236 for a current operation via a third input port. In some embodiments, the input partial sum 236 can be a 16 bit, 18 bit, 32, bit, 33 bit, 34 bit number or have any number of bits.

The PE 00 may receive the zero data element indicator 226 for a current operation via a fourth port. The zero data element indicator 226 may include a single bit or multiple bits. The zero data element indicator 226 may indicate (or be used to indicate) whether the reduced input data element 222 is zero. The zero data element indicator 226 may indicate whether the input data element 221 is zero. For example, a value of "1" for the zero data element indicator 226 may indicate that the reduced input data element 222 associated with the zero data element indicator 226 is zero, and a value of "0" for the zero data element indicator 226 may indicate that the reduced input data element 222 associated with the zero data element indicator 226 is not zero. Further, a "0" may correspond to a logical zero or a logical low, and a "1" may correspond to a logical one or a logical high. For example, the logical zero may be represented by a first range of voltage levels (e.g., 0-2 volts), and the logical one may be represented by a second range of voltage levels (e.g., 3-5 volts). It will be understood that other implementations to represent a "0" value and a '1' value are possible without deviating from the scope of the disclosed technologies. The zero data element indicator 226 may be generated by a circuit external to the PE 00, and passed to all the PEs in the same row sequentially, in the uniform time periods.

The PE 00 may receive the zero weight indicator 228 via a fifth port. The zero weight indicator 228 may include a single bit or multiple bits. The zero weight indicator 228 may indicate whether the reduced weight 224 associated with the zero weight indicator 228 is zero. The zero weight indicator 228 may also indicate whether the weight 223 associated with the zero weight indicator 228 is zero. For example, a value of "1" for the zero weight indicator 228 may indicate that the reduced weight 224 is zero, and a value of "0" for the zero weight indicator 228 may indicate that the reduced weight 224 is not zero. The zero weight indicator 228 may be generated by a circuit external to the PE 00, and passed to all the PEs in the same row sequentially along with the reduced weight 224.

The weight load 232 may load the reduced weight 224 into the cached weight register 220 to provide a cached weight 246. The weight load 232 may be asserted to cache the reduced weight 224 for the PE 00 in the cached weight register 220 before the reduced input data element 222 is fed into the array. As the weights are shifted into the array to pre-load each PE with a respective weight value, the weight load 232 may be asserted for each PE at certain time periods in order to pre-load each PE with the appropriate weight value.

The operation decoder 256 may decode the opcode 230 to determine an operation to be executed by the PE 00 for different instructions represented by different opcode values. In some embodiments, a first opcode value may correspond to an instruction to shift the reduced weights from one PE to another in the systolic array. A second opcode value may correspond to an instruction to start the arithmetic computations by the PE. For example, once the reduced weights have been pre-loaded in the systolic arrays, the reduced input data elements may be read from the memory and the arithmetic computations may be performed as the reduced input data elements pass through the array. A third opcode value may correspond to an instruction to execute NOPs. The NOPS may be used to space two systolic array instructions, or when there are no reduced input data elements to be read from the memory. For example, the NOPs may be used to space the instructions to shift the reduced weights, and the instructions to start the arithmetic computations. For example, for a 4×4 array, it may take up to 15 cycles to shift the reduced weights into all the PEs in the array before starting the arithmetic computations so 15 NOP cycles may be needed. The operation decoder 256 may decode the opcode 230 to generate a NOP 258, and the start computations signal 260. The operation decoder 256 may provide the start computations signal 260 to the weight register 206 that is connected to the multiplier 208 and to the adder 210. The operation decoder 256 may also provide the start computations signal 260 to the multiplier 208. The opcode 230 may include any suitable number of bits, e.g., two, four, etc. In some embodiments, the operation decoder 256 can also decode the opcode to determine a data type to provide a data type control signal.

In some embodiments, the reduced input data element 222, the reduced weight 224, the opcode 230, the zero data element indicator 226, and the zero weight indicator 228 may belong to the row input bus 102, as discussed with reference to FIG. 1A. In other embodiments, a splitter (not shown) may be used in the PE 00 to split the row input bus 102 into different internal buses to carry the reduced input data element 222, the reduced weight 224, the opcode 230, the zero data element indicator 226, and the zero weight indicator 228 within the PE 00. For example, the reduced input data element 222 and the reduced weight 224 may belong to a first row input bus and the opcode 230, the zero data element indicator 226, and the zero weight indicator 228 may belong to a second row input bus.

The data element load generator 202 may generate a data load signal 242 that may be used to allow the input data element register 204 to skip storing of the reduced input data element 222 in certain conditions. In some embodiments, the reduced input data element 222 may be loaded into the input data element register 204 when the data load signal 242 is asserted based on the zero data element indicator 226 and the NOP 258. The data load signal 242 may be asserted when the zero data element indicator 226 corresponding to the reduced input data element 222 is "0" and the opcode 230 does not indicate a NOP (e.g., the NOP 258 is "0"). The data load signal 242 may not be asserted when the zero data element indicator 226 corresponding to the reduced input data element 222 or the NOP 258 is "1." The data element load generator 202 may be implemented using an OR, NOR, NAND, or any suitable circuit.

The input data element register 204 may store the reduced input data element 222, or skip storing of the reduced input data element 222 to provide a stored input data element 244 based on the data load signal 242 for a current operation. In some embodiments, the input data element register 204 may store a Din input if a load input is "1", and may hold the previous value if the load input is "0." For example, if the data load signal 242 is "1," the input data element register 204 may store a new value for the reduced input data element 222, and if the data load signal 242 is "0," the input data element register 204 may skip storing the new value for the reduced input data element 222. Thus, in some instances, the input data element register 204 may only store non-zero value of the reduced input data element 222. According to certain embodiments, skipping the storing of the new value by the input data element register 204 may result in not toggling the stored input data element 244 and holding the previous value of the stored input data element 244.

The weight register 206 may store the cached weight 246 to provide a stored weight value 248 based on the start computations signal 260. In some embodiments, the weight register 206 may store a Din input if a load input is "1," and may hold the previous value if the load input is "0." For example, if the start computations signal 260 is asserted (e.g., the start computations signal 260 is "1"), the cached weight 246 may be loaded into the weight register 206, else the weight register 206 may hold the previous value. Thus, the reduced weight 224 previously loaded into the cached weight register 220 using the weight load 232 may be shifted into the weight register 206 at the start of the arithmetic computations. In some embodiments, the stored weight value 248, once loaded at the start of the arithmetic computations, remains unchanged as the input data element is fed into the PE 00, one element at a time, for computations corresponding to one or more waves through the systolic array.

The PE 00 may provide the stored input data element 244 to a PE 01 based on the data load signal 242 for a current operation. The PE 01 may receive the stored input data element 244 via a first port as a reduced input data element 222. In some embodiments, the input data element register 204 may store a Din input if a load input is "1", and may hold the previous value if the load input is "0." The PE 00 may provide the stored weight value 248 to a PE 01 based on a start computations signal 260. The PE 01 may receive the stored weight value 248 via a second port as a reduced weight 224. In some embodiments, the weight register 206 may store a Din input if a load input is "1," and may hold the previous value if the load input is "0."

The multiplier 208 may perform a multiplication operation between the stored input data element 244 and the stored weight value 248. The multiplier 208 may generate a product 250 based on the multiplication operation. The multiplier 208 may receive inputs of a fixed bit-length. For example, the multiplier 208 may receive 22-bit floating-point inputs. Therefore, the reducer can enable the systolic array to receive inputs of an arbitrary bit-length and provide the multiplier 208 with a reduced input of a bit-length supported by the multiplier 208. In some embodiments, the product 250 may be an integer product, a floating-point product, or any other product. Further, the multiplier 208 may generate a product 250 of 8-bits, 16-bits, 18-bits, 32-bits, 34-bits, or any other number of bits. The multiplier 208 may be implemented using a multiplier circuit. The multiplier 208 may perform floating-point multiplication, integer multiplication, or multiplication involving any other data type. The multiplier 208 may be implemented using a 16-bit multiplier data path, an 18-bit multiplier data path, a 22-bit multiplier data path, or a multiplier data path with any number of bits. The multiplier 208 may support at least n-bits operations, wherein n is greater than or equal to the number of bits in the input (e.g., the input data element).

Figure 5:
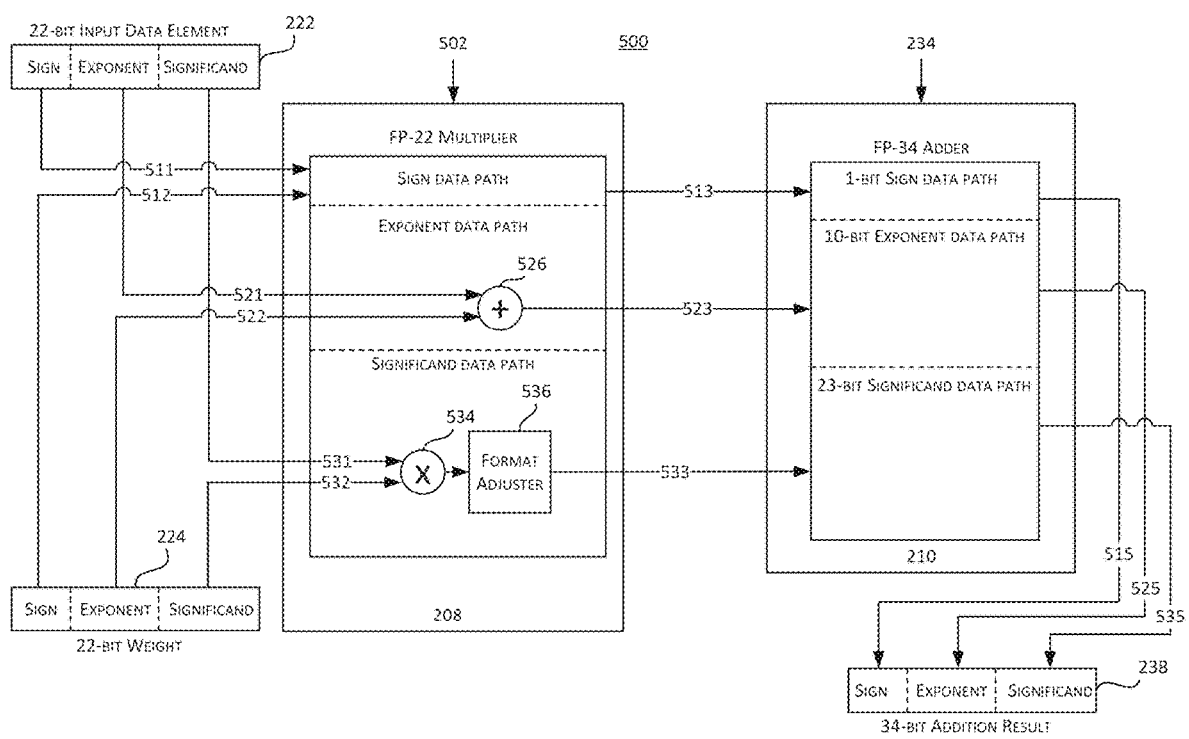
FIG. 5 illustrates a multiply accumulate datapath for neural network computations, according to certain examples of the disclosed technologies.

The multiplier 208 may contain multiple data paths, for example, as further discussed with respect to FIG. 5. With respect to FIG. 2A, the multiplier 208 may contain separate data paths for computing a sign bit, a significand, and an exponent. It will be understood that the significand data path and the exponent data path may include data of any number of bits.

The multiplier 208 may provide the product 250 to the adder 210. The adder 210 may perform an addition operation on the product 250 and the stored input partial sum 236 to provide an addition result 238. The adder 210 may be implemented using an adder circuit. The adder 210 may perform floating-point addition, integer addition, or non-integer addition. The adder 210 may perform addition on inputs with 8-bits, 16-bits, 18-bits, 32-bits, 34-bits, or any number of bits. The adder 210 may be implemented using a 16-bit adder data path, an 18-bit adder data path, a 32-bit adder data path, a 34-bit adder data path, or an adder data path with any number of bits. In one embodiment, the adder 210 is implemented with given bit-size (e.g., with an adder data path of the given bit-size), which may represent a maximum bit size of an expected input to the array. In some embodiments, each processing element may include an adder with a larger bit-size and a multiplier with a smaller bit-size as adders of increased bit-sizes may be more cost efficient than multipliers of the same increased bit-sizes. Therefore, this disclose enables a systolic array to support, at reduced precision, larger bit-sizes using lower bit-size multipliers. In another embodiment, the adder 210 may be implemented with a smaller bit size than a maximum bit size of an expected input to the array. The adder 210 may support at least m-bits operations where m is equal to or larger than the value of the multiplier data path. The adder data path may be a superset of the multiplier data path.

The multiplier 208 and the adder 210 may provide a fused multiply-accumulate operation. The multiplier 208 and the adder 210 may be integrated together to perform a single step multiply add operation. In some embodiments, no rounding may be performed on the output of the multiplier 208 prior to providing the output to the adder 210. Further, the multiplier 208 may provide an accurate product 250 to the adder 210. In other embodiments, the PE 00 may perform rounding on the output of the multiplier 208.

The selector circuit 216 may receive the addition result 238, the input partial sum 236, and the stored skip calculation indicator 254. The selector circuit 216 may select either the addition result 238 or the input partial sum 236 to provide as an output partial sum 240 via a sixth port. In some embodiments, the selector circuit 216 may contain at least one multiplexer, the multiplexer may select the addition result 238 or the input partial sum 236 to be produced. The selector circuit 216 may select either the addition result 238 or the input partial sum 236, based on the stored skip calculation indicator 254, to provide as an output partial sum 240 via a sixth port. According to some embodiments, when a value of either the reduced input data element 222 or the reduced weight 224 for a current operation is zero, or the NOP 258 is asserted, the addition result 238 since the product 250 may hold a value for the previous operation. In such cases, the stored skip calculation indicator 254 may allow bypassing the addition result 238, and selecting the input partial sum 236 to provide as the output partial sum 240. For example, when the stored skip calculation indicator 254 provides a skip calculation signal of "1", the input partial sum 236 may be selected as the output partial sum 240 for a systolic cycle, and when the stored skip calculation indicator 254 provides a skip calculation signal of "0", either the addition result 238 may be selected as the output partial sum 240 for the systolic cycle.

Figure 2B:
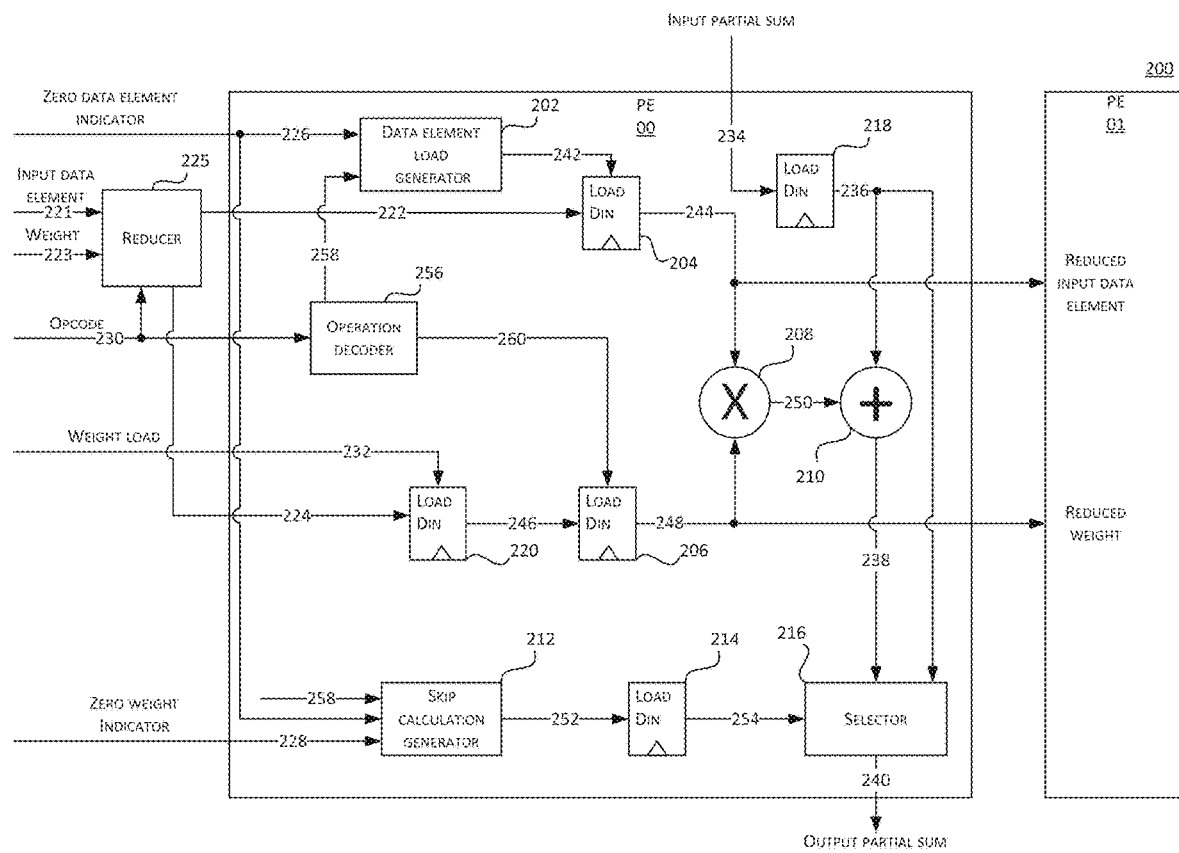
FIG. 2B illustrates a processing element for neural network computations with the inputs entering through the same reducer, according to certain examples of the disclosed technologies.

FIG. 2B illustrates the figure shown in FIG. 2A with a shared reducer 225 replacing the first reducer 225 and the second reducer 227. The shared reducer 225 may receive the input data element 221 and the weight 223. The shared reducer 225 may also receive the opcode 230. The shared reducer 225 may perform a selection operation on the input data element 221 and the weight 223 based at least in part upon the opcode 230. In some embodiments, the shared reducer 225 will produce a reduced input based at least in part upon the opcode 230. For example, when the opcode 230 is a particular value, the shared reducer 225 may reduce the weight 223 and provide the reduced weight 224 to the PE 00. Further, when the opcode 230 provides some other set value, the shared reducer 225 may reduce the input data element 221 and provide the reduced input data element 222 to the PE 00. Therefore, the shared reducer 225 can reduce the bit-length of the significand portion of both the input data element 221 and the weight 223 to match the maximum bit-length of the significand supported by components of the systolic array (e.g., the multiplier of each processing element). In some embodiments, the shared reducer 225 may receive multiple input data elements and/or multiple weights and produce multiple reduced input data elements and/or multiple reduced weights. For example, the shared reducer 225 can produce any number of reduced input data elements (e.g., four) and/or any number of reduced weights (e.g., four).

The shared reducer 225 may use a multiplexer to select between the input data element 221 and the weight 223. In some embodiments, the reduced input data element 222 and the reduced weight 224 may be delivered to the PE 00 on separate buses. In other embodiments, the reduced input data element 222 and the reduced weight 224 may be delivered on the same bus. Further, the shared reducer 225 may reduce both the input data element 221 and the weight 223 in the same clock cycle and provide the reduced input data element 222 and the reduced weight 224 to the PE 00. In some embodiments, the shared reducer 225 may reduce the weight 223 and provide the reduced weight 224 to the PE 00 during a clock cycle. The shared reducer 225 may then reduce the input data element 221 and provide the reduced input data element 222 to the PE 00 during a second clock cycle.

Figure 3:
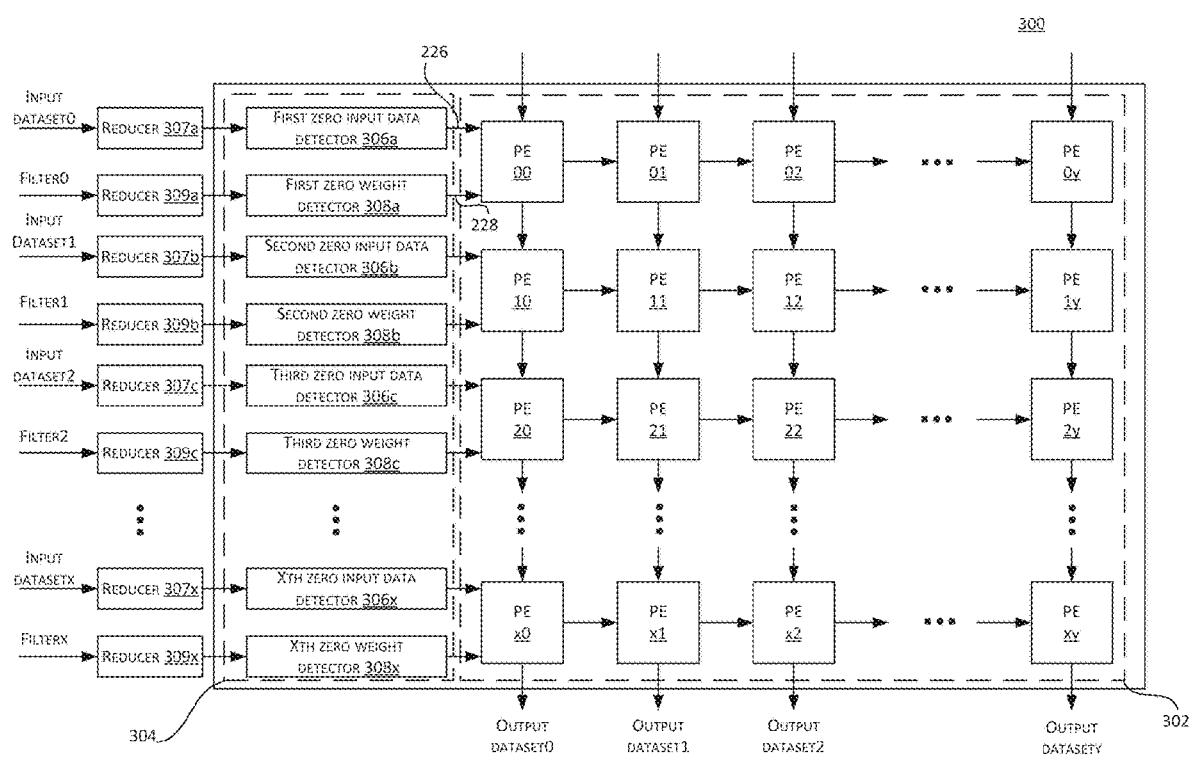
FIG. 3 illustrates an apparatus including zero detector circuits for reduced input data elements and reduced weights entering a systolic array for neural network computations, according to certain examples of the disclosed technologies.

FIG. 3 illustrates an apparatus 300 including zero detector circuits for reduced input data elements and reduced weights entering a systolic array for neural network computations, according to certain embodiments of the disclosed technologies.

The apparatus 300 may include a two-dimensional systolic array 302 comprising PEs arranged into rows and columns. The systolic array 302 may be similar to the systolic array 100A in FIG. 1A. A first row of the systolic array 302 may include PE 00, PE 01, PE 02, ..., PE 0y, a second row of the systolic array 302 may include PE 10, PE 11, PE 12, ..., PE 1y, a third row of the systolic array 302 may include PE 20, PE 21, PE 22, ..., PE 2y, and an Xth row of the systolic array 302 may include PE x0, PE x1, PE x2, ..., PE xy. The x and y may include positive integers, e.g., 32, 64, 128, or any suitable number. Each PE of the systolic array 302 may be similar to the PE 01, and include means to perform arithmetic computations on reduced inputs using power efficient methods, as discussed with reference to FIG. 2A, FIG. 2B.

In certain embodiments, a first (e.g., leftmost) PE in each row of the systolic array 302 may be coupled to a respective zero input data detector circuit to detect a zero value on an input data element, and a respective zero weight detector circuit to detect a zero value on a weight value entering the systolic array 302. For example, the PE 00 in the first row may be coupled to a first zero input data detector 306a and a first zero weight detector 308a, the PE 10 in the second row may be coupled to a second zero input data detector 306b and a second zero weight detector 308b, the PE 20 in the third row may be coupled to a third zero input data detector 306c and a third zero weight detector 308c, and the PE x0 in the Xth row may be coupled to an Xth zero input data detector 306x and an Xth zero weight detector 308x. The first zero input data detector 306a, the second zero input data detector 306b, the third zero input data detector 306c, ..., and the Xth zero input data detector 306x may detect a zero value on a respective reduced input data element in an input dataset0, an input dataset1, an input dataset2, ..., and an input datasetx respectively. Similarly, the first zero weight detector 308a, the second zero weight detector 308b, the third zero weight detector 308c, ..., and the Xth zero weight detector 308x may detect a zero value on a respective reduced weight value in a filter0, a filter1, a filter2, ..., and a filterx respectively.

Each zero input data detector and each zero weight detector in each row of the systolic array 302 may be coupled to a respective reducer to receive a reduced input. Each zero input data detector may receive a reduced input data element and each zero weight detector may receive a reduced weight. For example, the first zero input data detector 306a may be coupled to a first reducer 307a and the first zero weight detector 308a may be coupled to a second reducer 309a, the second zero input data detector 306b may be coupled to a third reducer 307b and the second zero weight detector 308b may be coupled to a fourth reducer 309b, the third zero input data detector 306c may be coupled to a fifth reducer 307c and the third zero weight detector 308c may be coupled to a sixth reducer 309c, and the Xth zero input data detector 306x may be coupled to an Xth reducer 307x and the Xth zero weight detector 308x may be coupled to an Yth reducer 309x.

The reducers 307a-307x and 309a-309x may be implemented as a separate entity external to the systolic array 302. For example, the reducers 307a-307x and 309a-309x may be part of a circuit separate from the systolic array. In some embodiments, the circuit and the systolic array 302 may be part of a computing engine, which may perform arithmetic computations for the convolution operations. In other embodiments, the reducers 307a-307x and 309a-309x may be implemented as part of the systolic array 302.

In some embodiments, the first reducer 307a and the second reducer 309a may be a first shared reducer and the third reducer 307b and the fourth reducer 309b may be a second shared reducer and the fifth reducer 307c and the sixth reducer 309c may be a third shared reducer and the Xth reducer 307x and the Yth reducer 309x may be an Xth shared reducer. Each shared reducer may provide a reduced input data element and a reduced weight. In some embodiments, each shared reducer may contain one output bus and may select a reduced input to produce. In other embodiments, each shared reducer may contain multiple output buses and may output a reduced input data element and a reduced weight.

The zero input data detectors 306a-306x and/or zero weight detectors 308a-308x can be arranged before the respective reducers 307a-307x, 309a-309x such that a zero input can be detected, and if the zero input is detected, then the respective reducer(s) 307a-307x, 309a-309x can be non-operational to conserve power. In some embodiments, both the zero input data detectors 306a-306x and respective reducers 307a-307x can receive the input datasets and operate in parallel instead of sequentially. Further, both the zero weight detectors 308a-308x and the respective reducers 309a-309x can receive the filters and operate in parallel instead of sequentially.

Each of the input dataset0, the input dataset1, the input dataset2, . . . , and the input datasetx may belong to an image, a text, a video clip, an audio clip, or another type of data set which may need to be processed by a neural network processor for convolution computations.

In some instances, the input dataset0, the input dataset1, the input dataset2, . . . , and the input datasetx may be associated with output dataset0, output dataset1, output dataset2, . . . , output datasety generated by an intermediate layer of the convolution operation. For example, the output dataset0, output dataset1, output dataset2, . . . , output datasety may go through activation functions and be fed back to the systolic array 302 as the input dataset0, the input dataset1, the input dataset2, . . . , and the input datasetx. The filter0, the filter1, the filter2, . . . , and the filterx may include different sets of weight values to convolve with the input dataset0, the input dataset1, the input dataset2, . . . , and the input datasetx. The weight values in the filter0, the filter1, the filter2, . . . , and the filterx may be pre-determined using supervised learning, non-supervised learning, or any suitable method of determining convolution filters.

Each zero input data detector for the respective row may detect whether a reduced input data element from the input dataset entering the respective row is "0" and generate a corresponding zero input data indicator for that reduced input data element. Further, each zero input data detector for the respective row may also detect whether an input data element from the input dataset entering the respective reducer is "0" and generate a corresponding zero input data indicator for that input data element. The corresponding zero data element indicator may be passed into the first PE of the respective row along with the reduced input data element. For example, the PE 00 may be the first PE of the first row in the systolic array 302. The PE 00 may receive reduced input data elements from the input dataset0 prior to other PEs in the first row (e.g., PE 01, PE 02, . . . , PE 0y). In some embodiments, one reduced input data element at a time may be fed sequentially, in uniform time periods, from the input dataset0 to the PE 00. The first zero input data detector 306a may generate the zero data element indicator 226 in each of the uniform time periods (e.g. clock cycles) for each input data element from the input dataset0. The zero data element indicator 226 may be fed to the PE 00 sequentially, in uniform time periods, along with each reduced input data element. The PE 00 may or may not store the reduced input data element 222 based on the value of the respective data load signal 242. In some embodiments, the first zero input data detector 306a may include a comparator to compare the incoming reduced input data element with a zero to assert (e.g., set to "1") or de-assert (e.g., set to "0") the zero data element indicator 226 based on the value of the incoming reduced input data element. For example, the comparator may be implemented using an OR, XOR, NAND, or any suitable circuit.

Each zero weight detector for the respective row may detect whether a reduced weight from a set of reduced weights entering the respective row is zero and generate a corresponding zero weight indicator for the reduced weight. Further, each zero weight detector may also detect whether a weight from a set of filters entering the respective reducers is zero and generate a corresponding zero weight indicator for that weight. For example, the first zero weight detector 308a may detect whether a reduced weight from the filter0 (e.g., the reduced weight 224) includes a zero value and generate the zero weight indicator 228 for the reduced weight. In some embodiments, the first zero weight detector 308a may include a comparator to compare the reduced weight with a zero to assert (e.g., set to "1") or de-assert (e.g., set to "0") the zero weight indicator 228. For example, the comparator may be implemented using an OR, XOR, NAND, or any suitable circuit. In one embodiment, a reduced weight, one at a time, may be fed sequentially, in uniform time periods, from the filter0 to the PE 00 for pre-loading the respective reduced weights to the PE 00 to the PE 0y prior to starting the arithmetic computations. The first zero weight detector 308a may generate a corresponding zero weight indicator for each of those reduced weights which may be fed to the PE 00 sequentially, in uniform time periods, along with the corresponding reduced weight. The PE 00 may pass the respective reduced weight and the corresponding zero weight indicators sequentially to the next neighboring PE until all the PEs in the first row have been preloaded with the respective reduced weights and the corresponding zero weight indicators. The respective reduced weights and the corresponding zero weight indicator may be cached in each PE before the respective reduced input data elements are fed to each row in the systolic array 302.

The second zero input data detector 306b, the third zero input data detector 306c, . . . , and the Xth zero input data detector 306x may be similar to the first zero input data detector 306a, and may generate a respective zero data element indicator, similar to the zero data element indicator 226, to provide to the PE 10, PE 20, . . . , and PE x0, sequentially, in the uniform time periods, for power optimization. The respective zero data element indicator generated for each row may be received by a respective first PE in each row via the respective row input bus 102, and propagated, sequentially, in the uniform time periods, by the first PE to all the PEs in the given row. The second zero weight detector 308b, the third zero weight detector 308c, . . . , and the Xth zero weight detector 308x may be similar to the first zero weight detector 308a, and may generate a respective zero weight indicator, similar to the zero weight indicator 228, to provide to the PE 10, PE 20, . . . , and PE x0, sequentially, to pre-load each PE in the respective row along with the respective weight value prior to starting the arithmetic computations.

In some embodiments, the zero input data detectors 306a-306x, and the zero weight detectors 308a-308x may be implemented as a separate entity external to the systolic array 302. For example, the zero input data detectors 306a-306x, and the zero weight detectors 308a-308x may be part of a circuit 304. In other embodiments, the circuit 304 and the systolic array 302 may be part of a computing engine, which may perform arithmetic computations for the convolution operations. Some embodiments of the disclosed technologies can provide reduced gate count and dynamic power consumption by detecting zeros on the input data elements and the weights entering a respective first PE in each row of the systolic array, and passing the zero indicators to all the PEs in the array as compared to using respective zero detectors within each PE in the systolic array 302.

Note that FIG. 3 only shows the respective zero data element indicator and the zero weight indicator entering the first PE in each row of the systolic array 302 for ease of illustration, however it will be understood that each PE in the respective row of the systolic array 302 may also receive the respective reduced input data element and the respective reduced weight along with some control signals (e.g., opcode 230, weight load 232, data type, etc.), which may be propagated from the left to the right of the systolic array 302 for each row.

FIG. 4A shows an example reduction system 400A (e.g., a 32-bit floating-point ("FP32") reduction system) according to an example implementation. The reduction system 400A includes a multiplexer 402, a rounding identifier, and a reducer 405. The reducer 405 may reduce input of an arbitrary bit-length to the maximum bit-length supported by elements of a systolic array during a single-pass computation. For example, the reducer 405 may reduce input to a 22-bit input where 22-bits is the maximum bit-length supported by a multiplier of the systolic array. The reducer 405 can include an exponent expander 406, a rounder 408, and a trailing bit reducer 410. In some embodiments, the reducer 405 may include the exponent expander 406. In other embodiments, the reducer 405 may not include the exponent expander 406. For example, the reducer 405 may not expand the exponent of an input to generate the reduced input. In some embodiments, the multiplexer 402 may be separate from the reducer 405. In other embodiments, the reducer 405 may include the multiplexer 402. As previously discussed, the reducer 405 processes an original number 401A to result in a reduced number 403A.

The reduction system 400A may receive one or more numbers to be reduced. The one or more numbers may include one or more of an input data element 221 and/or a weight 223. For example, the reduction system 400A can receive a FP32 weight and an FP32 input data element. In some embodiments, the reduction system 400A may receive the input data element 221 or the weight 223 without a multiplexer.

The multiplexer 402 may receive the one or more numbers received by the reduction system 400A. The multiplexer 402 may also receive an opcode 230 or other indicator of whether a weight or input data element should be selected. The multiplexer 402 may decode the opcode 230 to select a number to be operated on by the reduction system 400A. The multiplexer 402 may output a different number for the reduction operation based on the value of the opcode 230. In some embodiments, a first opcode value may correspond to an instruction to output the weight 223 as the multiplexer output 420 and a second opcode value may correspond to an instruction to output the input data element 221 as the multiplexer output 420. For example, once the input data element 221 and the weight 223 have been provided to the reduction system 400A, the multiplexer 402 may output the input data element 221 and, at a later time, the weight 223, based at least in part on the opcode 230.

In the example of FIG. 4A, the original number 401A is an FP32 number with a sign bit portion, an exponent bit portion, and a significand bit portion. It will be understood that the original number 401A can be any arbitrary bit-length number with any exponent bit-length and/or significand bit-length. The FP32 format of the original number 401 includes a 1-bit sign, an 8-bit exponent, and a 23-bit significand. In some embodiments, the original number 401A may include more, less, or different bits. Further, the original number 401A may include more, less, or different bits for the sign bit portion, the exponent bit portion, and/or the significand bit portion.

The exponent expander 406 may receive the 8-bit exponent 428 from the original number 401A. The exponent expander 406 may increase a quantity of bits representing the exponent 428 from 8 bits to 10 bits. In some embodiments, the exponent expander 406 may add 1, 2, 3, or any number of bits to the exponent 428. The added quantity of bits can be sufficient to represent the number in a format expected by the PE (e.g., the PE may expect a 10-bit exponent). In other embodiments, the exponent expander may not add any bits to the exponent 428. For example, the exponent expander 406 (or another component) may determine that a sufficient (e.g., adequate) quantity of bits are included in the exponent 428 and may not expand the exponent 428.

The exponent expander 406 may expand the exponent 428 and retain the value of the exponent 428. The exponent expander 406 may expand the exponent using range translation by copying the most significant bit, appending a second, inverted, copy of the most significant bit, and appending the other bits of the exponent 428 to the end of the expanded exponent 434. For example, if the exponent 428 has a value of "10101010", the exponent expander 406 may copy the most significant bit "1", invert the most significant bit once "0", and append the final seven bits "0101010" such that the expanded exponent 434 is "100101010". In some embodiments, the expand expander 406 may perform a different operation if the exponent begins with a leading zero. Further, the exponent expander 406 may expand the exponent using range translation by copying the most significant bit, appending a second copy of the most significant bit, and appending the other bits of the exponent 428 to the end of the expanded exponent 434. For example, if the exponent 428 is "00000000," the exponent expander 406 may expand the exponent 428 such that the expanded exponent 434 is "000000000." In some embodiments, the exponent expander 406 might add the extra bits of data to any location of the exponent field depending on the endian format and signed or unsigned representation of the exponent. Therefore, the exponent expander 406 can expand the exponent 428 to generate the expanded exponent 434.

The exponent expander 406 may provide the expanded version of the exponent 434 as the 10-bit expanded exponent field of the reduced number 403A.

The reducer 405 may further receive the rounding identifier 404. The rounding identifier 404 may identify a type of rounding to be performed by the reducer 405. For example, the rounding identifier 404 may identify a rounding method such as stochastic rounding, rounding to nearest even, rounding to zero, rounding down, rounding up, or any other rounding method. Stochastic rounding may include randomly rounding to the next larger or smaller number. For example, stochastic rounding may include a 50% probability of rounding down and a 50% probability of rounding up. Further, in stochastic rounding, the probability of rounding up or rounding down may be based on the relative position of the number to be rounded. For example, a number x between y and z may have a first probability of rounding up to z equal to (x−y)/(z−y) and a second probability of rounding down to y equal to (z−x)/(z−y) where y and z can be any numbers and x can be any number between y and z. Rounding to the nearest even may include rounding to the nearest even number with a particular number of bits, rounding to zero may include rounding a particular number of bits to zero, rounding up may include rounding a particular number of bits up, and rounding down may include rounding a particular number of bits down. The rounding identifier 404 may be provided by a user (e.g., via a user interface), another system, etc. Further, the rounding identifier 404 may be a custom rounding identifier or a default rounding identifier.

The reducer 405 may contain a rounder 408 to round the significand 430. The rounder 408 may perform rounding based on the rounding method identified by the rounding identifier 404. For example, the rounding method may be stochastic rounding, rounding to nearest even, rounding to zero, rounding down, rounding up, or any other rounding method. The rounder 408 may perform the rounding based on any bit of the significand. Further, the rounder 408 may determine a number of bits to be reduced by the trailing bit reducer 410 (e.g., a number of bits to be zeroed) and may initiate the rounding at the bit immediately prior to the bits to be reduced. Further, the rounder 408 can round the bits to be reduced by the trailing bit reducer 410. For example, if the significand 430 includes bits "1110111" and the trailing bit reducer 410 determines that the trailing bit reducer 410 will reduce the three trailing bits (e.g., the first three bits reading from the left to right), the rounder 408 may perform rounding based on the "0" in position 4. Further, if the rounder 408 determines to perform rounding to zero, the rounder 408 may produce a rounded significand 432 "1110000," if the rounder 408 determines to perform rounding up, the rounder 408 may produce a rounded significand 432 "1111000," etc. In some embodiments, the rounder 408 may be located logically after the trailing bit reducer 410 and the rounder 408 may round a reduced significand.

The reducer 405 may further contain the trailing bit reducer 410 to reduce the bit representation of the rounded significand 432. The trailing bit reducer 410 may receive the rounded significand 432 as input. The trailing bit reducer 410 may identify a number of bits to reduce from the rounded significand 432. The number of bits to reduce may be based on a difference between the bit-length of the rounded significand 432 and a maximum single-pass computational bit-length supported by elements of the systolic array. Further, the number of bits may be based on a user input or system input (e.g., an input identifying a maximum number of bits supported). The number of bits may be trailing bits of the rounded significand 432 (e.g., a number of rightmost bits or the least significant bits). For example, if the trailing bit reducer 410 determines 3 bits should be reduced from the rounded significand 432, the trailing bit reducer 410 may identify the 3 bits from right to left in the rounded significand 432. Further, the bits may correspond to positions 0, 1, and 2 within the original number 401A. The trailing bit reducer 410 may identify the bits and zero the bits (e.g., reduce, eliminate, push to logical zero). In the example of FIG. 4A, the trailing bit reducer 410 identifies that 12 bits should be reduced from the rounded significand 432 and zeros the trailing 12 bits of the rounded significand 432. By reducing the bit representation of the rounded significand 432, the trailing bit reducer 410 can generate a reduced significand 436 that includes only the non-reduced (non-zeroed) bits of the significand 430.

The trailing bit reducer 410 may provide the reduced significand 436 as the 11-bit rounded significand of the reduced number 403A.

The reduced number 403A may be a second bit-length wherein the second bit-length is any number of bits smaller than the first bit-length. In some embodiments, the second bit-length may be the maximum bit-length supported by elements of the systolic array. It will be understood that the reduced number 403A can be any arbitrary bit-length number with any exponent bit-length and/or significand bit-length. In the example of FIG. 4A, the reduced number 403A may be an 22-bit floating-point number with a sign bit portion, an exponent bit portion, and a significand bit portion and the original number 401A may be a 32-bit floating-point number. The reduced number 403A may contain a 1-bit sign (e.g., the sign 426), a 10-bit exponent (e.g., the expanded exponent 434), and an 11-bit significand (e.g., the reduced significand 436). The reduction system 400A may provide the reduced number 403A as a reduced output 421. The reduced output 421 may be a reduced input data element 222, a reduced weight 224, or any other reduced number.

FIG. 4B shows an example reduction system 400B (e.g., a 32-bit floating-point ("FP32") reduction system) according to an example implementation. The reduction system 400B may include a reducer 405 that may reduce input of an arbitrary bit-length to the maximum bit-length supported by elements of a systolic array during a single-pass computation. For example, the reducer 405 may reduce input to a 22-bit input where 22-bits is the maximum bit-length supported by a multiplier of the systolic array. The reduction system 400B includes components similar to the reduction system 400A except that in FIG. 4B an original number 401B is rounded by a system prior to provision to the reduction system 400B.

In the example of FIG. 4B, the original number 401B may be a FP32 number with a sign bit portion, an exponent bit portion, and a significand bit portion. It will be understood that the original number 401B can be any arbitrary bit-length number with any exponent bit-length and/or significand bit-length The FP32 format of the original number 401B includes a 1-bit sign, an 8-bit exponent, and a 23-bit rounded significand. In some embodiments, the original number 401B can include any number of bits or be associated with any other bit format. The 23-bit rounded significand may be rounded by a system external or internal to the reduction system 400B.

The reducer 405 may further contain the trailing bit reducer 410 to reduce the rounded significand 450. The trailing bit reducer 410 may receive the rounded significand 432 as input and reduce the quantity of bits representing the rounded significand 450 (e.g., from 23-bits to 11-bits). The trailing bit reducer 410 can generate a reduced significand 452 that includes only the non-reduced (non-zeroed) bits of the rounded significand 450. Further, the trailing bit reducer 410 may provide the reduced significand 452 as the 11-bit rounded significand of the reduced number 403B.

In some embodiments, the reduction system 400B may not receive the rounding identifier 404. For example, the rounding identifier 404 may be provided to the system rounding generating the rounded significand 450 in order to identify a rounding method. The reduction system 400B may provide the reduced number 403B as a reduced output 441. The reduced output 441 may be a reduced input data element 222, a reduced weight 224, or any other reduced number.

Figure 4C:
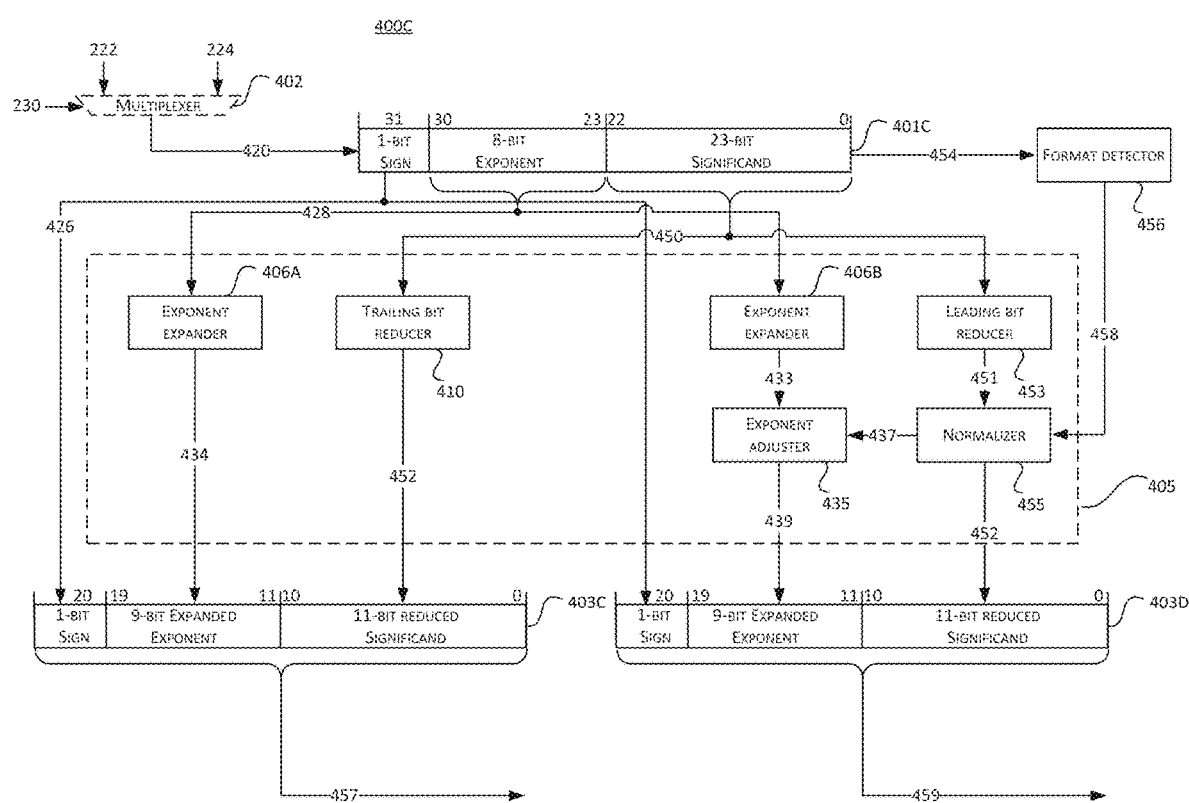
FIG. 4C illustrates a reducer showing the generation of multiple reduced inputs from a selected input, according to some examples of the disclosed technologies.

FIG. 4C shows an example reduction system 400C (e.g., a 32-bit floating-point ("FP32") reduction system) according to an example implementation. The reduction system 400C may include a reducer 405 that may reduce input of an arbitrary bit-length to multiple reduced inputs with a maximum bit-length supported by elements of a systolic array during a single-pass computation. For example, the reducer 405 may reduce input to a 21-bit input where 21-bits is the maximum bit-length supported by a multiplier of the systolic array. The reduction system 400C includes components similar to the reduction system 400A and 400B except that in FIG. 4C an original number 401C is converted into multiple reduced inputs by the reducer 405.

In the example of FIG. 4C, the original number 401C may be a FP32 number with a sign bit portion, an exponent bit portion, and a significand bit portion. It will be understood that the original number 401C can be any arbitrary bit-length number with any exponent bit-length and/or significand bit-length. The FP32 format of the original number 401C includes a 1-bit sign, an 8-bit exponent, and a 23-bit rounded significand. In some embodiments, the original number 401C can include any number of bits or be associated with any other bit format.

The original number 401C as an input 454 may be provided to the format detector 456 for normal and/or denormal detection. For example, the format detector 456 may be a denormal detector and/or a normal detector. The format detector 456 may detect whether the input 454 is normal or denormal based at least in part on at least one of the value of the 1-bit sign, the value of the 8-bit exponent, or the value of the 23-bit significand. For example, the format detector 456 may detect a denormal number when the 8-bit exponent contains zeros in each bit and the significand is nonzero. The format detector 456 may provide an enable signal 458 to the normalizer 455 based at least in part on the detection of a normal number. For example, if the format detector 456 detects that the input 454 is normal, the format detector 456 may provide a first value to the normalizer 455. If the format detector 456 detects that the input 454 is denormal, the format detector 456 may provide a second value to the normalizer 455. In some implementations, the first number may be a 1 and the second number may be a 0. The detection of a normal number may correspond to a logical high and the detection of a denormal number may correspond to a logical zero. In some embodiments, the format detector 456 may detect a normal number by zeroing out the significand 450 (e.g., replacing the significand 450 with zeros) and subtracting the original number 401C with the reduced significand 451 from the original number 401C with the zeroed significand to generate a normal identifier. Further, the normal identifier may contain the implied leading bit if the original number 401C is normal and may equal zero if the original number 401C is denormal.

The reducer 405 may provide the 1-bit sign as a 1-bit sign of the reduced number 403C and the reduced number 403D.

The reducer 405 may further contain the trailing bit reducer 410 and the leading bit reducer 453 to reduce the significand 450. The trailing bit reducer 410 and the leading bit reducer 453 may receive the significand 432 as input and reduce the quantity of bits representing the significand 450 (e.g., from 23-bits to 11-bits). The trailing bit reducer 410 can generate a reduced significand 452 that includes only the non-reduced (non-zeroed) bits of the significand 450 by removing trailing (or low) bits of the significand 450. The leading bit reducer 453 can generate a reduced significand 451 that includes only the non-reduced (non-zeroed) bits of the significand 450 by removing high bits of the significand 450. Further, the trailing bit reducer 410 may provide the reduced significand 452 as the 11-bit reduced significand of the reduced number 403C and the leading bit reducer 453 may provide the reduced significand 451 as the input to the normalizer 455.

As discussed above, the reducer 405 may further contain the exponent expander 406A and 406B to expand the exponent 428. The exponent expander 406A can generate an expanded exponent 434 and may provide the expanded exponent 434 as an exponent of the reduced number 403C and the expanded expander 406B may provide the expanded exponent 433 as the input to the exponent adjuster 435.

The reducer 405 may contain the normalizer 455 (e.g., a shifter). The normalizer 455 may be enabled based at least in part on the enable signal 458 received from the format detector 456. The normalizer 455 may receive the reduced significand 451 from the leading bit reducer 453. The normalizer 455 may shift the reduced significand 451 based at least in part upon the number of leading zeros of the reduced significand 451 (as detected by the normalizer 455). The normalizer 455 may further shift the reduced significand 451 such that the first non-zero number is shifted out of the reduced significand 451 and represented with an implied bit. The normalizer 455 may shift the reduced significand 451 by adding bits containing logical lows or zeros to the right or end of the reduced significand 451. The normalizer 455 may produce a shifted significand 452, wherein the shifted significand 452 may be the same number of bits as the reduced significand 451. For example, if the reduced significand 451 is 00001100000, then the normalizer 455 can count four zeros and further adjust the shift count to five, and the normalizer 455 may shift the reduced significand 451 a total of five times and produce a shifted significand 452 of 10000000000. The normalizer 455 may then provide the shifted significand 452 as the significand portion of the reduced number 403D. In the event that the format detector 456 does not identify the original number 401C is a normal number (e.g., the original number 401C is a denormal number), the normalizer 455 can provide the reduced significand 451 as the significand portion of the reduced number 403D. In some embodiments, if the format detector 456 determines the original number 401C is normal, the reducer 405 may calculate a zeroed number by zeroing the significand of the original number 401C. Further, the reducer 405 may generate the significand of the reduced number 403D by subtracting the reduced significand from the zeroed number. In other embodiments, the reduced number 403D may be determined by subtracting the reduced number 403C from the original number 401C.

The exponent expander 406B may provide the expanded version of the exponent 433 to the exponent adjuster 435 (e.g., a subtractor) based at least in part on the enable signal 458 when a normal format for the first input is detected by the format detector 456 and a signal 437 from the normalizer 455 identifying the renormalized significand 452. The exponent adjuster 435 may receive the expanded exponent 433 from the exponent expander 406B and a number of leading zeros from the normalizer 455. The number of leading zeros may identify the number of leading zeros removed by the normalizer 455 in order to renormalize the reduced significand 451. The exponent adjuster 435 may subtract a value from the expanded exponent 433 based at least in part on the leading zeros output by the normalizer 455. Therefore, the exponent adjuster 435 may compensate the exponent value for the shift of the significand. For example, if the leading zeros output is equal to 5 and the expanded exponent is equal to 000011111 or 31, the exponent adjuster 435 may subtract 5 from 000011111 or 31, such that the adjusted exponent 439 is equal to 000011010 or 26. The exponent adjuster 435 may provide the adjusted exponent 439 as the 9-bit expanded exponent field of the reduced number 403D. Otherwise, the expanded version of the exponent 433 can be stored as the 9-bit expanded exponent field of the reduced number 403D. In some embodiments, the exponent expander 406B may expand the exponent 433 prior to the normalizer 455 normalizing the reduced significand 451. In other embodiments, the exponent expander 406B may expand the exponent 433 after or in parallel with the normalizer 455 normalizing the reduced significand 451.

The reduction system 400C may provide the reduced number 403C and the reduced number 403D as reduced inputs 457 and 459 for the original number 401C. The reduced inputs 457 and 459 may be reduced input data elements 222, reduced weights 224, or any other reduced numbers.

FIG. 5 shows an example multiply accumulate datapath 500. The example datapath 500 may be implemented as the multiplier 208 and the adder 210 discussed with respect to FIG. 2A and FIG. 2B. As shown in FIG. 5, the multiplier 208 may receive a reduced input data element 222 and a reduced weight 224 and provide a multiplication product to the adder 210. The adder 210 may receive the multiplication product and the input partial sum 234 and provide an addition result 238. By converting inputs into reduced representation before presenting inputs to the multiplier 208, the multiplier 208 can omit support for numbers with larger bit-lengths (e.g., 32-bits), instead the multiplier 208 can support numbers with the reduced bit-lengths (e.g., 22-bits). Therefore, the systolic array can retain the performance offered by receiving inputs of shorter bit-lengths by receiving inputs of arbitrary bit-lengths and adjusting the input to a particular bit-length (e.g., the maximum bit-length supported by the processing elements of the systolic array).

The reduced input data element 222 may be a 22-bit number. In some embodiments, the reduced input data element 222 may have any bit-length and/or be any number of bits. Further, the reduced input data element 222 may be a floating-point number. In some embodiments, the reduced input data element 222 may be a brain floating-point number. Further, the reduced input data element 222 may be a number of any data type. The reduced input data element 222 may consist of a sign bit field, an exponent field, and a significand field. The multiplier 208 can support reduced input data elements of different types. For example, the reduced input data element 222 may contain a 1-bit sign, a 10-bit exponent, and an 11-bit significand. Further, the reduced input data element 222 may contain a 1-bit sign, an 8-bit exponent, and an 11-bit significand. The multiplier 208 may support both of these types of reduced input data elements. In some embodiments, the reduced input data element 222 may contain an x-bit sign, a y-bit exponent, and a z-bit significand where x, y, and z may be any number. The reduced input data element 222 may be provided to the multiplier 208 via a first sign data path 511, a first exponent data path 521, and a first significand data path 531.

The reduced weight 224 may be a 22-bit number. In some embodiments, the reduced weight 224 may have any bit-length and/or be any number of bits. Further, the reduced weight 224 may be a floating-point number. In some embodiments, the reduced weight 224 may be a brain floating-point number. Further, the reduced weight 224 may be any data type. The reduced weight 224 may consist of a sign bit path, an exponent bit path, and a significand bit path. For example, the reduced weight 224 may contain a 1-bit sign, a 10-bit exponent, and an 11-bit significand. Further, the reduced weight 224 may contain a 1-bit sign, an 8-bit exponent, and a 10-bit significand. In some embodiments, the reduced input data element 222 may contain an x-bit sign, a y-bit exponent, and a z-bit significand where x, y, and z may be any number. The reduced weight 224 may be provided to the multiplier 208 via a second sign data path 512, a second exponent data path 522, and a second significand data path 532.

The multiplier 208 may contain a sign data path, an exponent data path, and a significand data path. The multiplier 208 may receive the first sign data path 511, the first exponent data path 521, and the first significand data path 531 from the reduced input data element 222. The multiplier 208 may receive the second sign data path 512, the second exponent data path 522, and the second significand data path 532 from the reduced weight 224. In some embodiments, the multiplier 208 may also receive a data type control signal. The multiplier 208 may perform multiplication operations on the received inputs.

The sign data path of the multiplier 208 may receive the first sign data path 511 and the second sign data path 512. The sign data path may output a partial sign data path 513 based at least in part on the first sign data path 511 and the second sign data path 512. In some embodiments, the sign data path can be implemented as an exclusive or (XOR) function. The sign data path may provide the partial sign data path 513 to the adder 210.

The exponent data path of the multiplier 208 may receive the first exponent data path 521 and the second exponent data path 522. The exponent data path of the multiplier 208 may contain an adder 526. In some embodiments, the exponent data path of the multiplier 208 may include a mapper to adjust the output of the multiplier 208 into a format expected by one or more components of the systolic array (e.g., an adder separate from the adder 526). For example, an adder of the systolic array may expect (e.g., operate on) an input with an 11-bit exponent. Further, the mapper may receive the first exponent data path 521 and the second exponent data path 522 and perform a mapping operation to add one or more bits to the exponent of each of the reduced input data element 222 and the reduced weight 224

The adder 526 may receive the mapped or unmapped versions of the first exponent data path 521 and the second exponent data path 522. The adder 526 may perform addition on the two values received from the first exponent data path 521 and the second exponent data path 522. The adder 526 can also receive shift/carry information (not shown) from the significand data path. The adder 526 may provide a partial exponent data path 523 based at least in part on the addition performed on the two values. The partial exponent data path 523 can be 10 bits or other range sufficient to accommodate the exponent sum without overflow.

The significand data path of the multiplier 208 may receive the first significand data path 531 and the second significand data path 532. The significand data path of the multiplier 208 may contain a binary multiplier 534 and a format adjuster 536. The binary multiplier 534 may multiply the value of the first significand data path 531 by the value of the second significand data path 532. The binary multiplier 534 may generate a multiplier product based on the multiplication operation. In some embodiments, the product may be an integer product, a floating-point product, or any other product. Further, the binary multiplier 534 may generate a product of 8-bits, 16-bits, 32-bits, or any other number of bits. The product may have a bit-length of a maximum bit-length supported by the elements of the systolic array during a single-pass computation. Therefore, the systolic array can receive inputs of an arbitrary inputs and a reducer can reduce to a bit-length corresponding to the maximum bit-length supported by elements of the systolic array (e.g., a multiplier of a processing element). The binary multiplier 534 may further perform floating-point multiplication, integer multiplication, or multiplication involving any other data type. The binary multiplier 534 may be implemented using a 16-bit multiplier data path, an 18-bit multiplier data path, or a multiplier data path with any number of bits. The binary multiplier 534 may provide a multiplier product to the format adjuster 536. In some embodiments, the binary multiplier 534 may be implemented using a multiplier circuit.

The format adjuster 536 may adjust the format of the multiplier product produced by the binary multiplier 534. The significand data path of the multiplier 208 may include the format adjuster 536 to adjust the output of the multiplier 208 into a format expected by one or more components of the systolic array (e.g., an adder separate from the adder 526). For example, an adder of the systolic array may expect (e.g., operate on) an input with a 23-bit significand. The format adjuster 536 may add or reduce the number of bits used to represent the multiplier product, for example, by increasing the bit size to 23 bits. The format adjuster 536 may provide a partial significand data path 533 to the adder 210.

The adder 210 may contain a sign data path, an exponent data path, and a significand data path. The adder 210 may be implemented with given bit-size (e.g., with an adder data path of a given size). In some embodiments, each processing element may include an adder with a larger bit-size and a multiplier with a smaller bit-size as adders of increased bit-sizes may be more cost efficient than multipliers of the same increased bit-sizes. Therefore, this disclose enables a systolic array to support, at reduced precision, larger bit-sizes using lower bit-size multipliers. The adder 210 may receive the partial sign data path 513, the partial exponent data path 523, and the partial significand data path 533 from the multiplier 208. The adder 210 may also receive an input partial sum 234. The adder 210 may perform an addition operation on the multiplier product comprised of the partial sign data path 513, the partial exponent data path 523, and the partial significand data path 533 and the input partial sum 234. In some embodiments, the adder 210 may perform addition operations on both floating-point and brain floating-point numbers. Further, the adder 210 may be a 34-bit floating-point adder, a 32-bit floating-point adder, or any other bit-length adder.

The adder 210 may generate an addition result 238 based on the addition operation. The addition result 238 may consist of a sign data path 515, an exponent data path 525, and a significand data path 535. In some embodiments, the addition result 238 may be an integer sum, a floating-point sum, or any other sum. Further, the adder 210 may generate a sum of 8-bits, 16-bits, 32-bits, 34-bits, or any other number of bits. In some embodiments, the adder 210 may be implemented using a binary adder circuit.

Figure 6:
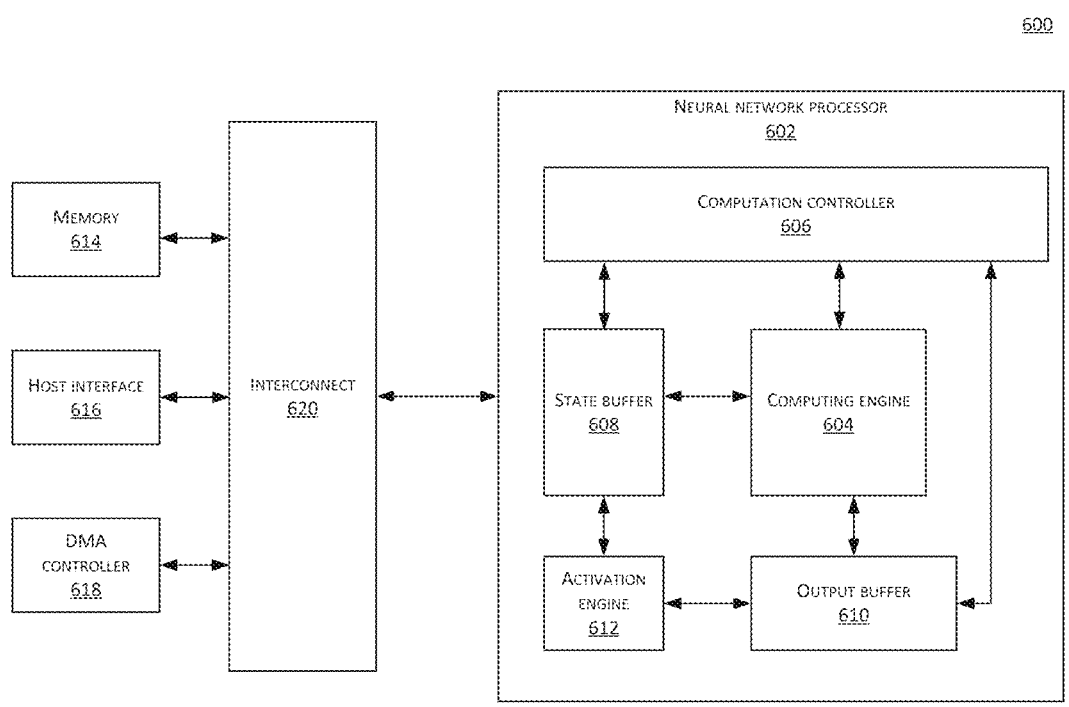
FIG. 6 shows an apparatus for neural network computations according to some examples of the disclosed technologies.

FIG. 6 shows an apparatus 600 for neural network computations according to some embodiments of the disclosed technologies. The apparatus 600 may be part of a computer system, e.g., a host server. For example, the host server may provide multi-tenant compute services for data processing applications such as an image recognition service, text-based data processing (e.g., processing of search queries), audio data processing, video data processing, etc. In some embodiments, a host device may operate a software application and communicate with the apparatus 600 to make a prediction based on computations with a prediction model utilizing a neural network processor. For example, the host device can make the prediction by identifying information included in an input data set for an image, text, audio, video, etc. using the prediction model.

The apparatus 600 may include a neural network processor 602 coupled to memory 614, a host interface 616, and a direct memory access (DMA) controller 618 via an interconnect 620. The neural network processor 602 may include a computing engine 604, a computation controller 606, a state buffer 608, an output buffer 610, and an activation engine 612. The neural network processor 602 can provide the computing resources to support the computations with the prediction model. The neural network processor 602 may be implemented as a system on chip (SoC), a field programmable gate array (FPGA), or any suitable circuit.

The memory 614 may store instructions, input data sets (e.g., pixel data of an image) and the weights (e.g., weights corresponding to certain visual and/or non-visual features) received from the host device. The memory 614 may also store outputs of the neural network processor 602 (e.g., one or more image recognition decisions on the input images in the form of output data sets). The memory 614 may include any suitable memory, e.g., dynamic random access memory (DRAM), synchronous DRAM (SDRAM), double data rate DRAM (DDR DRAM), storage class memory (SCM), flash memory, etc.

The host interface 616 may enable communication between the host device and the neural network processor 602. For example, the host interface 616 may transmit memory descriptors including the memory addresses of the stored data (e.g., input data sets, weights, results of computations, etc.) between the host device and the neural network processor 602. The host interface 616 may include, e.g., a peripheral component interconnect express (PCIe) interface, or any suitable interface for communicating with the host device. The host device may include a host processor and a host memory.

The DMA controller 618 may perform DMA operations to transfer data between the neural network processor 602 and the host device. For example, as discussed above, the host device can store the instructions, input data sets, and the weights in the memory 614. The host device can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device. The neural network processor 602 can also store the results of computations (e.g., one or more image recognition decisions) in the memory 614, and provide the memory addresses for the stored results to the host device.

The state buffer 608 may provide caching of data used for computations at the computing engine 604. The data cached at the state buffer 608 may include, e.g., the input data sets and the weights acquired from the memory 614, as well as intermediate outputs of computations at the computing engine 604. The caching can reduce the effect of memory access bottleneck (e.g., caused by the latencies at the memory 614, the DMA controller 618, the interconnect 620, etc.) on the performance of the computing engine 604. The state buffer 608 can be an on-chip memory device and may include a static random access memory (SRAM) or any suitable memory.

The computation controller 606 may provide controls to various components of the neural network processor 602 to perform neural network computations. In some implementations, the computation controller 606 may read the instructions stored in the memory 614 and schedule the executions of the instructions by the computing engine 604. In the first embodiment, the computation controller 606 may perform scheduling of loading the weights into the computing engine 604 prior to reading the input data elements from the state buffer 608. For example, as discussed with reference to FIG. 2A, FIG. 2B, FIG. 4A, and FIG. 4B, the computation controller 606 may provide the opcode 230 and the weight load 232 to the computing engine 604 based on the instructions received from the host device. The computation controller 606 may provide appropriate values of the opcode 230 to the computing engine 604 which may be decoded by each PE in the computing engine 604 to perform a corresponding operation. For example, the computing engine 604 may use the weight load 232 and the opcode 230 to pre-load the weights in all the PEs in the computing engine 604. Once the weights have been pre-loaded, the computation controller 606 may perform scheduling of loading the input data elements into the computing engine 604, sequentially, in uniform time periods, from the state buffer 608 to start the arithmetic computations.

In the second embodiment, the computation controller 606 may perform scheduling of loading the weights and the input data elements into the computing engine 604, sequentially, in uniform time periods, from the state buffer 608. The computation controller 606 may schedule loading of the weights and the input data elements in a respective first PE of each row in the systolic array 302 using a respective row data bus. For example, a respective input data element and a weight value may be loaded per cycle in the first PE of the respective row.

In another embodiment, the computation controller 606 may schedule loading of the weights in the systolic array 302 in parallel for each row using a respective column data bus for each PE in a given row. For example, weights for each row may be loaded in parallel per cycle. In some embodiments, the computation controller 606 may determine a data type for the input data set based on the instructions received from the host device. The instructions may be in the form of an opcode. The data type may indicate a size and a type of the input data element, e.g., 4-bit, 8-bit, 16-bit, signed, unsigned, or floating-point.

The computing engine 604 may perform computations for the neural network. For example, the computing engine 604 may reduce the input provided to a systolic array to generate the reduced input. Further, the computing engine 604 may determine the maximum supported bit-length for the systolic array and generate the reduced input with the maximum supported bit-length. In some embodiments, the computing engine 604 may include a set of PEs performing one or more arithmetic operations involved in the neural network computations. Each PE may perform multiply-accumulate operations using input data sets and associated weights. For example, the computing engine 604 may include the systolic array 302, and the circuit 304 comprising the zero input data detectors 306a-306x, and the zero weight detectors 308a-308x. In some embodiments, the zero input data detectors 306a-306x, and the zero weight detectors 308a-308x may be external to the computing engine 604. The computing engine 604 may execute instructions as scheduled by the computation controller 606 to load the weights and the input datasets sequentially from the state buffer 608 into the computing engine 604.

In the first embodiment, the weights may be pre-loaded prior to reading the input datasets from the state buffer 608, as discussed with reference to FIG. 4. The respective zero weight indicators corresponding to each weight may be cached locally in each PE and the cached values may be used to perform arithmetic computations with the respective input data element as the input data element is fed into the computing engine 604 along with the corresponding zero data element indicator. In the second embodiment, the weights and the input datasets may be read simultaneously from the state buffer 608, as discussed with reference to FIG. 5. The corresponding zero data element indicator and the zero weight indicator may be provided by the respective zero detector circuits and propagated sequentially from one PE to another for the respective row. The weights and the input datasets can be obtained from the state buffer 608 using one or more interfaces. In certain embodiments, the computing engine 604 may perform the arithmetic computations to reduce the dynamic power consumption of the systolic array 302 using the respective zero data element indicator and the zero weight indicator signals as discussed with reference to FIGS. 2-5, and provide the computations results to be stored in the output buffer 610.

The output buffer 610 may include a set of registers to store the output data sets generated by the computing engine 604. In some embodiments, the output buffer 610 may also enable additional processing such as, e.g., a pooling operation to reduce the size of the stored outputs. Further, the computing engine 604 can be operated to perform computations for a particular neural network layer, and the output buffer 610 can process the outputs of that neural network layer and store the processed output datasets (with or without processing by the activation engine 612) at the state buffer 608. The processed output datasets may be used by the computing engine 604 as the intermediate outputs. In some embodiments, the output buffer 610 may include adders to accumulate the partial sums generated for different sets of filters and input data sets to generate a convolution output array. The final output value of the convolution output array stored in the state buffer 608 can be retrieved by the computation controller 606 for storing at the state buffer 608.

The activation engine 612 may apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when activation functions are not to be applied.

Figure 7:
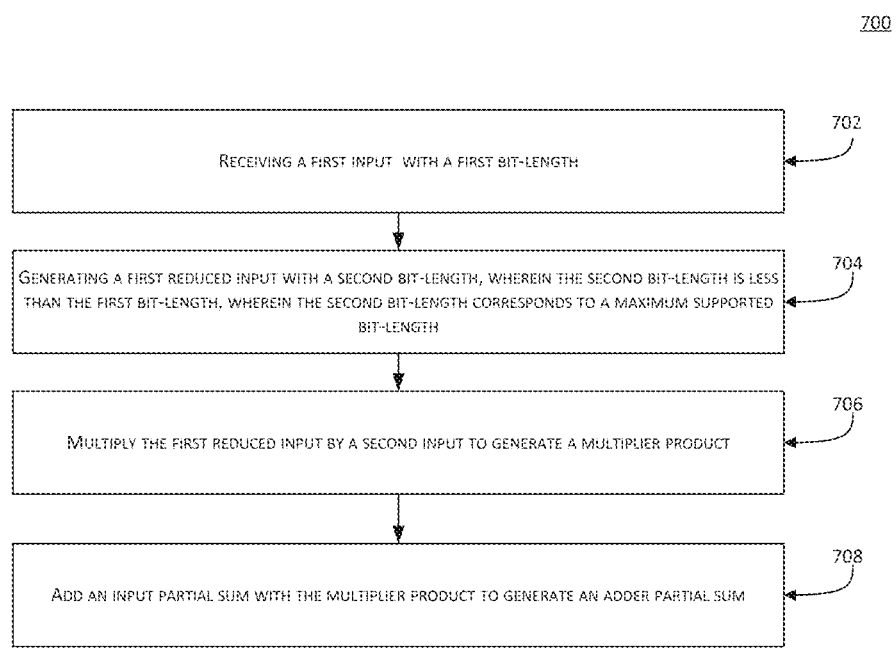
FIG. 7 shows a method executed by a reducer and a processing element for neural network computations, according to some examples of the disclosed technologies.

FIG. 7 shows a method 700 executed by a computing engine 604 utilizing a systolic array (e.g., a group of processing elements), according to some examples of the disclosed technologies. The array may be similar, for example, to the array 100A, and include multiple PEs similar to, e.g., the PE 112a. The systolic array may include a plurality of PEs configured in a plurality of rows and/or a plurality of columns. For example, the systolic array might include 65,536 PEs which are further divided into 256 rows and 256 columns. The computing engine 604 may be a systolic circuit that includes the systolic array and one or more reducers (e.g., convertors) to receive an input with an arbitrary bit-length and convert the arbitrary bit-length input into an input with a reduced bit-length corresponding to the maximum supported bit-length for elements of the systolic array. For example, the one or more reducers can convert a plurality of input data elements (e.g., 32-bit input data elements) into a plurality of reduced input data elements (e.g., 22-bit input data elements) and/or plurality of weights (e.g., 32-bit weights) into a plurality of reduced weights (e.g., 22-bit weights).

In block 702, a first reducer receives a first input (e.g., a first number) with a first bit-length (e.g., 32 bits). The first input bit-length may be an arbitrary bit-length. The first input may be represented in floating-point format. Further, the first reducer can identify a quantity of trailing bits of the first input and reduce the quantity of trailing bits of the first input. The first input may represent an input data element. The first reducer may convert 32-bit floating-point numbers to 22-bit floating-point numbers. In some embodiments, the first reducer may convert m-bit floating-point numbers to n-bit floating-point numbers, where n and m can be any numbers where n is less than m.

In block 704, the first reducer generates a first reduced input with a second bit-length (e.g., 22 bits). The second bit-length may be a maximum bit-length supported by elements of the systolic array. For example, the first reduced input may be a 22-bit floating-point number. Further, the second bit-length may be less than the first bit-length (e.g., the second bit-length may be any bit-length less than the first bit-length). The first reducer may generate the first reduced input based on reducing the quantity of trailing bits of the first input. To generate the first reduced input (or any other reduced inputs), the first reducer may include a trailing bit reducer to reduce a quantity of trailing bits representing a significand portion of the first input and produce a reduced significand portion of the first input (e.g., the 32-bit first input). For example, the trailing bit reducer may zero the quantity of trailing bits. Further, the first reducer may include a rounder to round the reduced significand portion of the first input based at least in part on a remainder of the bits (e.g., a remainder of non-trailing bits of the first input) representing the significand portion of the first input not included within the reduced significand portion. For example, rounding the first input may include rounding a portion of the bits of the first input. The rounder may further round the first input to a particular number (e.g., a particular floating-point number). In some embodiments, the rounder may round the significand portion and the trailing bit reducer may generate the reduced significand portion from the rounded significand portion (e.g., the first input may be a first rounded input to the trailing bit reducer). In other embodiments, the first reducer may not include a rounder and the significand portion may be pre-rounded (e.g., rounded by another system) or not rounded). The rounder may round the input based on one or more of stochastic rounding, rounding to nearest even, rounding to zero, rounding down, rounding up, or any other rounding method. Stochastic rounding may include rounding the input up to a first number or down to a second number based on probabilities that are tuned based on the relative distance between the input and the first number and the relative distance between the input and the second number respectively. In some embodiments, the input may be rounded based on user input (e.g., a selection of a rounding method). The first reducer may further include an exponent expander to increase a quantity of bits representing an exponent portion of the first input. In some embodiments, the first reduced input may be stored in a 24-bit format.

In some embodiments, the first reducer may generate a second input. In other embodiments, the computing engine 604 may include a second reducer to receive a weight in floating-point format with the first bit-length. The second reducer may identify a quantity of trailing bits of the weight and reduce the quantity of trailing bits of the weight. Further, the second reducer may generate the weight in floating-point format with the second bit-length based on reducing the quantity of trailing bits of the weight. For example, the second input may be a second 22-bit floating-point number.

In block 706, an individual processing element in at least one row of the systolic array multiplies the first reduced input by the second input (e.g., a second number) to generate a multiplier product. In some embodiments, the second input may be a second reduced input. For example, the second input may be a reduced weight. The first reducer may receive the first input and a weight and generate the first reduced input and the second input. Further, the first reducer can select the first reduced input or the second input to be provided to the individual processing element. The individual processing element may include a multiplier to multiply the first reduced input by the second input. For example, each processing element may include a 22-bit multiplier. Further, each processing element may include a multiplier to multiply at least two inputs with the second bit-length (e.g., n-bit numbers). Further, the multiplier may multiply two 22-bit floating-point numbers. The multiplier may include a 1-bit sign data path, an 11-bit significand data path, and a 10-bit exponent data path.

In block 708, the individual processing element adds an input partial sum with the multiplier product to generate an adder partial sum (e.g., an addition result). The individual processing element may further include an adder to add the input partial sum with the multiplier product. For example, each processing element may include a 34-bit adder. Further, each processing element may include an adder to add at least two numbers with a third bit-length (e.g., p-bit numbers where p is greater than n, the multiplier receiving n-bit numbers). Further, the adder may add two floating-point numbers. The adder may include a 1-bit sign data path, a 23-bit significand data path, and a 10-bit exponent data path.

Figure 8:
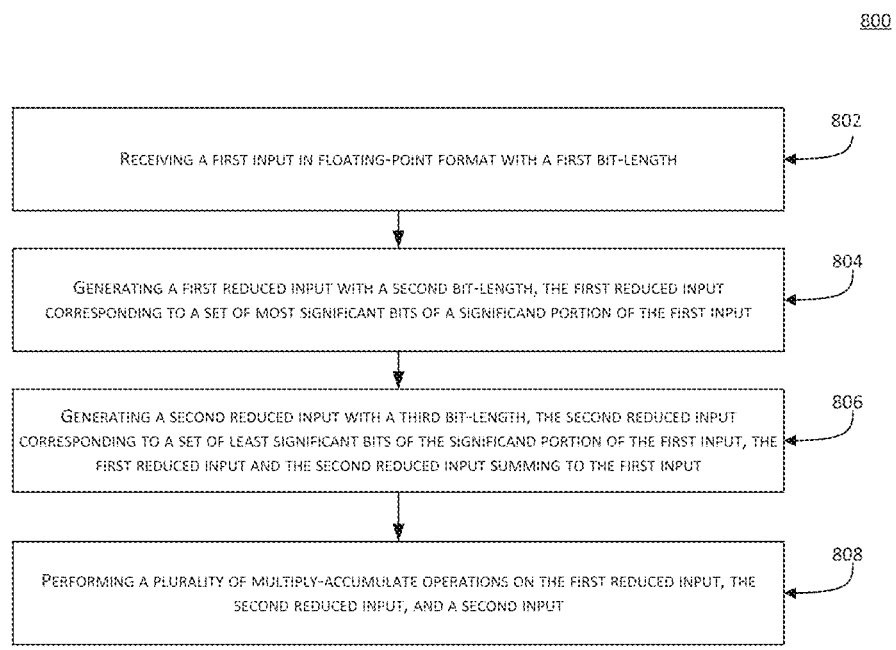
FIG. 8 shows a method executed by a reducer and a processing element for neural network computations, according to some examples of the disclosed technologies.

FIG. 8 shows a method 800 executed by a computing engine 604 utilizing a systolic array, according to some examples of the disclosed technologies. The array may be similar, for example, to the array 100A, and include multiple PEs similar to, e.g., the PE 112a. The systolic array may include a plurality of PEs configured in a plurality of rows and/or a plurality of columns. For example, the systolic array might include 65,536 PEs which are further divided into 256 rows and 256 columns. The computing engine 604 may be a systolic circuit that includes the systolic array and one or more reducers (e.g., convertors) to receive an input with an arbitrary bit-length and convert the arbitrary bit-length input into multiple reduced inputs with a reduced bit-length corresponding to the maximum supported bit-length for elements of the systolic array. For example, the one or more reducers can convert each of a plurality of input data elements (e.g., 32-bit input data elements) into a multiple reduced input data elements (e.g., 21-bit input data elements) and/or each of a plurality of weights (e.g., 32-bit weights) into multiple reduced weights (e.g., 21-bit weights).

In block 802, the systolic array (e.g., a reducer of the systolic array) receives a first input (e.g., an input data element, a weight, etc.) in floating-point format with a first bit-length. For example, the first input may be a 32-bit floating-pint number. The systolic array may also receive a second input (e.g., an input data element, a weight, etc.) for multiply-accumulate operations. The reducer may convert m-bit floating-point numbers to one or more n-bit floating-point numbers, where n can be any number less than m. For example, the reducer can convert 32-bit floating-point numbers to two 21-bit floating-point numbers.

In block 804, the systolic array generates a first reduced input (e.g., a high reduced input) with a second bit-length. The first reduced input may correspond to a set of most significant bits of a significand portion of the first input (e.g., the leading bits of the significand portion of the first input).

In block 806, the systolic array generates a second reduced input (e.g., a low reduced input) with a third bit-length. The second reduced input may correspond to a set of least significant bits of the significand portion of the first input (e.g., the trailing bits of the significand portion of the first input). The first reduced input and the second reduced input may sum to the first input. Further, the second bit-length and the third bit-length may be less than the first bit-length from the first input. For example, the first reduced input and the second reduced input may each be 21-bit floating-point numbers. Further, the reducer may convert an input data element and a weight into respective first and second reduced numbers.

Each of the first reduced input and the second reduced input may be represented in floating-point format. In some embodiments, the reducer may generate the first reduced input and subtract the first reduced input from the first input to generate the second reduced input. For example if the first input includes a first significand "111111101101010101010101," the first reduced input includes a first significand "11111111011," by subtracting the first reduced input from the first input, the second reduced input may be determined as "010101010101." The first reduced input and the second reduced input may be a maximum supported bit-length for the systolic array and/or a particular processing element. In some embodiments, the reducer may include a first sub-reducer to generate the first reduced input. The first sub-reducer may include a trailing bit reducer to reduce a quantity of trailing bits of a significand portion of the first input to produce a high reduced significand portion. The first sub-reducer may further include a first exponent expander to increase a quantity of bits representing an exponent portion of the first input to produce a first increased exponent portion. Based on the first increased exponent portion and the high reduced significand portion, the first sub-reducer may generate the first reduced input (e.g., the high reduced input). Further, the reducer may include a second sub-reducer to generate the second reduced input. The second sub-reducer may include a leading bit reducer to reduce a quantity of leading bits of a significand portion of the first input to produce a low reduced significand portion. The second sub-reducer may further include a second exponent expander to increase a quantity of bits representing an exponent portion of the first input to produce a second increased exponent portion. Based on the second increased exponent portion and the low reduced significand portion, the second sub-reducer may generate the second reduced input (e.g., the low reduced input). In some embodiments, the second sub-reducer may also include a format detector to detect if the first input is denormal or normal, a normalizer to remove an implied bit of the first input and renormalize the low reduced significand portion to produce a normalized significand portion, based on determining the first input is normal, and an exponent adjuster to adjust the second increased exponent portion to produce an adjusted exponent portion based on renormalizing the significand portion. Further, the second reduced input may include the adjusted exponent portion and the normalized significand portion.

In block 808, the systolic array performs a plurality of multiply-accumulate operations on the first reduced input, the second reduced input, and a second input. The first input may be an input data element or a weight and the second input may be the other of the input data element or the weight. In some embodiments, the second input may not be reduced. In other embodiments, the systolic array may reduce the second input to generate a third reduced input and a fourth reduced input for the plurality of multiply-accumulate operations. To perform the plurality of multiply-accumulate operations, the systolic array may calculate a plurality of partial sums. Further, for each combination of high/low reduced inputs, the systolic array can calculate a partial sum. For example, the systolic array can include processing elements to conduct multiply-accumulate operations on the reduced inputs. The processing elements may each include a multiplier to multiply two 21-bit floating-point numbers and an adder to add two floating-point numbers. Further, the multiplier may include a 1-bit sign data path, an 11-bit significand data path, and a 9-bit exponent data path and the adder may include a 1-bit sign data path, a 23-bit significand data path, and a 10-bit exponent data path. Further, the reducer may produce the reduced inputs and select the reduced inputs to be provided for processing by the processing element. The plurality of operations may be a plurality of ordered multiply-accumulate operations (e.g., a plurality of multiply operations and a plurality of accumulate operations for the first input). The processing element may include a multiplier to multiply at least two n-bit number and an adder to add two p-bit numbers, where p may be any number greater than n. For example, the multiplier be a 21-bit multiplier to multiply two 21-bit numbers and the adder may be a 34-bit adder. Further, to perform the operations, the processing element can multiply the second reduced input and a second reduced weight to generate a first product, multiply the first reduced input and the second reduced weight to generate a second product, multiply the second reduced input and the first reduced weight to generate a third product, multiply the second reduced input and the first reduced weight to generate a fourth product, add the first product to an input partial sum to generate a first sum, add the first sum to the second product to generate a second sum, add the second sum and the third product to generate a third sum, and add the third sum and the fourth product to generate a total product or output.

The systolic array may generate a full precision total output from the plurality of partial sums for the first input and the second input (e.g., the input data element and the weight) based on the reduced inputs. In some embodiments, to generate the total output, the systolic array may provide each sub-product to an adder (e.g., an accumulator). The adder can perform chunk-based accumulation on the output of the systolic array (e.g., each of the sub-products).

To better illustrate operation of a systolic array utilizing multiple combinations of reduced inputs, FIG. 9A-9H illustrates an example four PE column 900 of a systolic array for neural network computations processing multiply-accumulate operations over systolic intervals 0 through 9 according to certain examples of the disclosed technologies. The PE column 900 may be part of a systolic array similar to the systolic array 100A in FIG. 1A, which may extend for any plurality of rows and plurality of columns. In some embodiments, the systolic array may include a full multiply-accumulate operation for each combination of reduced inputs (e.g., low input/weight and high input/weight) and the output of each operation may be summed.

The PE column 900 includes four PEs labeled as PE00, PE10, PE20, and PE30 according to their row and column (RC) number. In the example of FIGS. 9A-9J, the column 900 is implementing two-pass multiply-accumulate operations. For example, an input data element may be converted into two reduced input data elements for multiply-accumulate operations. The weight may be preloaded into the array and the weight may be used in multiply-accumulate operations for each reduced input to generate an output. In some embodiments, the weight may also be converted into two (or any number of) reduced weights). A first reduced weight (e.g., the low reduced weight) from the weight may be preloaded for multiply-accumulate operations with reduced input data elements and, subsequently, a second reduced weight (e.g., the high reduced weight) from the weight may be loaded for multiply-accumulate operations with the same reduced input data elements. The output for each combination of a reduced input and a reduced weight may be summed to generate a total output. It will be understood that the column 900 may implement n-pass multiply accumulate operations where n can be any number. For example, the weight can be converted into any number of reduced weights and each weight may iteratively loaded into the systolic array for multiply-accumulate operations with a set of reduced input data elements.

Each PE illustratively includes a multiplier with a single systolic interval latency (e.g., inputs provided at interval n are provided as outputs at interval n+1) and an adder with a two-interval latency (e.g., inputs provided at interval n are provided as outputs at interval n+2). Adders with other latencies may be implemented. As shown in FIGS. 9A-9H, each PE of the PE column 900 respectively includes a data register Data RegRC for receiving an input data element, a weight storing register Weight RegRC, a multiplier represented by an "X", and an adder or accumulator represented by a "+".

Values provided as input partial sums at systolic intervals 0-9 are shown along the top, with PE00 receiving values A1. (While value A1 is shown for illustrative purposes, in some instances all partial input sums fed to a top row of an array may be set to the same value, which may be zero). Values provided as input data elements at systolic intervals 0-9 are shown along the left column, with PE00 in row 0 receiving values C1 and C2 at the illustrated times, PE10 in row 1 receiving values D1 and D2 at the illustrated times, PE20 in row 2 receiving values E1 and E2 at the illustrated times, and PE30 in row 3 receiving values F1 and F2 at the illustrated times. C1, D1, E1, and F1 may each be a first reduced input data element (e.g., a low reduced input data element) and C2, D2, E2, and F2 may each be a second reduced input data element (e.g., a high reduced input data element). G1, H1, I1, and J1 may be the weight. In some embodiments, the weights may be each converted into a first reduced weight (e.g., a low reduced weight) and a second reduced weight (e.g., a high reduced weight). When no value is illustrated, a zero or NOP can be assumed. Where indicated, the system is initialized with zero values for clarity and to facilitate understanding. However, other examples can occur at different states and/or with other internal values.

FIG. 9A-9H show the progression of data as multiply-accumulate operations are performed. The multiply-accumulate operations across the shown intervals include (as discussed in more detail below): multiplying weight G1 by input data element C1 and accumulating input partial sum A1; multiplying weight G1 by input data element C2; multiplying weight H1 by input data element D1 and accumulating input partial sum X1 from PE00; multiplying weight H1 by input data element D2 and accumulating input partial sum X2 from PE00; multiplying weight I1 by input data element E1 and accumulating input partial sum Y1 from PE10; multiplying weight I1 by input data element E2 and accumulating input partial sum Y2 from PE10; multiplying weight J1 by input data element F1 and accumulating input partial sum Z1 from PE20; and multiplying weight J1 by input data element F2 and accumulating input partial sum Z2 from PE20. The technology disclosed herein can extend to additional sequences of input data elements and input partial sums.

Figure 9A:
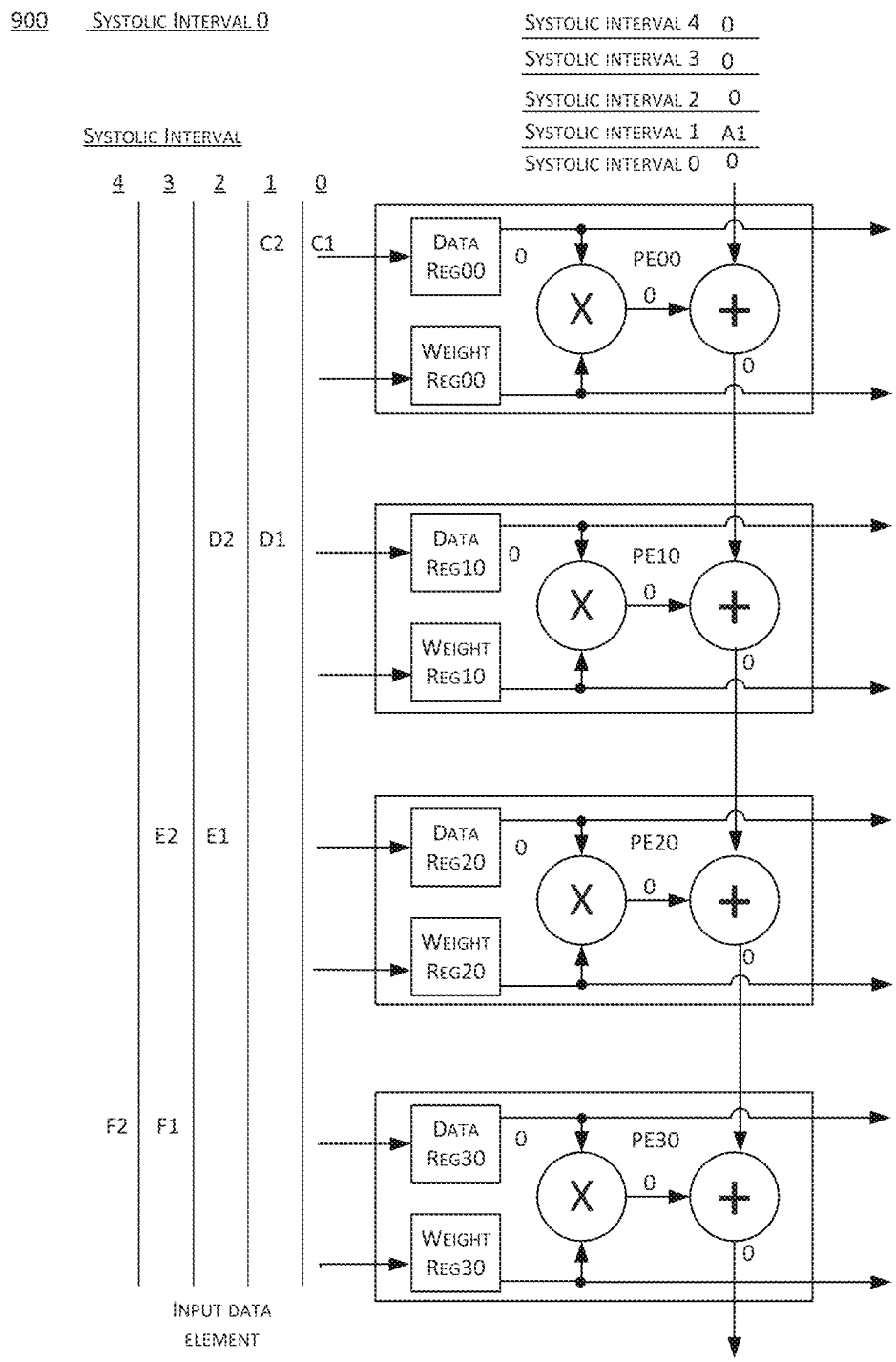
FIGS. 9A-9H show an example systolic array processing data over a sequence of systolic intervals.

FIG. 9A shows the state of the PE column 900 at systolic interval 0. The weights G1, H1, I1, and J1 are each preloaded into respective weight registers. For example, the weights G1, H1, I1, and J1 may be pre-loaded in a weight load operation. In PE00, an input data element C1 is received for writing to and storing in Data Reg00 for use during the next systolic interval. All other inputs and other states are initialized to zero.

Figure 9B:
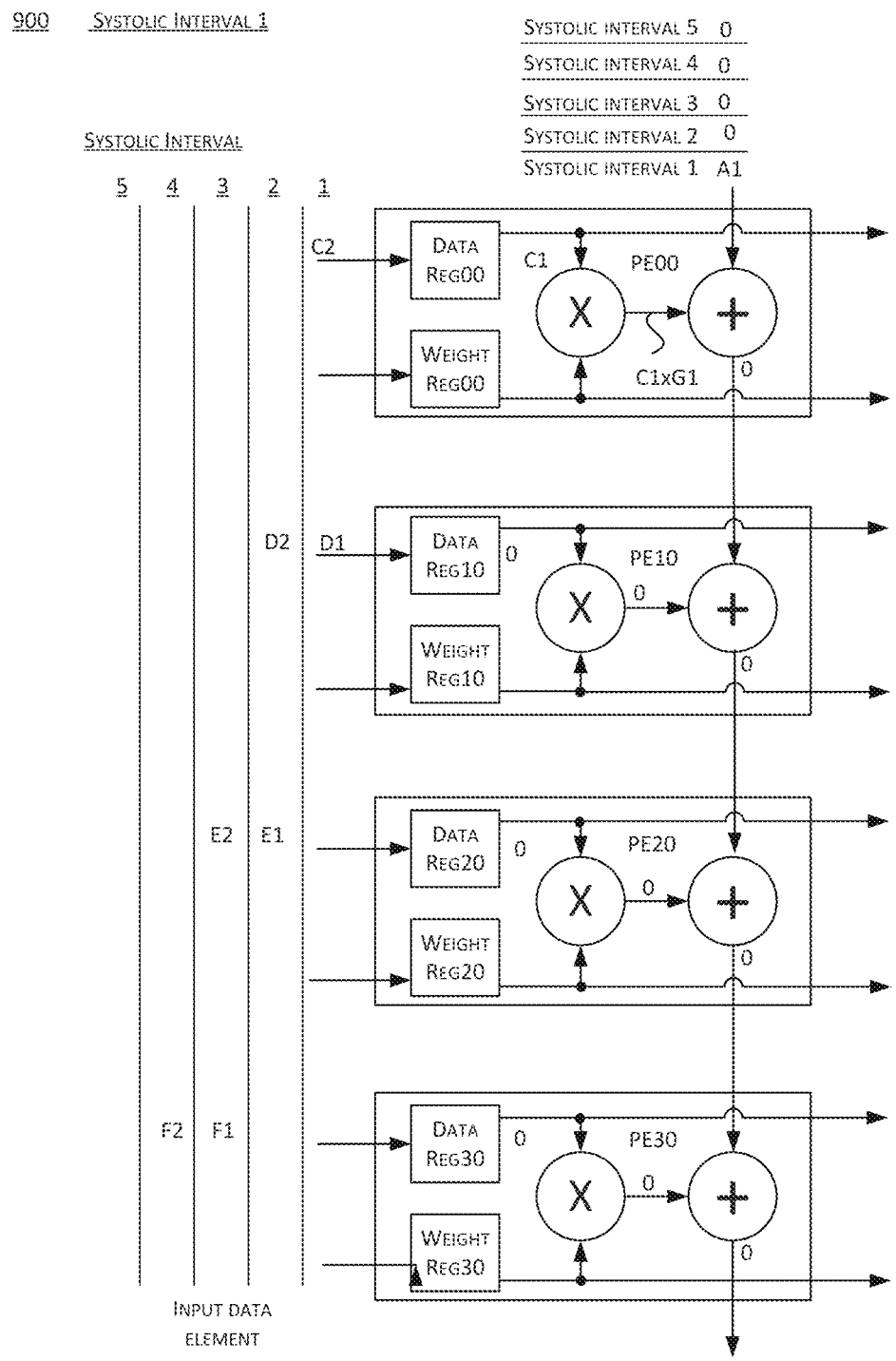

FIG. 9B shows the state of the PE column 900 at systolic interval 1. In PE00, an input data element C2 is received for writing to and storing in Data Reg00 for use during the next systolic interval. In some embodiments, the weight G1 may be preloaded into Weight Reg00 for multiply systolic intervals and may not be preloaded again. For example, the weight G1 may be preloaded for a plurality of multiply-accumulate operations with a plurality of reduced input data elements. The weight G1 may subsequently be replaced with a new weight, G2, for multiply-accumulate operations with the reduced inputs. For example, G1 and G2 may be reduced weights generated from a weight. Therefore, the weight G1 may only be preloaded into the array once. It will be understood that the combination of inputs or weights may be ordered such that any of the reduced inputs or weights may be stored in respective data registers for multiple systolic intervals and may not be reread into the PE. For example, the combinations of reduced inputs or weights may be ordered or distributed such that the weight G1 is not reread into the PE. The stored input data element C1 is read from Data Reg00 and provided as an input to both the multiplier of PE00 and a data register of a PE in a subsequent column. The multiplier in PE00 multiplies C1 by G1 to generate a multiplication result C1×G1, which is provided to an adder for PE00. The input partial sum A1 is also received at the adder for PE00. Each adder is pipelined with a latency of 2 intervals, and as such processes the respective input partial sum and the respective multiplication result during a time period corresponding to the latency (e.g., the subsequent 2 intervals).

In PE10, an input data element D1 is received for writing to and storing in Data Reg10 for use during the next systolic interval.

Figure 9C:
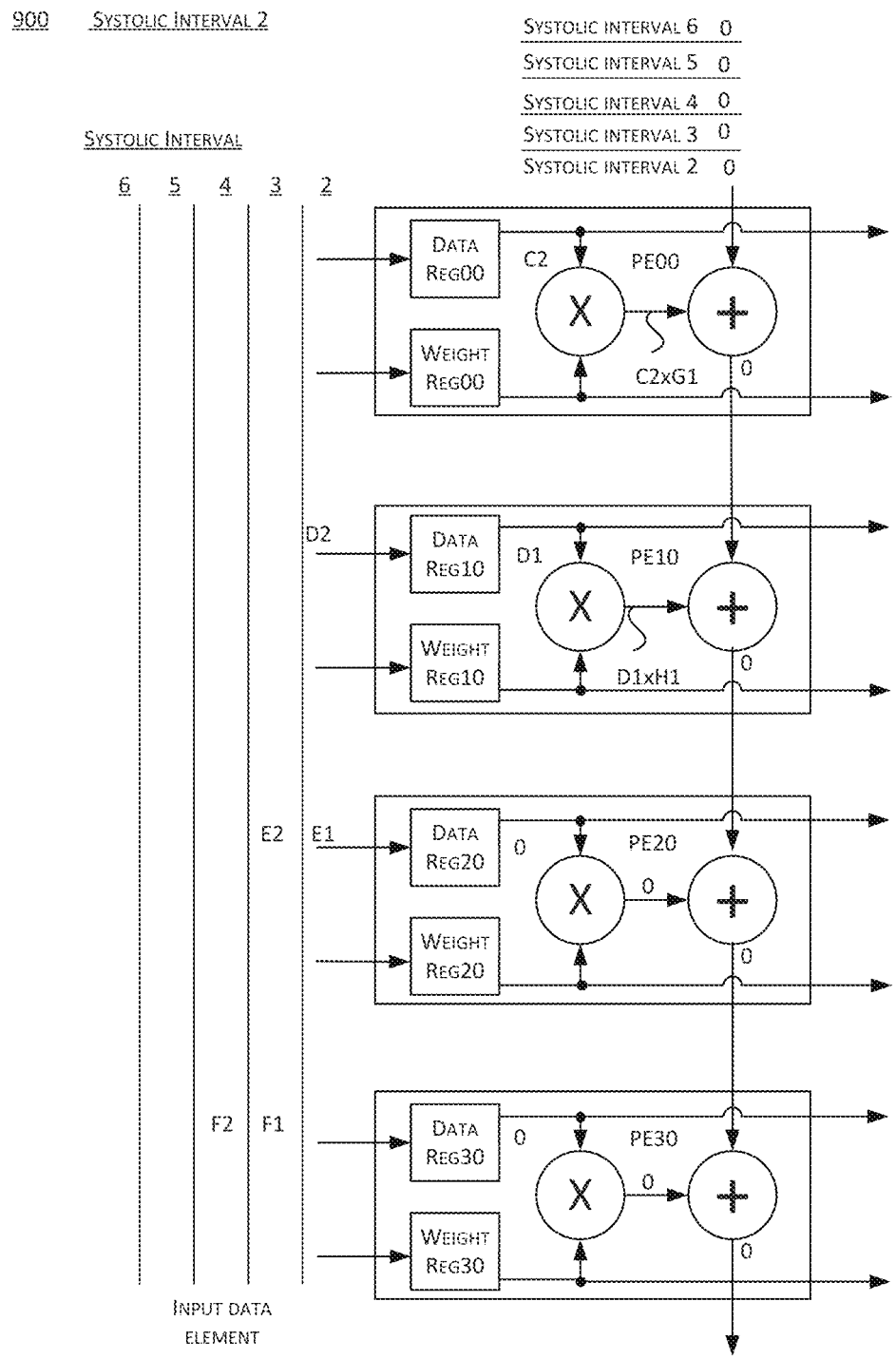

FIG. 9C shows the state of the PE column 900 at systolic interval 2. In PE00, the input data element C2 is read from Data Reg00 and provided as an input to both the multiplier of PE00 and a data register of a PE in a subsequent column. The multiplier in PE00 multiplies C2 by G1 to generate a multiplication result C2×G1, which is provided to the adder for PE00 for use in an adder operation. Note that during systolic interval 2, the adder of PE00 continues to conduct an add operation between the multiplication result C1×G1 and the input partial sum A1, as obtained during interval 1.

In PE10, an input data element D2 is received for writing to and storing in Data Reg10 for use during the next systolic interval. The stored input data element D1 is read from Data Reg10 and provided as an input to both the multiplier of PE10 and a data register of a PE in a subsequent column.

The multiplier in PE10 multiplies D1 by H1 to generate a multiplication result D1×H1, which is provided to an adder for PE10.

In PE20, an input data element E1 is received for writing to and storing in Data Reg20 for use during the next systolic interval.

Figure 9D:
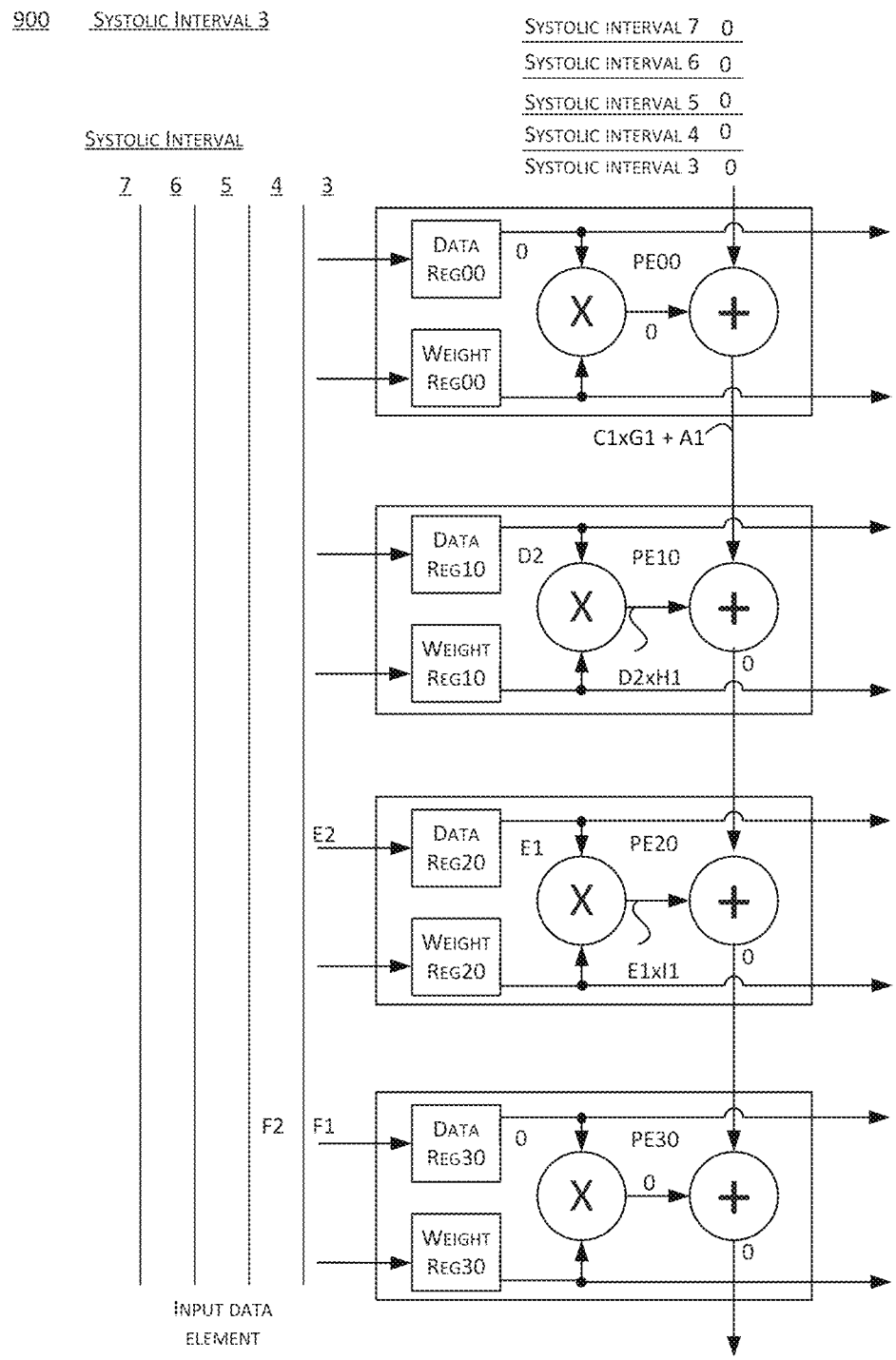

FIG. 9D shows the state of the PE column 900 at systolic interval 3. In PE00, the adder completes the addition of A1 and C1×G1 and generates an addition result, A1+C1×G1. The addition result, A1+C1×G1, is communicated to PE10 as an input partial sum. The additional result of a PE within a given column can generally be referred to herein as a "partial sum." Note that during systolic interval 3, the adder of PE00 continues to conduct an add operation between the multiplication result C2×G1, as obtained during interval 2.

In PE10, the stored input data element D2 is read from Data Reg10 and provided as an input to both the multiplier of PE10 and a data register of a PE in a subsequent column. The multiplier in PE10 multiplies D2 by H1 to generate a multiplication result D2×H1, which is provided to an adder for PE10. The input partial sum, C1×G1+A1, is received from PE00 and is also provided to the adder for PE10 for use in the adder operation. Note that during systolic interval 3, the adder of PE10 continues to conduct an add operation between the multiplication result D1×H1 and the input partial sum from PE00 (A1+C1×G1).

In PE20, an input data element E2 is received for writing to and storing in Data Reg20 for use during the next systolic interval. The stored input data element E1 is read from Data Reg20 and provided as an input to both the multiplier of PE20 and a data register of a PE in a subsequent column. The multiplier in PE20 multiplies E1 by I1 to generate a multiplication result E1×I1, which is provided to the adder for PE20 for use in an adder operation.

In PE30, an input data element F1 is received for writing to and storing in Data Reg30 for use during the next systolic interval.

Figure 9E:
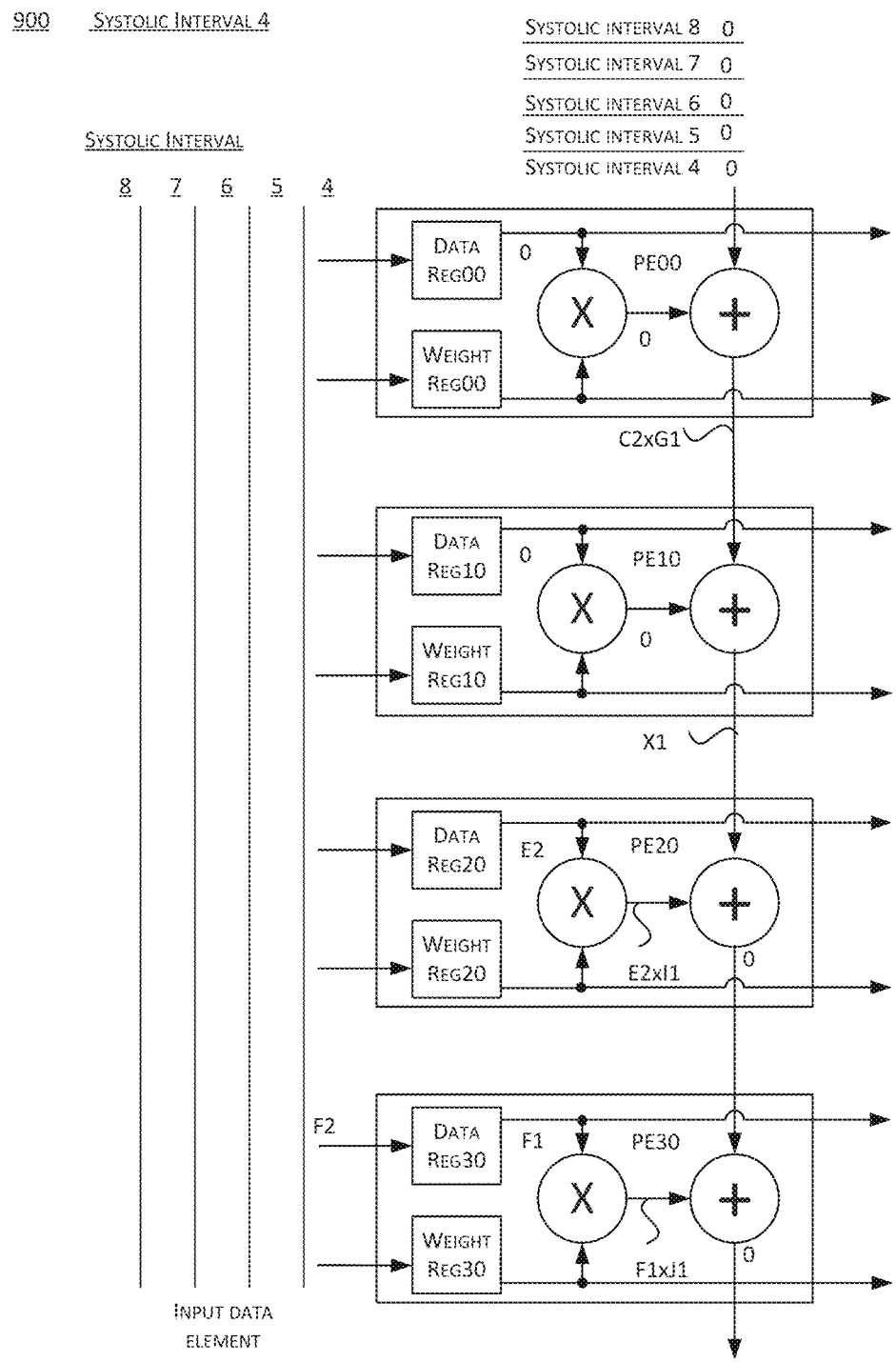

FIG. 9E shows the state of the PE column 900 at systolic interval 4. the adder completes the addition of 0 and C2×G1 and generates an addition result, C2×G1. In some embodiments, the input partial sum A1 may be added to each combination of the reduced inputs. For example, where each input is converted into two reduced inputs resulting in four combinations of reduced inputs for each weight and input data element (e.g., a four-pass multiply-accumulate operation for a pair of inputs), the input partial sum may be added to each combination of reduced inputs. In other embodiments, a portion of the input partial sum may be added to each combination of reduced inputs. For example, the input partial sum may be divided across each combination of reduced inputs. The addition result, C2×G1, is communicated to PE10 as an input partial sum.

In PE10, the input partial sum, C2×G1, is received from PE00 and is also provided to the adder for PE10 for use in the adder operation. Note that during systolic interval 4, the adder of PE10 continues to conduct an add operation between the multiplication result D2×H1 and the input partial sum from PE00 (C2×G1).

Further, in PE10, the adder completes the addition of D1×H1+C1×G1+A1 and generates an addition result, X1. The addition result, X1, is communicated to PE20 as an input partial sum.

In PE20, the stored input data element E2 is read from Data Reg20 and provided as an input to both the multiplier of PE20 and a data register of a PE in a subsequent column. The multiplier in PE20 multiplies E2 by I1 to generate a multiplication result E2×I1, which is provided to the adder for PE20 for use in an adder operation. The input partial sum, X1, is received from PE10 and is also provided to the adder for PE20 for use in the adder operation. Note that during systolic interval 4, the adder of PE20 continues to conduct an add operation between the multiplication result E1×I1 and the input partial sum from PE10 (X1).

In PE30, an input data element F2 is received for writing to and storing in Data Reg30 for use during the next systolic interval. The stored input data element F1 is read from Data Reg30 and provided as an input to both the multiplier of PE30 and a data register of a PE in a subsequent column. The multiplier in PE30 multiplies F1 by J1 to generate a multiplication result F1×J1, which is provided to the adder for PE30 for use in an adder operation.

Figure 9F:
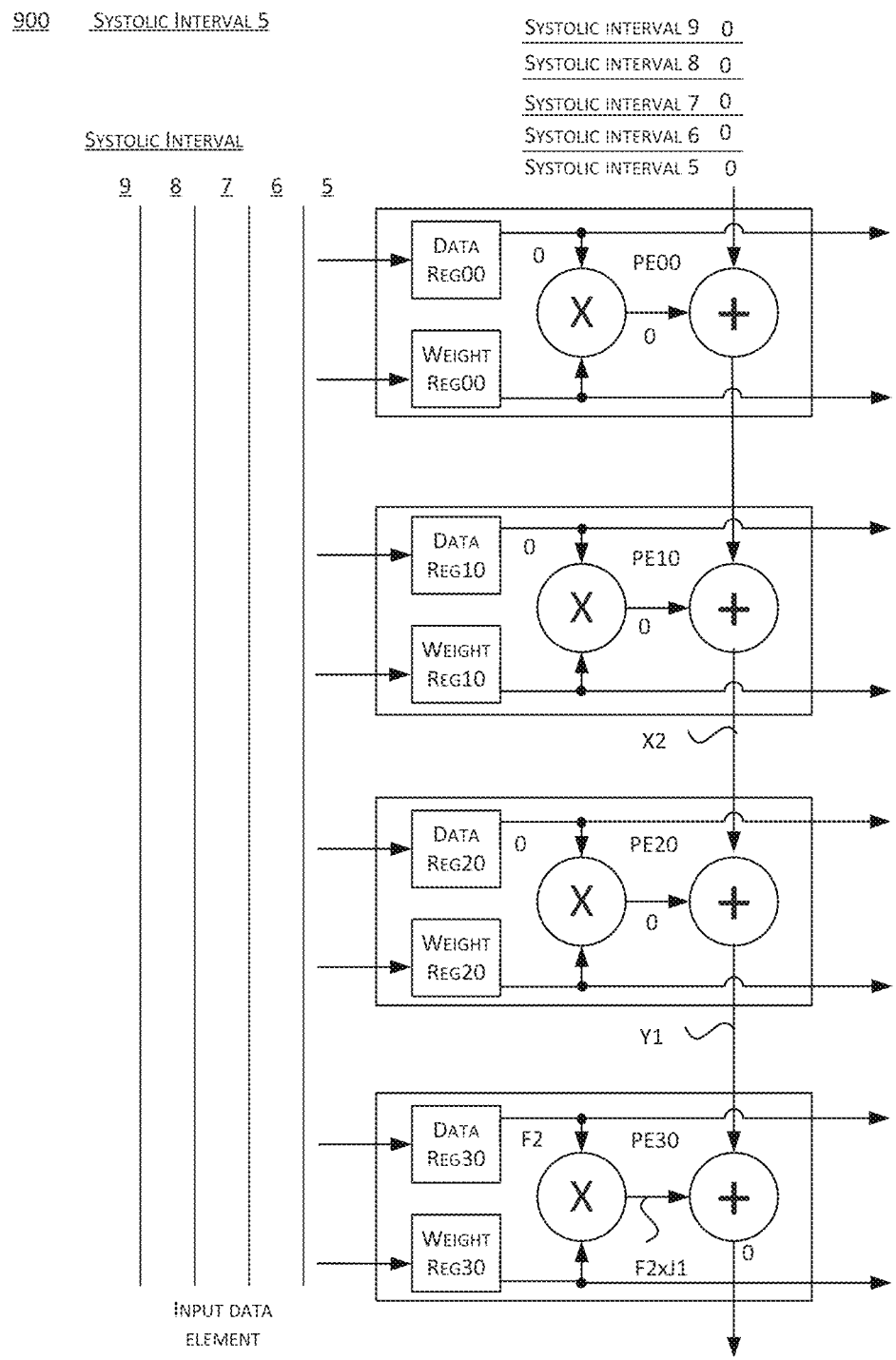

FIG. 9F shows the state of the PE column 900 at systolic interval 5. In PE10, the adder completes the addition of D2×H1+C2×G1 and generates an addition result, X2. The addition result, X2, is communicated to PE20 as an input partial sum.

In PE20, the input partial sum, X2, is received from PE10 and is also provided to the adder for PE20 for use in the adder operation. Note that during systolic interval 5, the adder of PE20 continues to conduct an add operation between the multiplication result E2×I1 and the input partial sum from PE10 (X2).

Further, in PE20, the adder completes the addition of E1×I1+X1 and generates an addition result, Y1. The addition result, Y1, is communicated to PE30 as an input partial sum.

In PE30, the stored input data element F2 is read from Data Reg30 and provided as an input to both the multiplier of PE30 and a data register of a PE in a subsequent column. The multiplier in PE30 multiplies F2 by J1 to generate a multiplication result F2×J1, which is provided to the adder for PE30 for use in an adder operation. Note that during systolic interval 5, the adder of PE30 continues to conduct an add operation between the multiplication result F1×J1, as obtained during interval 4 and the input partial sum from PE20 (Y1).

Figure 9G:
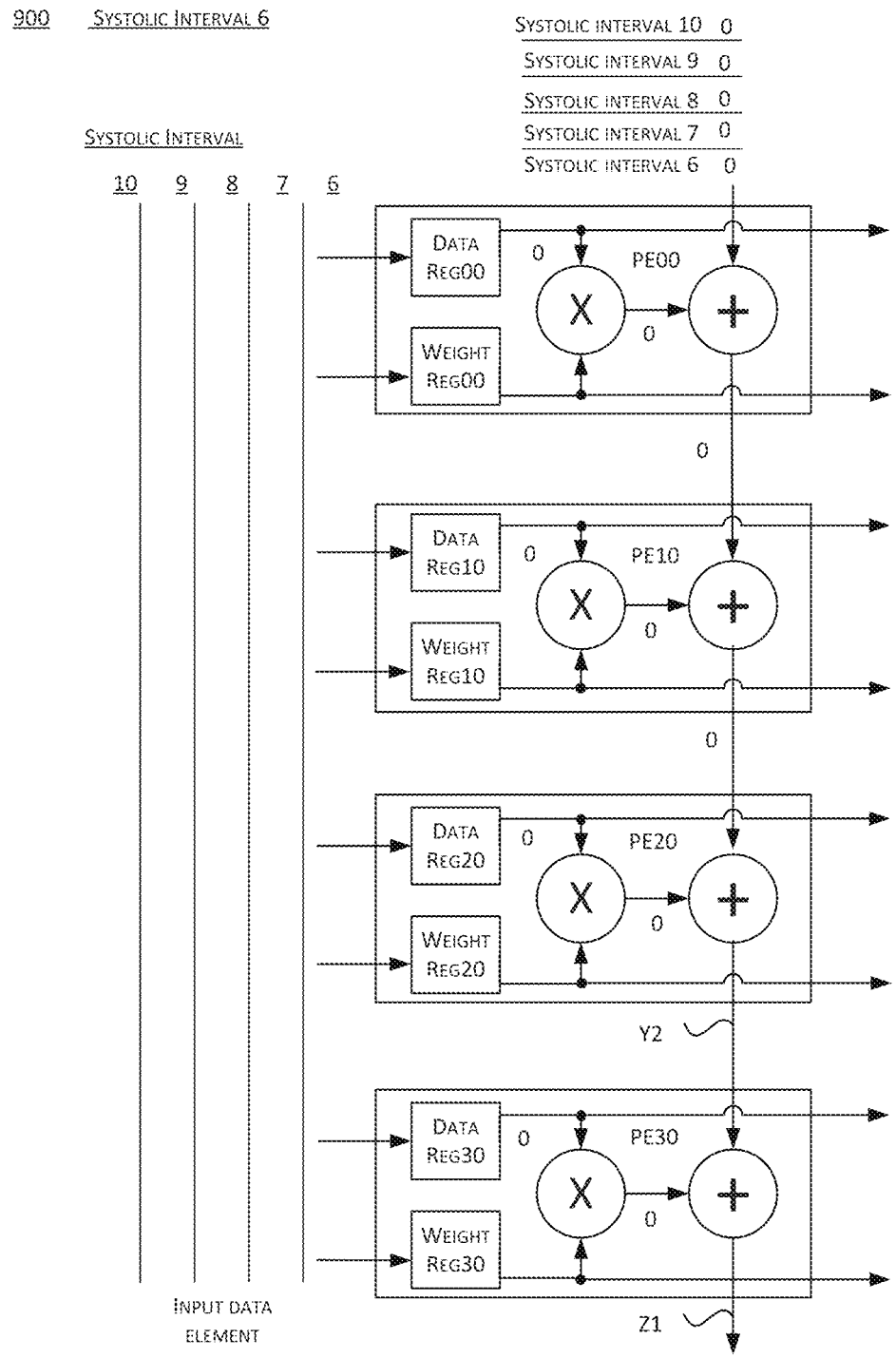

FIG. 9G shows the state of the PE column 900 at systolic interval 6. In PE20, the adder completes the addition of E2×I1+X2 and generates an addition result, Y2. The addition result, Y2, is communicated to PE30 as an input partial sum.

In PE30, the adder of PE30 continues to conduct an add operation between the multiplication result F2×J1, as obtained during interval 5 and the input partial sum from PE20 (Y2).

Further, in PE30, the adder completes the addition of F1×J1+Y1 and generates an addition result, Z1. The addition result, Z1, may be communicated to another PE and/or to an aggregator for aggregation with additional combinations of the reduced inputs for a particular set of inputs.

Figure 9H:
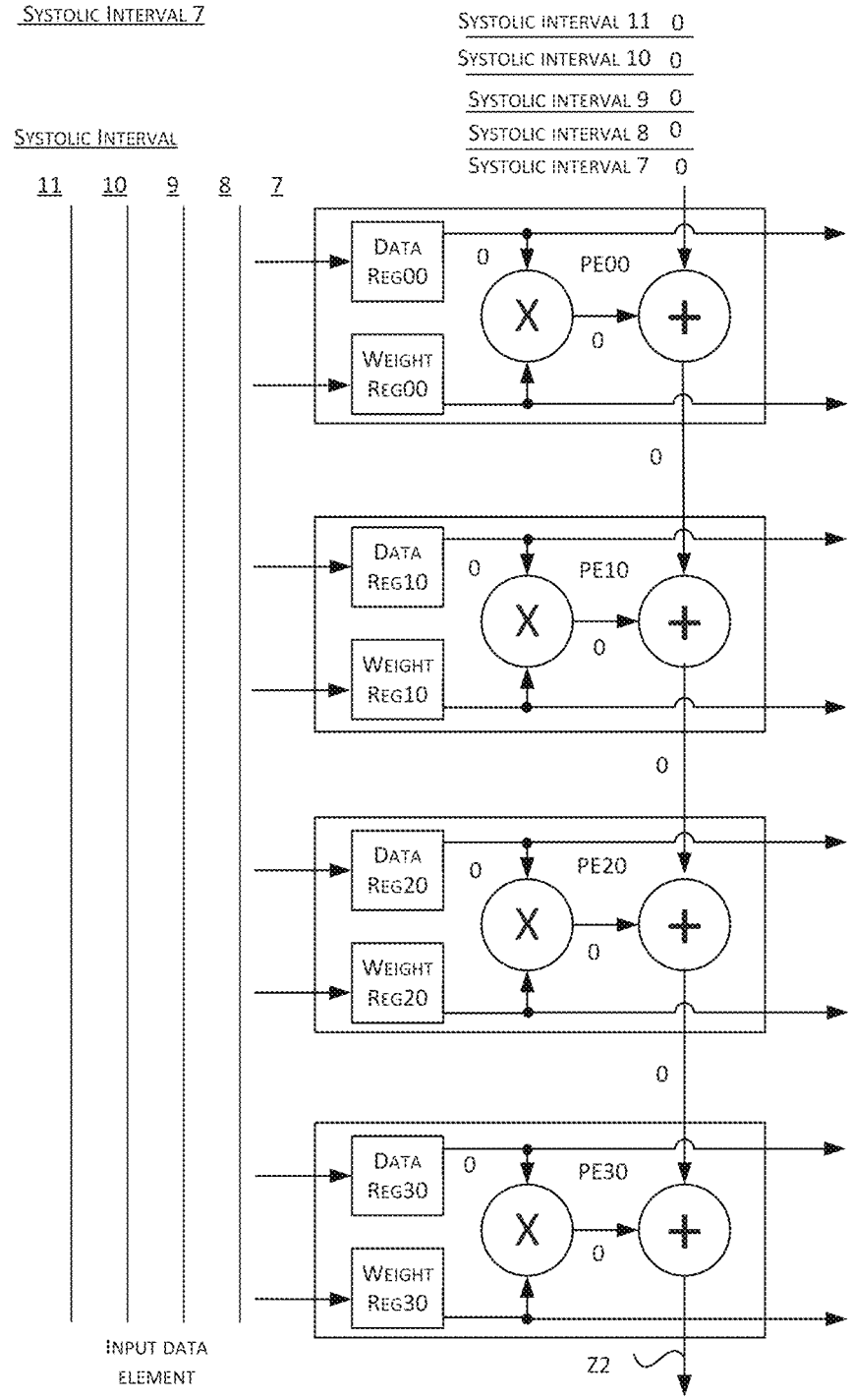

FIG. 9H shows the state of the PE column 900 at systolic interval 7. In PE30, the adder completes the addition of F2×J1+Y2 and generates an addition result, Z2. The addition result, Z2, may be communicated to another PE and/or to an aggregator for aggregation with additional combinations of the reduced inputs for a particular set of inputs.

The examples states of data flow illustrated in FIG. 9A-9H can be performed for one or more starting input data elements and for any number of starting input partial sums.

Figure 10:
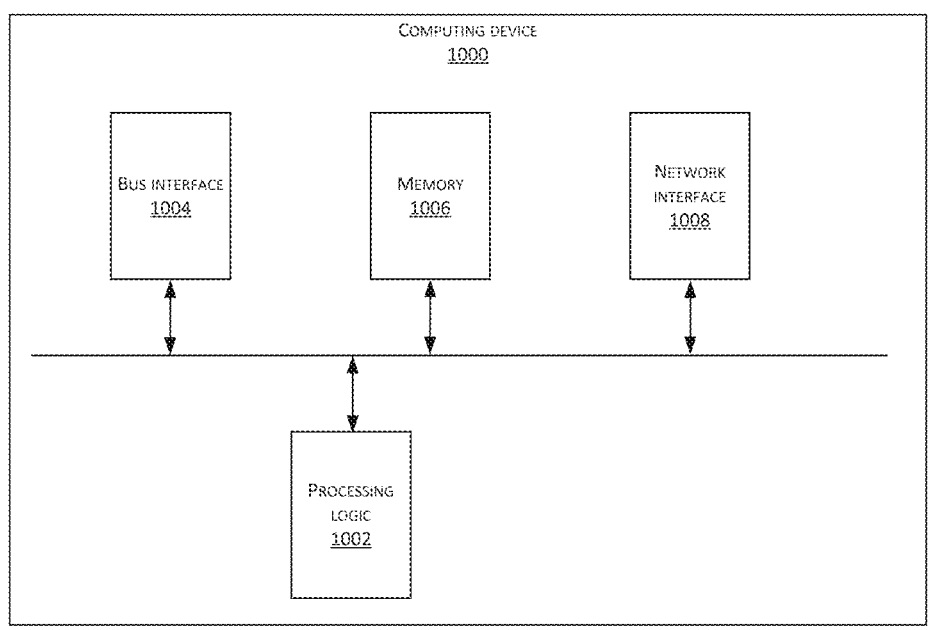
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations. A computing device 1000 may perform computations to facilitate processing of a task. As an illustrative example, computing device 1000 can be part of a server in a multi-tenant compute service system. Various hardware and software resources of computing device 1000 (e.g., the hardware and software resources associated with data processing) can be allocated to a client upon request.

In one example, the computing device 1000 may include processing logic 1002, a bus interface module 1004, memory 1006, and a network interface module 1008. These modules may be hardware modules, software modules, or a combination of hardware and software. In certain instances, modules may be interchangeably used with components or engines, without deviating from the scope of the disclosure. The computing device 1000 may include additional modules, which are not illustrated here for the ease of illustration. In some embodiments, the computing device 1000 may include fewer modules. For example, one or more of the modules may be combined into one module. One or more of the modules may be in communication with each other over a communication channel 1010. The communication channel 1010 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), and network processing units (NPUs), processors configured to execute instructions or any other circuitry to perform logical arithmetic and floating-point operations. Examples of processors that may be included in the processing logic 1002 may include processors developed by ARM®, MIPS®, AMD®, Qualcomm®, and the like. In some embodiments, the processors may include multiple processing cores and each processing core may execute instructions independently of the other processing cores. Further, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some embodiments, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1006. The processing logic 1002 may also include hardware circuities for performing artificial neural network computations including, for example, the neural network processor 602, etc.

The access to the processing logic 1002 can be granted to a client to provide the personal assistant service requested by the client. For example, the computing device 1000 may host a virtual machine, on which an image recognition software application can be executed. The image recognition software application, upon execution, may access the processing logic 1002 to predict, for example, an object included in an image. As another example, access to the processing logic 1002 can also be granted as part of bare-metal instance, in which an image recognition software application executing on a client device (e.g., a remote computer, a smart phone, etc.) can directly access the processing logic 1002 to perform the recognition of an image.

The memory 1006 may include either volatile or non-volatile, or both volatile and non-volatile types of memory. The memory 1006 may, for example, include random access memory (RAM), read only memory (ROM), Electrically Erasable Programmable Read-Only Memory (EEPROM), flash memory, and/or some other suitable storage media. In some cases, some or all of the memory 1006 may be internal to the computing device 1000, while in other cases some or all of the memory may be external to the computing device 1000. The memory 1006 may store an operating system comprising executable instructions that, when executed by the processing logic 1002, provides the execution environment for executing instructions providing functionality to perform convolution computations for the computing device 1000. The memory 1006 may also store, for example, software applications for performing artificial neural network computations. The memory may also store and maintain several data structures and tables for facilitating the functionality of the computing device 1000.

The bus interface module 1004 may enable communication with external entities, such as a host device and/or other components in a computing system, over an external communication medium. The bus interface module 1004 may include a physical interface for connecting to a cable, socket, port, or other connection to the external communication medium. The bus interface module 1004 may further include hardware and/or software to manage incoming and outgoing transactions. The bus interface module 1004 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1004 may include the physical layer for any of these bus protocols, including a connector, power management, and error handling, among other things. In some embodiments, the computing device 1000 may include multiple bus interface modules for communicating with multiple external entities. These multiple bus interface modules may implement the same local bus protocol, different local bus protocols, or a combination of the same and different bus protocols.

The network interface module 1008 may include hardware and/or software for communicating with a network. This network interface module 1008 may, for example, include physical connectors or physical ports for wired connection to a network, and/or antennas for wireless communication to a network. The network interface module 1008 may further include hardware and/or software implementing a network protocol stack. The network interface module 1008 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some embodiments, the computing device 1000 may include multiple network interface modules, each configured to communicate with a different network. For example, the computing device 1000 may include a network interface module for communicating with a wired Ethernet network, a wireless 1002.11 network, a cellular network, an Infiniband network, etc. In some embodiments, the computing device 1000 may receive a set of parameters, such as the aforementioned weight values for convolution computations, from a server through network interface module 1008.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Various example embodiments of the disclosure can be described by the following clauses:

Clause 1: A systolic array processor organized in rows and columns, each row comprising:
 a reducer, the reducer configured to convert 32-bit input data elements into reduced 22-bit input data elements, the reducer comprising:
  a trailing bit reducer configured to reduce a quantity of bits representing a significand portion of a 32-bit input data element of the 32-bit input data elements to produce a reduced significand portion of the 32-bit input data element;
  a rounder configured to round the reduced significand portion of the 32-bit input data element to produce a rounded significand portion; and
  an exponent expander configured to increase a quantity of bits representing an exponent portion of the 32-bit input data element to produce an increased exponent portion,
  wherein the reducer produces a reduced 22-bit input data element based on the rounded significand portion and the increased exponent portion; and
 a plurality of processing elements, the plurality of processing elements configured to receive the reduced 22-bit input data elements from the reducer and to receive weights for performing multiply-accumulate operations.

Clause 2: The systolic array processor of Clause 1, wherein the reducer is further configured to convert 32-bit weights into the weights.

Clause 3: The systolic array processor of Clause 1, wherein the reducer further comprises a first reducer, each row further comprising:
 a second reducer, the second reducer configured to convert 32-bit weights into the weights.

Clause 4: The systolic array processor of Clause 1, wherein the rounder is configured to round the reduced significand portion of the 32-bit input data element based on one or more of:
 stochastic rounding;
 rounding to nearest even;
 rounding to zero;

Clause 5: A systolic circuit comprising:
a group of processing elements arranged into a plurality of rows; and
a first convertor configured to:
receive a first input represented in floating-point with a first bit-length;
identify a quantity of trailing bits of the first input;
reducing the quantity of trailing bits of the first input; and
generate a first reduced input represented in floating-point with a second bit-length based on reducing the quantity of trailing bits of the first input, wherein the second bit-length is less than the first bit-length, wherein the second bit-length corresponds to a bit-length supported by the group of processing elements;
wherein an individual processing element in at least one row of the group of processing elements is configured to receive the first reduced input from the first convertor and to receive a second input for performing multiply-accumulate operations.

Clause 6: The systolic circuit of Clause 5, wherein individual processing elements in the plurality of rows of the group of processing elements comprise:
a multiplier configured to multiply two 22-bit floating-point numbers, wherein the multiplier is comprised of a 1-bit sign data path, a 11-bit significand data path, and a 10-bit exponent data path; and
an adder configured to add two floating-point numbers, wherein the adder is comprised of a 1-bit sign data path, a 23-bit significand data path, and a 10-bit exponent data path.

Clause 7: The systolic circuit of Clause 5, wherein the first input comprises an input data element and the second input comprises a reduced weight, wherein the first convertor is further configured to:
receive the first input and a weight;
generate the first reduced input and the second input; and
select the first reduced input or the second input to be provided.

Clause 8: The systolic circuit of Clause 5, wherein the first convertor comprises:
a trailing bit reducer configured to reduce a quantity of bits representing a significand portion of the first input to produce a reduced significand portion of the first input;
a rounder configured to round the reduced significand portion of the first input based on a remainder of the bits representing the significand portion of the first input not included within the reduced significand portion; and
an exponent expander configured to increase a quantity of bits representing an exponent portion of the first input.

Clause 9: The systolic circuit of Clause 5, wherein the first input comprises a first rounded input, wherein the first convertor comprises:
a trailing bit reducer configured to reduce a quantity of bits representing a significand portion of the first input to produce a reduced significand portion of the first input; and
an exponent expander configured to increase a quantity of bits representing an exponent portion of the first input.

Clause 10: The systolic circuit of Clause 5, wherein the first reduced input comprises a first reduced rounded input, wherein the first reduced rounded input is rounded based on one or more of:
stochastic rounding;
rounding to nearest even;
rounding to zero;
rounding down; or
rounding up.

Clause 11: The systolic circuit of Clause 5, wherein the first reduced input comprises a first reduced rounded input, wherein the first reduced rounded input is rounded based on a user input.

Clause 12: The systolic circuit of Clause 5, wherein:
the first convertor is configured to convert 32-bit floating-point numbers to 22-bit floating-point numbers, wherein each of the processing elements comprises:
a 22-bit multiplier; and
a 34-bit adder.

Clause 13: The systolic circuit of Clause 5, wherein:
the first convertor is further configured to convert m-bit floating-point numbers to n-bit floating-point numbers, wherein n and m can be any positive integer, wherein n is less than m,
wherein each of the processing elements comprises:
a multiplier configured to multiply at least two n-bit numbers; and
an adder configured to add two p-bit numbers, wherein p is greater than n.

Clause 14: The systolic circuit of Clause 5, wherein to reduce the quantity of trailing bits of the first input, the first convertor is configured to:
set the quantity of trailing bits to zero.

Clause 15: The systolic circuit of Clause 5, further comprising:
a second convertor configured to:
receive a weight represented in floating-point with the first bit-length;
identify a quantity of trailing bits of the weight;
reduce the quantity of trailing bits of the weight; and
generate the second input represented in floating-point with the second bit-length based on reducing the quantity of trailing bits of the weight.

Clause 16: The systolic circuit of Clause 5, wherein the first reduced input is stored in a 24-bit format.

Clause 17: A method, comprising:
receiving a first input represented in floating-point with a first bit-length;
reducing a quantity of trailing bits of the first input;
generating a first reduced input represented in floating-point with a second bit-length based on reducing the quantity of trailing bits of the first input, wherein the second bit-length is less than the first bit-length, wherein the second bit-length corresponds to a supported bit-length; and
receiving the first reduced input and a second input for performing multiply-accumulate operations.

Clause 18: The method of Clause 17, wherein:
the first input comprises a 32-bit floating-point number;
the first reduced input comprises a first 22-bit floating-point number; and
the second input comprises a second 22-bit floating-point number.

Clause 19: The method of Clause 17, wherein generating the first reduced input comprises:
rounding the first input to generate the first reduced input, based on a remainder of non-trailing bits of the first input, wherein the first input comprises a quantity of bits, wherein rounding the first input comprises rounding a portion of the quantity of bits.

Clause 20: The method of Clause 17, wherein one or more of the first reduced input or the second input comprises a rounded, reduced input, wherein the rounded, reduced input is rounded based on one or more of:
stochastic rounding;
rounding to nearest even;
rounding to zero;
rounding down; or
rounding up.

Various example embodiments of the disclosure can be described by the following clauses:

Clause 1: A systolic array processor organized in rows and columns, each row comprising:
  a reducer configured to convert 32-bit input data elements into two 21-bit input data elements, the reducer comprising:
    a first sub-reducer configured to convert a 32-bit input data element of the 32-bit input data elements into a first 21-bit input data element, the first 21-bit input data element corresponding to a set of most significant bits of a significand portion of the 32-bit input data element, the first sub-reducer comprising:
      a trailing bit reducer configured to reduce a quantity of trailing bits representing the significand portion of the 32-bit input data element to produce a first reduced significand portion of the 32-bit input data element, the first reduced significand portion corresponding to the set of most significant bits; and
      a first exponent expander configured to increase a quantity of bits representing an exponent portion of the 32-bit input data element to produce a first increased exponent portion,
      wherein the first sub-reducer produces the first 21-bit input data element based on the first reduced significand portion and the first increased exponent portion; and
    a second sub-reducer configured to convert the 32-bit input data element into a second 21-bit input data element, the second 21-bit input data element corresponding to a set of least significant bits of the significand portion of the 32-bit input data element, the second sub-reducer comprising:
      a leading bit reducer configured to reduce a quantity of leading bits representing the significand portion of the 32-bit input data element to produce a second reduced significand portion of the 32-bit input data element, the second reduced significand portion corresponding to the set of least significant bits; and
      a second exponent expander configured to increase a quantity of bits representing the exponent portion of the 32-bit input data element to produce a second increased exponent portion,
      wherein the second sub-reducer produces a second 21-bit input data element based on the second reduced significand portion and the second increased exponent portion; and
  a plurality of processing elements, a processing element of the plurality of processing elements configured to iteratively perform a plurality of pairwise multiply-accumulate operations on the first 21-bit input data element, the second 21-bit input data element, and a weight to provide a total output, wherein a 21 bit-length corresponds to a maximum supported bit-length for the processing element.

Clause 2: The systolic array processor of Clause 1, wherein the first 21-bit input data element and the second 21-bit input data element sum to the 32-bit input data element.

Clause 3: The systolic array processor of Clause 1, wherein the second sub-reducer is further configured to determine the 32-bit input data element comprises a normal number, the second sub-reducer further comprising:
  a normalizer to remove an implied bit of the 32-bit input data element and renormalize the second reduced significand portion to produce a normalized significand portion based on determining the 32-bit input data element comprises a normal number; and
  an exponent adjuster to adjust the second increased exponent portion to produce an adjusted exponent portion based on renormalizing the second reduced significand portion,
  wherein the second 21-bit input data element is further based on the normalized significand portion and the adjusted exponent portion.

Clause 4: The systolic array processor of Clause 1, the weight comprising a first reduced weight and a second reduced weight, wherein the processing element is further configured to:
  multiply the second 21-bit input data element and the second reduced weight to generate a first product;
  multiply the first 21-bit input data element and the second reduced weight to generate a second product;
  multiply the second 21-bit input data element and the first reduced weight to generate a third product; and
  multiply the first 21-bit input data element and the first reduced weight to generate a fourth product,
  wherein the systolic array processor further comprises a partial sum buffer configured to:
  add the first product, the second product, the third product, the fourth product, and an input partial sum to generate the total output.

Clause 5: A systolic circuit comprising:
  a group of processing elements arranged into a plurality of rows; and
  a first convertor configured to:
    receive a first input represented in floating-point with a first bit-length;
    generate a first reduced input represented in floating-point with a second bit-length, the first reduced input corresponding to a set of most significant bits of a significand portion of the first input; and
    generate a second reduced input represented in floating-point with a third bit-length, the second reduced input corresponding to a set of least significant bits of the significand portion of the first input, wherein the first reduced input and the second reduced input sum to the first input, wherein the second bit-length and the third bit-length are less than the first bit-length, wherein the second bit-length and the third bit-length correspond to a bit-length supported by the group of processing elements,
  wherein an individual processing element in at least one row of the group of processing elements is configured to receive the first reduced input and the second reduced input and perform a plurality of multiply-accumulate operations on the first reduced input, the second reduced input, and a second input.

Clause 6: The systolic circuit of Clause 5, wherein individual processing elements in the plurality of rows of the group of processing elements comprise:
a multiplier configured to multiply two 21-bit floating-point numbers, wherein the multiplier is comprised of a 1-bit sign data path, a 11-bit significand data path, and a 9-bit exponent data path; and
an adder configured to add two floating-point numbers, wherein the adder is comprised of a 1-bit sign data path, a 23-bit significand data path, and a 10-bit exponent data path.

Clause 7: The systolic circuit of Clause 5, wherein the first input corresponds to an input data element and the second input corresponds to a weight, wherein the first convertor is further configured to:
receive the second input represented in floating-point with a fourth bit-length;
generate a third reduced input represented in floating-point with a fifth bit-length, the third reduced input corresponding to a set of most significant bits of a significand portion of the second input;
generate a fourth reduced input represented in floating-point with a sixth bit-length, the fourth reduced input corresponding to a set of least significant bits of the significand portion of the second input, wherein the third reduced input and the fourth reduced input sum to the second input, wherein the fifth bit-length and the sixth bit-length are less than the fourth bit-length, wherein the fifth bit-length and the sixth bit-length correspond to the bit-length supported by the group of processing elements; and
select the first reduced input, the second reduced input, the third reduced input, or the fourth reduced input to be provided.

Clause 8: The systolic circuit of Clause 5, wherein the first convertor comprises:
a first sub-reducer comprising:
a trailing bit reducer configured to reduce a quantity of the set of least significant bits of the significand portion of the first input to produce a first reduced significand portion of the first input; and
a first exponent expander configured to increase a quantity of bits representing an exponent portion of the first input to produce a first increased exponent portion,
wherein the first sub-reducer produces the first reduced input based on the first reduced significand portion and the first increased exponent portion; and
a second sub-reducer comprising:
a leading bit reducer configured to reduce a quantity of the set of most significant bits of the significand portion of the first input to produce a second reduced significand portion of the first input; and
a second exponent expander configured to increase a quantity of bits representing the exponent portion of the first input to produce a second increased exponent portion,
wherein the second sub-reducer produces the second reduced input based on the second reduced significand portion and the second increased exponent portion.

Clause 9: The systolic circuit of Clause 8, wherein the second sub-reducer is configured to determine the first input comprises a normal number, the second sub-reducer further comprising:
a normalizer to remove an implied bit of the first input and renormalize the second reduced significand portion to produce a normalized significand portion based on determining the first input comprises a normal number; and
an exponent adjuster to adjust the second increased exponent portion to produce an adjusted exponent portion based on renormalizing the second reduced significand portion,
wherein the second reduced input is further based on the normalized significand portion and the adjusted exponent portion.

Clause 10: The systolic circuit of Clause 5, wherein the second input corresponds to a first reduced weight and a second reduced weight, wherein to perform the plurality of multiply-accumulate operations, the individual processing element is configured to:
multiply the second reduced input and the second reduced weight to generate a first product;
add the first product to an input partial sum to generate a first sum;
multiply the first reduced input and the second reduced weight to generate a second product;
multiply the second reduced input and the first reduced weight to generate a third product; and
multiply the first reduced input and the first reduced weight to generate a fourth product,
wherein the systolic circuit further comprises a partial sum buffer configured to:
add the first sum to the second product to generate a second sum;
add the second sum and the third product to generate a third sum; and
add the third sum and the fourth product to generate a total output.

Clause 11: The systolic circuit of Clause 5, wherein the plurality of multiply-accumulate operations comprise an ordered plurality of multiply-accumulate operations.

Clause 12: The systolic circuit of Clause 5, wherein:
the first convertor is configured to convert 32-bit floating-point numbers to a plurality of 22-bit floating-point numbers,
wherein each of the processing elements comprises:
a 22-bit multiplier; and
a 34-bit adder.

Clause 13: The systolic circuit of Clause 5, wherein:
the first convertor is further configured to convert m-bit floating-point numbers to one or more n-bit floating-point numbers, wherein n and m can be any number, wherein n is less than m,
wherein each of the processing elements comprises:
a multiplier configured to multiply at least two n-bit numbers; and
an adder configured to add two p-bit numbers, wherein p is greater than n.

Clause 14: The systolic circuit of Clause 5, the systolic circuit further comprising:
a partial sum buffer configured to perform chunk-based accumulation based on a plurality of outputs of the group of processing elements.

Clause 15: The systolic circuit of Clause 5, further comprising:
a second convertor configured to:
receive the second input represented in floating-point with a fourth bit-length, the second input corresponding to a weight;
generate a third reduced input represented in floating-point with a fifth bit-length, the third reduced input corresponding to a set of most significant bits of a significand portion of the second input; and
generate a fourth reduced input represented in floating-point with a sixth bit-length, the fourth reduced input corresponding to a set of least significant bits of the significand portion of the second input, wherein the third reduced input and the fourth reduced input sum to the second input, wherein the fifth bit-length and the sixth bit-length are less than the fourth bit-length, wherein the fifth bit-length and the sixth bit-length correspond to the bit-length supported by the group of processing elements,
wherein the individual processing element in the at least one row of the group of processing elements is further configured to receive the third reduced input and the fourth reduced input and perform the plurality of multiply-accumulate operations on the first reduced input, the second reduced input, the third reduced input, and the fourth reduced input.

Clause 16: The systolic circuit of Clause 5, wherein the group of processing elements perform a first accumulation on a plurality of outputs of the group of processing elements to produce a reduced plurality of outputs, the systolic circuit further comprising:
a partial sum buffer configured to perform chunk-based accumulation based on the reduced plurality of outputs to generate an output.

Clause 17: A method, comprising:
receiving a first input represented in floating-point;
generating a first reduced input represented in floating-point, the first reduced input corresponding to a set of most significant bits of a significand portion of the first input;
generating a second reduced input represented in floating-point, the second reduced input corresponding to a set of least significant bits of the significand portion of the first input, wherein the first reduced input and the second reduced input sum to the first input, wherein the first reduced input and the second reduced input correspond to a supported bit-length; and
performing one or more operations based on the first reduced input, the second reduced input, and a second input to generate an output.

Clause 18: The method of Clause 17, wherein:
the first input comprises a 32-bit floating-point number;
the first reduced input comprises a first 22-bit floating-point number; and
the second reduced input comprises a second 22-bit floating-point number.

Clause 19: The method of Clause 17, further comprising:
receiving the second input represented in floating-point;
generating a third reduced input represented in floating-point, the third reduced input corresponding to a set of most significant bits of a significand portion of the second input; and
generating a fourth reduced input represented in floating-point, the fourth reduced input corresponding to a set of least significant bits of the significand portion of the second input, wherein the third reduced input and the fourth reduced input sum to the second input, wherein the one or more operations are further based on the third reduced input and the fourth reduced input.

Clause 20: The method of Clause 17, wherein each of the first input and the second input comprises an input data element or a weight.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the Clauses are to be embraced within their scope.

What is claimed is:

1. A systolic array processor organized in rows and columns, each row comprising:
   a reducer, the reducer configured to convert 32-bit input data elements into reduced 22-bit input data elements, the reducer comprising:
      a trailing bit reducer configured to reduce a quantity of bits representing a significand portion of a 32-bit input data element of the 32-bit input data elements to produce a reduced significand portion of the 32-bit input data element;
      a rounder configured to round the reduced significand portion of the 32-bit input data element to produce a rounded significand portion; and
      an exponent expander configured to increase a quantity of bits representing an exponent portion of the 32-bit input data element to produce an increased exponent portion,
      wherein the reducer produces a reduced 22-bit input data element based on the rounded significand portion and the increased exponent portion; and
   a plurality of processing elements, the plurality of processing elements configured to receive the reduced 22-bit input data elements from the reducer and to receive weights for performing multiply-accumulate operations.

2. The systolic array processor of claim 1, wherein the reducer is further configured to convert 32-bit weights into the weights.

3. The systolic array processor of claim 1, wherein the reducer further comprises a first reducer, each row further comprising:
   a second reducer, the second reducer configured to convert 32-bit weights into the weights.

4. The systolic array processor of claim 1, wherein the rounder is configured to round the reduced significand portion of the 32-bit input data element based on one or more of:
   stochastic rounding;
   rounding to nearest even;
   rounding to zero;
   rounding down; or
   rounding up.

5. A systolic circuit comprising:
   a group of processing elements arranged into a plurality of rows; and
   a first convertor configured to:
      receive a first input represented in floating-point with a first bit-length;
      identify a quantity of trailing bits of the first input based on a difference between the first bit-length and a bit-length supported by the group of processing elements;
      reduce the quantity of trailing bits of the first input; and
      generate a first reduced input represented in floating-point with a second bit-length based on reducing the quantity of trailing bits of the first input, wherein the second bit-length is less than the first bit-length, wherein the second bit-length corresponds to a bit-length supported by the group of processing elements;
   wherein an individual processing element in at least one row of the group of processing elements is configured to receive the first reduced input from the first convertor and to receive a second input for performing multiply-accumulate operations.

6. The systolic circuit of claim 5, wherein individual processing elements in the plurality of rows of the group of processing elements comprise:
   a multiplier configured to multiply two 22-bit floating-point numbers, wherein the multiplier is comprised of a 1-bit sign data path, a 11-bit significand data path, and a 10-bit exponent data path; and
   an adder configured to add two floating-point numbers, wherein the adder is comprised of a 1-bit sign data path, a 23-bit significand data path, and a 10-bit exponent data path.

7. The systolic circuit of claim 5, wherein the first input comprises an input data element and the second input comprises a reduced weight, wherein the first convertor is further configured to:
receive the first input and a weight;
generate the first reduced input and the second input; and
select the first reduced input or the second input to be provided.

8. The systolic circuit of claim 5, wherein the first convertor comprises:
a trailing bit reducer configured to reduce a quantity of bits representing a significand portion of the first input to produce a reduced significand portion of the first input;
a rounder configured to round the reduced significand portion of the first input based on a remainder of the bits representing the significand portion of the first input not included within the reduced significand portion; and
an exponent expander configured to increase a quantity of bits representing an exponent portion of the first input.

9. The systolic circuit of claim 5, wherein the first input comprises a first rounded input, wherein the first convertor comprises:
a trailing bit reducer configured to reduce a quantity of bits representing a significand portion of the first input to produce a reduced significand portion of the first input; and
an exponent expander configured to increase a quantity of bits representing an exponent portion of the first input.

10. The systolic circuit of claim 5, wherein the first reduced input comprises a first reduced rounded input, wherein the first reduced rounded input is rounded based on one or more of:
stochastic rounding;
rounding to nearest even;
rounding to zero;
rounding down; or
rounding up.

11. The systolic circuit of claim 5, wherein the first reduced input comprises a first reduced rounded input, wherein the first reduced rounded input is rounded based on a user input.

12. The systolic circuit of claim 5, wherein:
the first convertor is configured to convert 32-bit floating-point numbers to 22-bit floating-point numbers,
wherein each of the processing elements comprises:
a 22-bit multiplier; and
a 34-bit adder.

13. The systolic circuit of claim 5, wherein:
the first convertor is further configured to convert m-bit floating-point numbers to n-bit floating-point numbers, wherein n and m can be any positive integer, wherein n is less than m,
wherein each of the processing elements comprises:
a multiplier configured to multiply at least two n-bit numbers; and
an adder configured to add two p-bit numbers, wherein p is greater than n.

14. The systolic circuit of claim 5, wherein to reduce the quantity of trailing bits of the first input, the first convertor is configured to:
set the quantity of trailing bits to zero.

15. The systolic circuit of claim 5, further comprising:
a second convertor configured to:
receive a weight represented in floating-point with the first bit-length;
identify a quantity of trailing bits of the weight;
reduce the quantity of trailing bits of the weight; and
generate the second input represented in floating-point with the second bit-length based on reducing the quantity of trailing bits of the weight.

16. The systolic circuit of claim 5, wherein the first reduced input is stored in a 24-bit format.

17. A method implemented by a systolic circuit, the method comprising:
receiving a first input represented in floating-point with a first bit-length;
reducing a quantity of trailing bits of the first input based on a difference between the first bit-length and a bit-length supported by a processing element of the systolic circuit for multiply-accumulate operations;
generating a first reduced input represented in floating-point with a second bit-length based on reducing the quantity of trailing bits of the first input, wherein the second bit-length is less than the first bit-length, wherein the second bit-length corresponds to the bit-length supported by the processing element; and
receiving the first reduced input and a second input for performing, by the processing element, multiply-accumulate operations.

18. The method of claim 17, wherein:
the first input comprises a 32-bit floating-point number;
the first reduced input comprises a first 22-bit floating-point number; and
the second input comprises a second 22-bit floating-point number.

19. The method of claim 17, wherein generating the first reduced input comprises:
rounding the first input to generate the first reduced input, based on a remainder of non-trailing bits of the first input, wherein the first input comprises a quantity of bits, wherein rounding the first input comprises rounding a portion of the quantity of bits.

20. The method of claim 17, wherein one or more of the first reduced input or the second input comprises a rounded, reduced input, wherein the rounded, reduced input is rounded based on one or more of:
stochastic rounding;
rounding to nearest even;
rounding to zero;
rounding down; or
rounding up.

21. The method of claim 17, wherein the first bit-length is unsupported by the processing element for the multiply-accumulate operations.

* * * * *